US012587045B2

(12) United States Patent
Nashiki et al.

(10) Patent No.: US 12,587,045 B2
(45) Date of Patent: Mar. 24, 2026

(54) MOTOR AND CONTROL DEVICE THEREOF

(71) Applicant: Masayuki Nashiki, Aichi (JP)

(72) Inventors: Masayuki Nashiki, Aichi (JP);
Hiroyuki Nashiki, Aichi (JP)

(73) Assignee: Masayuki Nashiki, Aichi (JP)

( * ) Notice: Subject to any disclaimer, the term of this
patent is extended or adjusted under 35
U.S.C. 154(b) by 629 days.

(21) Appl. No.: 17/770,319

(22) PCT Filed: Jul. 21, 2020

(86) PCT No.: PCT/JP2020/028219
§ 371 (c)(1),
(2) Date: Apr. 7, 2023

(87) PCT Pub. No.: WO2021/079577
PCT Pub. Date: Apr. 29, 2021

(65) Prior Publication Data
US 2023/0231425 A1      Jul. 20, 2023

(30) Foreign Application Priority Data

Oct. 25, 2019    (JP) ................................. 2019-194138

(51) Int. Cl.
*H02K 1/14*         (2006.01)
*H02K 1/27*         (2022.01)
(Continued)

(52) U.S. Cl.
CPC ............. *H02K 1/14* (2013.01); *H02K 1/2766*
(2013.01); *H02P 6/10* (2013.01); *H02P 25/022*
(2013.01); *H02P 2209/07* (2013.01)

(58) Field of Classification Search
CPC ........ H02K 1/14; H02K 1/2766; H02K 1/278;
H02K 2213/03; H02K 29/03; H02K
21/16; H02P 6/10; H02P 25/022; H02P
2209/07
See application file for complete search history.

(56) References Cited

U.S. PATENT DOCUMENTS 4,755,732  A      7/1988  Ando
6,583,531  B1     6/2003  Asano et al.
(Continued)

FOREIGN PATENT DOCUMENTS

CN          102832767       12/2012
JP          54-001810       1/1979
(Continued)

*Primary Examiner* — Thomas Truong
(74) *Attorney, Agent, or Firm* — Millen, White, Zelano &
Branigan, P.C.; Christopher W. Brody

(57) ABSTRACT

The torque of a permanent magnet motor is increased. There
is provided a permanent magnet type motor with concen-
trated windings, in which each stator pole has a circumfer-
ential pitch of 185° or more in an electric angle. In this
motor, the circumferential distribution of the magnetic flux
density in an air gap surface of the rotor poles PR of the
permanent magnet type has an approximately trapezoidal
shape. Moreover, the induced voltages of the concentrated
windings of the stator have an approximately trapezoidal
waveform. An approximately trapezoidal-shaped waveform
current is energized in the concentrated winding of each
phase. Even if the magnetic flux density is close to the
maximum flux density of the soft magnetic member of the
stator, large slot cross-sectional areas of the stator can be
secured, thus outputting a large torque.

19 Claims, 26 Drawing Sheets

(51) Int. Cl.
  *H02K 1/276* (2022.01)
  *H02P 6/10* (2006.01)
  *H02P 25/022* (2016.01)

(56) References Cited

U.S. PATENT DOCUMENTS

| | | | | |
|---|---|---|---|---|
| 2008/0315691 | A1 | 12/2008 | Jeung | |
| 2012/0001509 | A1* | 1/2012 | Yamada | H02K 1/278 |
| | | | | 310/156.15 |
| 2015/0222150 | A1* | 8/2015 | Makita | H02K 1/16 |
| | | | | 310/156.08 |
| 2016/0006301 | A1* | 1/2016 | Matsuoka | H02K 21/16 |
| | | | | 310/216.112 |
| 2016/0072416 | A1* | 3/2016 | Hirotani | H02K 1/276 |
| | | | | 318/400.2 |
| 2016/0344271 | A1* | 11/2016 | Li | H02K 1/2706 |
| 2018/0316234 | A1* | 11/2018 | Ikawa | H02K 29/03 |
| 2020/0021223 | A1* | 1/2020 | Arisawa | H02K 1/276 |
| 2021/0013760 | A1 | 1/2021 | Enomoto | |
| 2022/0014136 | A1* | 1/2022 | Ohashi | B62D 5/0403 |
| 2022/0123608 | A1* | 4/2022 | Echizen | H02K 1/16 |

FOREIGN PATENT DOCUMENTS

| | | | | | |
|---|---|---|---|---|---|
| JP | 58-143486 | | 9/1983 | | |
| JP | 63133895 | A * | 6/1988 | | |
| JP | 11-234990 | | 8/1999 | | |
| JP | 11234990 | A * | 8/1999 | | H02K 21/16 |
| JP | 2007-318998 | | 12/2007 | | |
| JP | 2008-104290 | | 5/2008 | | |
| JP | 2008-172983 | | 7/2008 | | |
| JP | 2015-231253 | | 12/2015 | | |
| JP | 2017-99232 | | 6/2017 | | |
| JP | 2018-117398 | | 7/2018 | | |
| JP | 2019-134654 | | 8/2019 | | |
| JP | 2019134654 | A * | 8/2019 | | |
| WO | 2008/050637 | | 5/2008 | | |
| WO | 2017/109968 | | 6/2017 | | |
| WO | 2019/008722 | | 1/2019 | | |
| WO | 2019/176234 | | 9/2019 | | |

* cited by examiner

7S8R、$\theta$ sp＝206°、$\theta$ ou＝26°

5S6R、$\theta$ sp＝216°、$\theta$ ou＝36°

11S12R、$\theta$ sp＝196°、$\theta$ ou＝16°

12S14R、$\theta$ sp=210°、$\theta$ ou=30°                    $\theta$ [ ]

7S8R、 $\theta$ sp=206°、 $\theta$ ou=26°、I:sin$\theta$     $\theta$ [°]

MOTOR AND CONTROL DEVICE THEREOF

CROSS-REFERENCE TO RELATED APPLICATION

This application is based on and claims the benefit of priority from earlier Japanese Patent Application No. 2019-194138 filed Oct. 25, 2019, the description of which is incorporated herein by reference.

BACKGROUND

Technical Field

The present invention relates to a permanent magnet type concentrated winding motor and a control device thereof. Permanent magnet type motors are widely used in home appliance motors, industrial motors, and automotive motors. Permanent magnet motors and control devices thereof, applied to these products, are required to be more efficient, compact in sizes, lightweight, low-noise, and low-cost.

Background Art

FIG. 34 shows a cross-sectional view of a conventional surface magnet synchronous motor SPMSM. The number of stator poles is 12 with an 8-pole rotor, and the motor is a 3-phase, 4-pole pair with concentrated windings. 341 shows a stator, 342 shows a U-phase stator pole, 348 shows a V-phase stator pole, 349 shows a W-phase stator pole, in which each stator pole is wound with a concentrated winding for each phase, as shown by 343. Four sets of U, V, and W phase stator poles are arranged in the circumferential direction. If the angular width of a slot opening is ignored, the circumferential angular width θstg of the portion of each stator pole facing the air gap section is 120 [°] in electric angle. 345 shows a permanent magnet and constitutes the S pole while 346 is a permanent magnet and constitutes the N pole. Four sets of S-pole and N-pole magnetic poles are arranged alternately in the circumferential direction. The circumferential angular width of each of these rotor poles is 180 [°] in electric angle. The motor in FIG. 34 is driven by 3-phase, sinusoidal, and AC power. The circumferential position of each of the stator sections and the rotational position of the rotor are indicated by the rotation angle θ [°] of the electric angle. The direction of rotation of the rotor is mainly described in the counterclockwise direction CCW.

FIGS. 35 (*a*) and (*b*) show a development of the motor cross-sectional view shown FIG. 34, which is transformed into a linear view and which shows a part of the motor. The right direction on the paper in FIG. 35 shows the counterclockwise rotation direction CCW on the paper in FIG. 34. A reference number 351 in FIG. 35(*a*) is the stator and a reference number 354 in FIG. 35(*b*) is the rotor. A reference number 352 shows a portion corresponding to a portion shown by a reference number 342 in FIG. 34, and shows the U-phase stator pole. Similarly, a reference number 358 shows a V-phase stator pole and a reference number 359 shows a W-phase stator pole. A referee number 353 shows a U-phase concentrated winding which is wound around the U stator poles. A reference number 355 shows an S-pole permanent magnet, corresponding to a magnet 345 arranged in FIG. 34, with a circumferential angle width of 180 [°] in electrical angle. A reference number 356 shows a permanent magnet providing an N-pole.

Next, the magnetic flux density B of each part of the motor, the interlinkage magnetic flux φ of the U-phase winding 353, voltage V thereof, current I thereof, etc., will be explained in model forms to illustrate problems concerning this motor. The maximum residual flux density of rare-earth permanent magnets that are readily available currently is about 1.4 [T]. Here, a simple calculation assumes that the magnetic flux density of magnets 355 and 356 is uniform and the operating point on the rotor surface is 1.2 [T]. It is also assumed that that the maximum flux density of the electromagnetic steel plate in the teeth of the stator is 2.0 [T]. In this case, the circumferential angle width θst of the stator tooth is 120×1.2/2.0=72 [°] in electric angle, which allows the magnetic flux of the permanent magnet to pass therethrough. The circumferential angular width of the slot, θss, is the space between the teeth, and the angular width θss is expressed as θss=120−72=48 [°] in electric angle. Compared to the angular width of the teeth θst of 72 [°], this angular width θss is a little smaller, but it provides the slot cross-sectional area for winding the windings. Thus, the motor is practical.

Here, as will be described in detail later, one of the purposes of the present invention is a motor configuration and its controller when the magnetic flux density B of the rotor poles is large, for example, about 1.8 [T], for higher torque of the motor. That is, it is noted what kind of motor configuration and controller should be used when the magnetic flux density B of the rotor poles is as large as the saturation flux density of the soft magnetic material of the stator in order to increase the motor torque. For example, in the example in FIG. 35, it is assumed that the magnetic flux density of permanent magnets 355 and 356 is uniform and the operating point is 1.8 [T]. In this assumption, the circumferential angle width θst of the stator tooth is 120×1.8/2.0=108 [°] in electric angle, and the circumferential angle width θss of the slot is 120−108=12 [°] in electric angle. Compared to the angular width of the tooth θst of 108 [°], the angular width θss of the slot is 12 [°], which means that the space for winding the winding is smaller. Therefore, there is a problem of insufficient winding space when the magnetic flux density of the rotor poles is large. In other words, the torque cannot be increased largely.

In addition, a maximum flux density that can be provided by currently usable electromagnetic steel sheets is about 1.8 [T] at most. Therefore, if the magnetic flux density of the permanent magnets 355 and 356 is 1.4 [T], 78 [%] of the circumferential space of the slots provides a portion which allows the magnetic flux to pass through the stator teeth, and the remaining 22 [%] or so of the slots provides a portion where the windings are wound. Hence, torque decreases down to 68.6 [%] of an optimum value. Under conditions where iron loss and copper loss are at the same level, the motor output is maximized when the magnetic loading, which is the part through which the magnetic flux passes, and the electrical loading in the winding section, where the current is energized are at the same level. In this view, the above example is an extreme case of large magnetic loading and small electrical loading, which is undesirable. It is possible to increase the magnetic flux density of the rotor poles to about 1.8 [T] by devising the rotor structure. It is also possible that future advances in permanent magnets will lead to higher performance with a magnetic flux density of about 1.8 [T].

The concentrated-winding 3-phase motor shown in FIGS. 34 and 35 has the winding pitch of 120° electromagnetically at an electric angle, so a short-pitch coefficient is cos 30°=0.866. There is also the problem of slightly reduced torque.

The parts (c), (d) and (e) of FIG. 35 will now be detailed. Also, as will be discussed in more detail later, driving with sinusoidal voltages and sinusoidal currents, as shown in FIG. 35, is not an efficient use of the drive circuit. Square-wave voltage drive or trapezoidal-wave voltage drive can be used. From this perspective, the current drive circuit that drives the motor shown in FIG. 34 is relatively large and costly. There is a possibility of making motors smaller.

In addition, multi-pole motors can reduce the size of motors due to the ability to reduce the thickness of a back yoke of the stator, and other reasons. However, there is a problem of increased iron loss due to the higher drive frequency. Amorphous cores with laminated amorphous sheets can be used to significantly reduce iron loss. However, the maximum magnetic flux density is as low as 1.4 [T], which is a problem that reduces torque. In addition, as mentioned above, when the magnetic flux density of the rotor poles increases, the maximum flux density is small, which further leads to the problem of insufficient winding space.

CITATION LIST

Patent Literature

[PTN 1] JP-A-2000-333423 (FIG. 1)
[PTN 2] JP-A-2007-318998 (FIGS. 8, 9, 10, 11)
[PTN 3] JPA-H11-234990 (FIG. 1)

SUMMARY

Problems to be Solved

A problem of the present disclosure is to solve the aforementioned problems of conventional motors in permanent magnet type motors, and to achieve higher efficiency, smaller size, lighter weight, lower noise, and lower cost. An example of a numerical target is a motor and its drive system that generate more than twice as much torque in the same size, for example, compared to conventional motors in FIGS. 34 and 35.

One specific object is to realize and drive a motor that can efficiently generate torque even when the magnetic flux density of the rotor poles approaches the maximum flux density of the soft magnetic material of the stator. This is also to save winding placement space and improve winding coefficients. Another object is to effectively utilize harmonic components of torque as well, and to increase torque by controlling voltages and currents in trapezoidal shapes. Another object is to achieve torque output comparable to that of conventional motors using amorphous steel sheets, which have a lower maximum flux density than silicon steel sheets, and at the same time, to achieve excellent high-speed rotation characteristics by taking use of advantage of their low iron loss.

Solution to the Problems

According to the disclosure of a first exemplary mode, there is provided a permanent magnet motor with a motor and control device thereof, characterized in that the motor comprises:
NR1×NN1 pieces of rotor poles PR,
NS1×NN1 pieces of stator poles PS,
concentrated windings WS wound around teeth of the respective stator poles, and a drive circuit DTR that supplies voltage and current to the concentrated windings, wherein
the stator poles PS have a circumferential pitch θsp which is equal to or more than 185° in electric angle, and
a relationship between the number of stator poles, (NS1× NN1), and the number of rotor pole pairs, (NR1×NN1)/ 2, is NS1/(NR1/2) which is an irreducible fraction, where NS1, NR1 and NN1 are positive integers.

According to this configuration, the slot cross-sectional area of the stator can be secured even when the maximum magnetic flux density of an air gap surface of the rotor poles becomes large, which is close to the maximum flux density of the stator poles. Hence, the torque of the motor can be increased, resulting in higher efficiency and smaller size.

In the disclosure of a second exemplary mode, the motor and control device thereof, characterized in comprising
the rotor poles PR includes a part provided at a circumferential pole boundary thereof, the part being a low flux region ROU whose flux density is low,
the concentrated windings WS induce thereat an approximately trapezoidal-shaped voltage, and
the concentrated windings WS are energized with an approximately trapezoidal-shaped current.
According to this configuration, approximately trapezoidal voltages and currents can increase torque compared to a case in which sinusoidal drive is performed.

In a permanent magnet motor according to a third exemplary mode, there is provided a motor and control device thereof, characterized in that the motor comprises:
NR1×NN1 pieces of rotor poles PR,
NS1×NN1 pieces of stator poles PS,
concentrated windings WS wound around teeth of the respective stator poles, and
a drive circuit DTR that supplies voltage and current to the concentrated windings, wherein
the stator poles PS have a circumferential pitch θsp which is equal to or more than 185° in electric angle,
a bypass magnetic path PBP is provided between two of the stator poles PS to pass the magnetic flux from the rotor poles PR to a stator back yoke, where the bypass magnetic path PBP includes a circumferential angle width Gbp facing an air gap portion, the circumferential angle width θbp being smaller than (θsp−185°) at electric angle, and
a relationship between the number of stator poles, (NS1× NN1), and the number of rotor pole pairs, (NR1×NN1)/ 2, is NS1/(NR1/2) which is an irreducible fraction, where NS1, NR1 and NN1 are positive integers.
According to this configuration, the bypass magnetic path PBP is added even when the circumferential pitch θsp of the stator poles PS is larger than 220° in electric angle. This allows both securing the slot cross-sectional area where the winding is wound and increasing the induced voltage of the winding, thereby increasing the motor torque.

In the disclosure of a fourth exemplary mode, the motor and control device thereof according to the first or third exemplary mode, wherein
when the stator has the magnet poles whose number NS1 is an odd number, respective phase windings are wound and connected to provide an NS1-phase motor, NS1-phase currents being supplied to the phase windings, and
when the stator has the magnet poles whose number NS1 is an even number, (NS1/2)-phase currents being supplied to the phase windings.

According to this configuration, a phase shift between the induced voltage and current in each phase can be reduced. This increases torque and improves motor efficiency.

In the disclosure of a fifth exemplary mode, the motor and control device thereof according to the first or third exemplary mode, comprising:

the rotor poles PR includes a part provided at a circumferential pole boundary thereof, the part being a region ROU whose flux density is lower than a maximum magnetic flux density Brm.

This configuration reduces the flux component of the rotor that does not contribute to increasing the average torque of the motor. The aforementioned region ROU of the rotor can be utilized as a space for permanent magnets and other components to generate the main rotor flux components for effective torque generation.

In the disclosure of a sixth exemplary mode, the motor and control device thereof according to the first or third exemplary mode, wherein an approximately trapezoidal-shape current to supplied to each of the phase windings of the stator.

According to this configuration, the induced voltage of each phase of the motor can be used as an approximately trapezoidal shape that is closer to a square wave than a sinusoidal shape. This allows the approximately trapezoidal-shaped current of each phase to be energized in the windings of each phase. Hence, the output torque of the motor can be increased.

In the disclosure of a seventh exemplary mode, the motor and control device thereof according to the first or third exemplary mode, wherein corrected amounts of shapes of the currents supplied to the stator are memorized, the corrected amounts being for reducing ripples in torque, and the corrected amounts are added to command values for generating the shapes of the respective phase currents for control thereof.

According to this configuration, the torque ripple components of the entire motor caused by the induced voltage waveform and current waveform of each phase can be reduced by correcting the current waveform of each phase according to the correction amount. This can also be performed in conjunction with conventional torque ripple correction techniques. Thus, torque ripples can be effectively corrected for each factor.

In the disclosure of an eighth exemplary mode, the motor and control device thereof according to the first or third exemplary mode, wherein the motor includes magnetic steel sheets which are composed of amorphous electromagnetic steel sheets.

According to this configuration, even if the magnetic flux density of each of the rotor poles is large to about 1.4 [T], which is the maximum flux density of the current rare earth permanent magnets, a slot cross-sectional area for winding the windings can be secured reasonably. Therefore, the torque can be increased by minimizing the reduction of the winding space caused by the low maximum magnetic flux density of amorphous, and the characteristics of iron loss reduction at high speeds can be provided.

In the disclosure of a ninth exemplary mode, the motor and control device thereof according to the first or third exemplary mode, wherein the rotor poles PR include permanent magnets which are Halbach array permanent magnets.

According to this configuration, the magnetic flux directions of the permanent magnets arranged at the boundaries of the rotor poles are oriented in the circumferential direction. Hence, this reduces flux components of the rotor that do not contribute to increasing an average torque of the motor. It can also increase a main rotor flux component that generates motor torque.

In the disclosure of a tenth exemplary mode, the motor and control device thereof according to the first or third exemplary mode, wherein the rotor poles PR include permanent magnets which are polar-anisotropic permanent magnets.

According to this configuration, the magnetic flux directions of the permanent magnets arranged near the boundaries of the rotor poles are oriented in the circumferential direction. Hence, this reduces flux components of the rotor that do not contribute to increasing an average torque of the motor. It can also increase a main rotor flux component that generates motor torque.

In the disclosure of an eleventh exemplary mode, the motor and control device thereof according to the first or third exemplary mode, comprising:

the rotor poles PR includes a soft magnetic member composing a central portion of a circumferential surface closely facing an air gap, wherein permanent magnets are arranged around the soft magnetic member.

According to this configuration, permanent magnets with the magnetic flux direction facing in the circumferential direction are arranged at the boundaries of the rotor poles, a main part of each rotor pole facing the air gap is composed of a soft magnetic material, and the permanent magnets are thus arranged around the soft magnetic material. This reduces the flux components of the rotor that do not contribute to increasing an average torque of the motor. In particular, the maximum flux density of a main rotor flux that generates motor torque can be larger than the maximum flux density of the permanent magnets. This can increase the motor torque.

In the disclosure of a twelfth exemplary mode, the motor and control device thereof according to the first or third exemplary mode, comprising:

the stator poles PS have magnetic paths composed primarily by a soft magnetic material MM1, and the stator poles includes teeth of which parts, such as ends, are composed of a soft magnetic material MM2, the soft magnetic material MM2 being larger in magnetic characters than a saturation magnetic flux density of the soft magnetic material MM1.

According to this configuration, the soft magnetic material MM2 with a large saturation magnetic flux density can be handled even if it is expensive. The soft magnetic material is used for some parts of the stator poles, such as the tooth tips, thereby improving motor magnetic properties without the burden of high cost.

In the disclosure of a thirteenth exemplary mode, the motor and control device thereof according to the first or third exemplary mode, wherein the rotor magnetic poles PR are composed of 6×NN1 pieces of poles, the stator magnetic poles PS are composed of 5×NN1 pieces of poles, and 5-phase voltages and currents are applied to the poles for driving thereof, wherein the number NN1 is a positive integer.

According to this configuration, it is possible to deal with the case where the maximum magnetic flux density Bagm of the rotor poles is close to the maximum magnetic flux density Bstm of the soft magnetic material of the stator. Each slot cross-sectional area for winding the windings can be secured, and a large torque can be output.

In the disclosure of a fourteenth exemplary mode, the motor and control device thereof according to the first or third exemplary mode, wherein the rotor magnetic poles PR are composed of 8×NN1 pieces of poles, the stator magnetic poles PS are composed of 7×NN1 pieces of poles, and 7-phase voltages and currents are applied to the poles for driving thereof, wherein the number NN1 is a positive integer.

According to this configuration, it is possible to deal with the case where the maximum magnetic flux density Bagm of the rotor poles is close to the maximum magnetic flux density Bstm of the soft magnetic material of the stator. Each slot cross-sectional area for winding the windings can be secured, and a large torque can be output.

In the disclosure of a fourteenth exemplary mode, the motor and control device thereof according to the first or third exemplary mode, wherein the rotor magnetic poles PR are composed of 10×NN1 pieces of poles, the stator magnetic poles PS are composed of 9×NN1 pieces of poles, and 9-phase voltages and currents are applied to the poles for driving thereof, wherein the number NN1 is a positive integer.

According to this configuration, it is possible to deal with the case where the maximum magnetic flux density Bagm of the rotor poles is close to the maximum magnetic flux density Bstm of the soft magnetic material of the stator. Each slot cross-sectional area for winding the windings can be secured, and a large torque can be output.

In the disclosure of a sixteenth exemplary mode, the motor and control device thereof according to the first or third exemplary mode, wherein the rotor magnetic poles PR are composed of 12×NN1 pieces or 14×NN1 pieces of poles, the stator magnetic poles PS are composed of 11×NN1 pieces of poles, and 11-phase voltages and currents are applied to the poles for driving thereof, wherein the number NN1 is a positive integer.

According to this configuration, it is possible to deal with the case where the maximum magnetic flux density Bagm of the rotor poles is close to the maximum magnetic flux density Bstm of the soft magnetic material of the stator. Each slot cross-sectional area for winding the windings can be secured, and a large torque can be output.

In the disclosure of a seventeenth exemplary mode, the motor and control device thereof according to the first or third exemplary mode, wherein the rotor magnetic poles PR are composed of 14×NN1 pieces of poles, the number NN1 being a positive integer, the stator magnetic poles PS are composed of 12×NN1 pieces of poles, and 6-phase voltages and currents are applied to the poles for driving thereof, the 6-phase voltages and currents having relative phases of 0° and 30°, 60° and 90°, and 120° and 150° in electrical angle.

According to this configuration, it is possible to deal with the case where the maximum magnetic flux density Bagm of the rotor poles is close to the maximum magnetic flux density Bstm of the soft magnetic material of the stator. Each slot cross-sectional area for winding the windings can be secured, and a large torque can be output.

In the disclosure of an eighteenth exemplary mode, the motor and control device thereof according to the first or third exemplary mode, wherein the rotor magnetic poles PR are composed of 6×NN1 pieces of poles, the number NN1 being a positive integer, the stator magnetic poles PS are composed of 4×NN1 pieces of poles, and 2-phase voltages and currents are applied to the poles for driving thereof, the 2-phase voltages and currents having relative phases of 0° and 90° in electrical angle.

According to this configuration, it is possible to deal with the case where the maximum magnetic flux density Bagm of the rotor poles is close to the maximum magnetic flux density Bstm of the soft magnetic material of the stator. Each slot cross-sectional area for winding the windings can be secured, and a large torque can be output.

In the disclosure of a nineteenth exemplary mode, the motor and control device thereof according to the first or third exemplary mode, wherein the rotor magnetic poles PR are composed of 4×NN1 pieces of poles, the number NN1 being a positive integer, the stator magnetic poles PS are composed of 3×NN1 pieces of poles, and 3-phase voltages and currents are applied to the poles for driving thereof.

According to this configuration, it is possible to deal with the case where the maximum magnetic flux density Bagm of the rotor poles is close to the maximum magnetic flux density Bstm of the soft magnetic material of the stator. Each slot cross-sectional area for winding the windings can be secured, and a large torque can be output.

In the disclosure of a twentieth exemplary mode, the motor and control device thereof according to the first or third exemplary mode, wherein the rotor magnetic poles PR are composed of 10×NN1 pieces of poles, the number NN1 being a positive integer, the stator magnetic poles PS are composed of 8×NN1 pieces of poles, and 4-phase voltages and currents are applied to the poles for driving thereof, the 4-phase voltages and currents having relative phases of 0° and 45°, and, 90° and 135° in electrical angle.

According to this configuration, it is possible to deal with the case where the maximum magnetic flux density Bagm of the rotor poles is close to the maximum magnetic flux density Bstm of the soft magnetic material of the stator. Each slot cross-sectional area for winding the windings can be secured, and a large torque can be output.

In the disclosure of a twenty-first exemplary mode, the motor and control device thereof according to the first or third exemplary mode, wherein the drive circuit DTR comprises, every one of the respective phase stator windings, two power elements supplying positive currents and two power elements supplying negative elements, wherein the currents are controlled to be avoided from being mutually limited by the currents supplied to the respective windings.

According to this configuration, currents with current waveforms close to square waves, approximately trapezoidal wave currents, or sinusoidal wave currents can be energized in each of the windings of each phase.

In the disclosure of a twenty-second exemplary mode, the motor and control device thereof according to the first or third exemplary mode, wherein the drive circuit DTR comprises power elements supplying positive currents to the stator windings and two power elements supplying negative elements to the stator windings; and potential holding means, which holds a common terminal at an intermediate potential between positive and negative potentials of a DC supply, the common terminal being connected to one end of each of the stator windings, such that the currents are controlled to be avoided from being mutually limited by the currents supplied to the respective windings.

According to this configuration, currents with current waveforms close to square waves, approximately trapezoidal wave currents, or sinusoidal wave currents can be energized in each of the windings of each phase.

Effect

The motor and its control device according to the present invention can achieve higher torque, higher efficiency, smaller size, lighter weight, lower noise, and lower cost. Significantly increasing the torque of the motor can be achieved, even if the motor has the same outer diameter and shape as before. Torque ripples can be reduced by various torque ripple reduction techniques and by multi-phasing voltages and currents. Among them, motors with a prime number of phases, such as 5-phase motors, 7-phase motors, 11-phase motors, 13-phase motors, and 17-phase motors, have the effect of reducing harmonic components and mechanical resonance, and are expected to reduce vibration and noise.

Another problem with amorphous cores using amorphous sheets has been that the maximum magnetic flux density is lower than that of silicon steel sheets. However, in the motor configuration according to the present invention, a rare earth permanent magnet with a flux density equivalent to an amorphous core of about 1.2 to 1.6 [T] can achieve both high torque and reduced iron loss at high speeds. As a result, torque and output at high speeds can be significantly increased. A simple motor configuration can also be achieved by combining an amorphous core and a polar anisotropic ring magnet.

BRIEF DESCRIPTION OF THE DRAWINGS

In the accompanying drawings:

FIG. 9 is a laterally sectioned view of a motor whose number of stator poles is 5 and whose number of rotor poles is 6;

FIG. 19 is an illustration exemplifying a distribution of magnetic fluxes, states of interlinkage magnetic fluxes, and induced voltages;

FIG. 35 is a graph exemplifying a distribution of magnetic fluxes, changes in interlinkage magnetic fluxes, and changes in induced voltages.

DETAILED DESCRIPTION OF THE PREFERRED EMBODIMENTS

Figure 1:
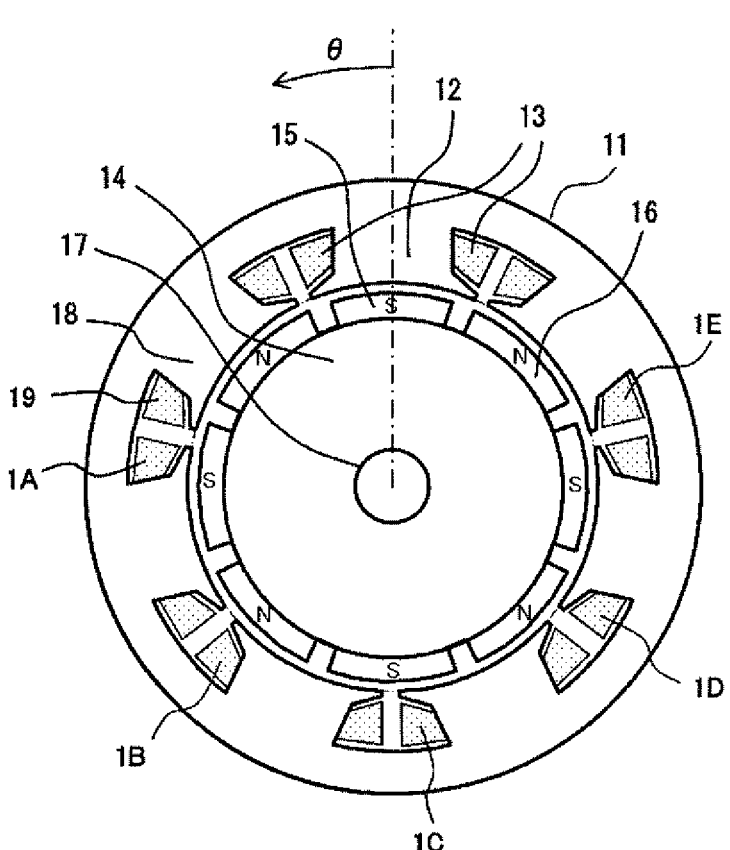
FIG. 1 is lateral sectional view showing a motor whose stator poles are 7 in number and whose rotor poles is 8 in number.

The first object, which is a solution to be solved by the present disclosure is to increase the output torque in a permanent magnet type concentrated winding motor. Increasing the torque is also related to higher efficiency, smaller size, and lighter weight of motors. Another object is to reduce noise and vibration, and there are many applications that require quiet motors. Another object is to achieve both torque and efficiency at high speeds, and applications, for example, electric motorcycles and drones, are increasingly used for continuous operation at high speeds.

First, more specific technical issues and their problems to achieve the aforementioned objects, as well as the solutions to these technical issues, will be described. It is noted that these technical issues, problems, and solutions are multiple, and their interrelationships make it not simple but complex to satisfy these conditions simultaneously. Therefore, before describing each example, a brief overview and correlation of these technical issues, problems, and solutions are described here. It is noted that the contents overlap a little with the above section (Means to solve the problems).

One technical challenge is to increase the magnetic flux density of the rotor to about 1.8 [T] in order to achieve higher torque. The effect is, for example, a 1.5-times increase in torque by changing the magnetic flux density from 1.2 [T] to 1.8 [T]. The problem is that the increased magnetic flux density results in a smaller slot cross-sectional area for winding the stator windings. To solve this technical problem, it is necessary to consider a motor configuration and shape different from conventional 3-phase AC motors, and to expand the slot cross-sectional area where the windings are wound. It should be noted that the method of increasing the motor outline to secure the slot cross-sectional area is not very meaningful when comparing the same motor size, as it also has the disadvantage of reducing the relative torque.

Another technical problem is to energization with an approximately trapezoidal-shaped motor induced voltage waveform and a current with an approximately trapezoidal-shaped waveform, in order to achieve higher torque. As will be described in more detail later, for example, a trapezoidal AC waveform shape is set to AC voltage and current waveforms with a rising linear gradient of 30°, a constant part of 120°, and a falling linear gradient of 30°. The effect is that 1.55 times higher torque is obtained under the same amplitude conditions, compared to sinusoidal voltage and current waveforms. And simply, if complying with the 1.5 times higher flux density, the torque can be increased to 1.5×1.55=2.325 times the torque. To solve this technical problem, it is necessary to obtain a trapezoidal-shaped winding induced voltage waveform. To achieve this, the stator pole configuration and rotor flux distribution must be different from those of conventional 3-phase, sinusoidal AC motors, and other technical issues must also be solved at the same time.

Another technical issue is to simultaneously obtain a moderate trapezoidal shape induced voltage to the concentrated winding and a moderate slot cross-sectional area through which windings are wound. This issue is related to and partly overlaps with the technical issues mentioned above. To solve this technical issue, the number of stator poles and the number of rotor poles must be selected and the shapes of the rotor poles must be optimized. For example, when the number of stator poles is 7 and the number of rotor poles is 8, a circumferential width θstg of the portion of the stator poles facing the air gap must be 185 [°] or more in electric angle. This will be detailed later. Also, as will be discussed later, motor performance can be improved by a bypass path PBP that allows some magnetic flux to pass from the rotor to the back yoke of the stator, depending on the configuration of the stator and rotor magnetic poles.

Another technical challenge is to optimize the induced voltage of each concentrated winding and to reduce the magnetic flux components circulating in the stator poles. The circumferential shape of the magnetic flux distribution of the rotor poles and the shape of the induced voltage of the concentrated winding differ depending on the size of the circumferential width θstg. For this reason the magnetic flux distribution should be made to account for such shape changes. This technical issue is also related to the previous technical issue, and there is a partial overlap between both issues. The solution to this technical problem involves the shape of the rotor poles, the type of permanent magnet and its magnetization characteristics, the deformation of the induced voltage waveform changed by the value of a circumferential width θstg, and the torque characteristics required for the application. There is a magnetic flux component circulating through the teeth of the stator poles, and it can be expected that the smaller the circulating component, the less iron loss near the tip of the teeth or the less partial magnetic saturation in the teeth. The shape of the magnetic flux distribution of the rotor poles is also related to the shape that is easy to manufacture using permanent magnets, i.e., the manufacturability of the rotor poles.

Another technical issue is to make the induced voltage of the concentrated winding sufficiently large when the circumferential pitch θsp of the stator poles is unnecessarily larger than the electrical angle 180 [°], and to generate trapezoidal shaped induced voltage waveforms. If the circumferential pitch θsp [°] is unnecessarily large, there is a problem that the magnetic flux circulates in the stator teeth and cancels out. There is also a problem that the induced voltage of the winding is reduced and the voltage waveform is also deformed. To solve this technical problem, a bypass path PBP of a moderate width may be added to pass some magnetic fluxes from the rotor to the back yoke of the stator, as described above. Since the circumferential width of the bypass magnetic path PBP can be freely set, the circumferential width θstg can be optimized. As a result, the motor torque can be increased. The circumferential width θstg can be optimized and the circumferential width of the bypass magnetic path PBP should be small. Of course, the motor configuration can be simplified by not adding the bypass magnetic path PBP.

Another technical issue is to reduce torque ripples and to reduce vibration and noise in the motor to which the approximately trapezoidal voltage and approximately trapezoidal current are supplied. A theoretically ideal operating 3-phase AC motor has a theoretical torque ripple of zero. In general, however, various harmonic components are generated and torque ripple exists, so various torque ripple reduction measures have been taken in the past. As a result, there is also the problem of reduced torque due to lower winding coefficients. The problem of large torque ripple also occurs in the motors according to the present disclosure when they are driven with an approximately trapezoidal current. One solution to this technical problem is to make motors multiphase. According to existing methods, motors are often driven by three-phase sinusoidal AC. In this case, if a multiphase motor such as a 7-phase motor is used, the torque ripple is reduced and the winding coefficient is increased, thereby increasing the torque. To further reduce torque ripple, the torque ripple can be reduced by correcting the current waveform to the motor.

Another technical challenge is to achieve both torque and high efficiency in higher speed rotations. Iron loss increases at high speed rotations. As for permanent magnets, when their magnetic flux density is as large as 1.4 [T], the motor using an amorphous core is to be realized by taking advantage of its high magnetic flux density feature. To solve this technical problem, amorphous sheets are utilized in the configuration of the motor to reduce iron loss. In the configuration of the motor according to the present disclosure, the rotor flux density can be increased, so that the torque can also be increased.

Thus, torque and power output can be increased in the high speed range. Ring-shaped magnets made of sintered rare earth magnets and having a flux density of about 1.4 [T] and amorphous cores with a maximum flux density of 1.4 [T] to 1.6 [T] may also be used. This also allows for a simplified motor configuration.

Another technical challenge is to realize a drive circuit which uses multi-phase trapezoidal current, such as 7-phase trapezoidal currents. Since there are time periods when the sum of the approximately trapezoidal currents of the multiphases is not 0 [A], the drive circuit that drives, so-called, star-shaped wirings has a problem. There are two ways to solve this technical problem: one is to drive the current of each phase individually, and the other is to add a drive circuit that energizes a current component that does not sum up to 0 [A] for multiple phases.

The present disclosure solves each of the problems by combining multiple technologies, or by solving multiple problems with multiple technologies. As explained in each of the above problems, etc., each technology has its advantages and disadvantages, and it is necessary to consider the cause-and-effect relationship of their combination. The embodied technology will now be explained along with each embodiment.

It is noted that the background technology of this disclosure is the advancement of electronics technology and its cost reduction, and the complexity of motor control now has less impact on control performance degradation and cost. The high integration of not only the microprocessor and memory but also the peripheral circuits of the drive circuitry have made it possible to have a large prime number of phases, such as 5, 7, or 11 phases. In small-size motors, such motors are often controlled by power MOSFETs, and the voltage is low, such as 40 [V], so that the control unit and the drive unit can be located closely together. High integration is possible, and there is little need for electrical isolation in current detection.

Figure 34:
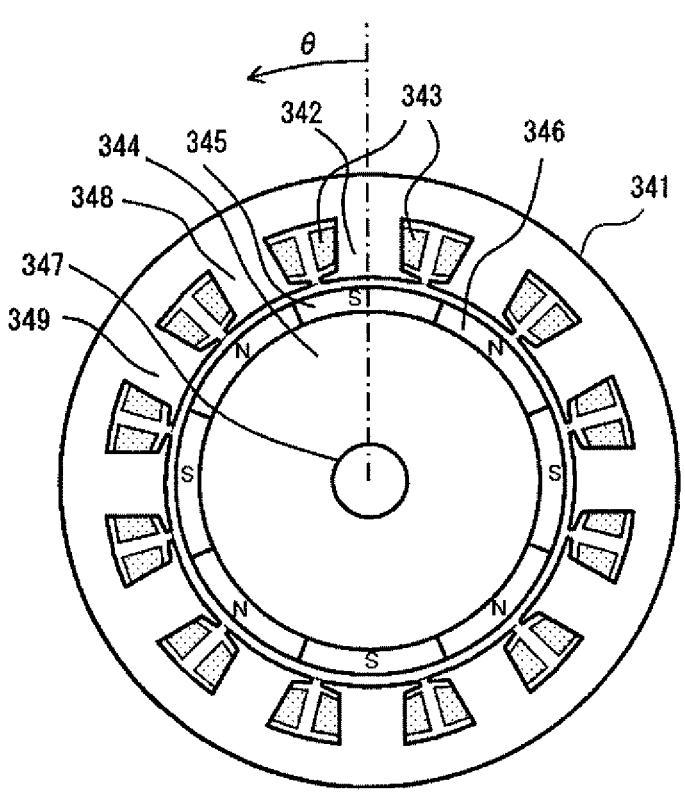
FIG. 34 is a sectional view showing an 8-pole conventional motor of which number of stator poles is 12 and of which number of rotor poles is 8.
Figure 35:
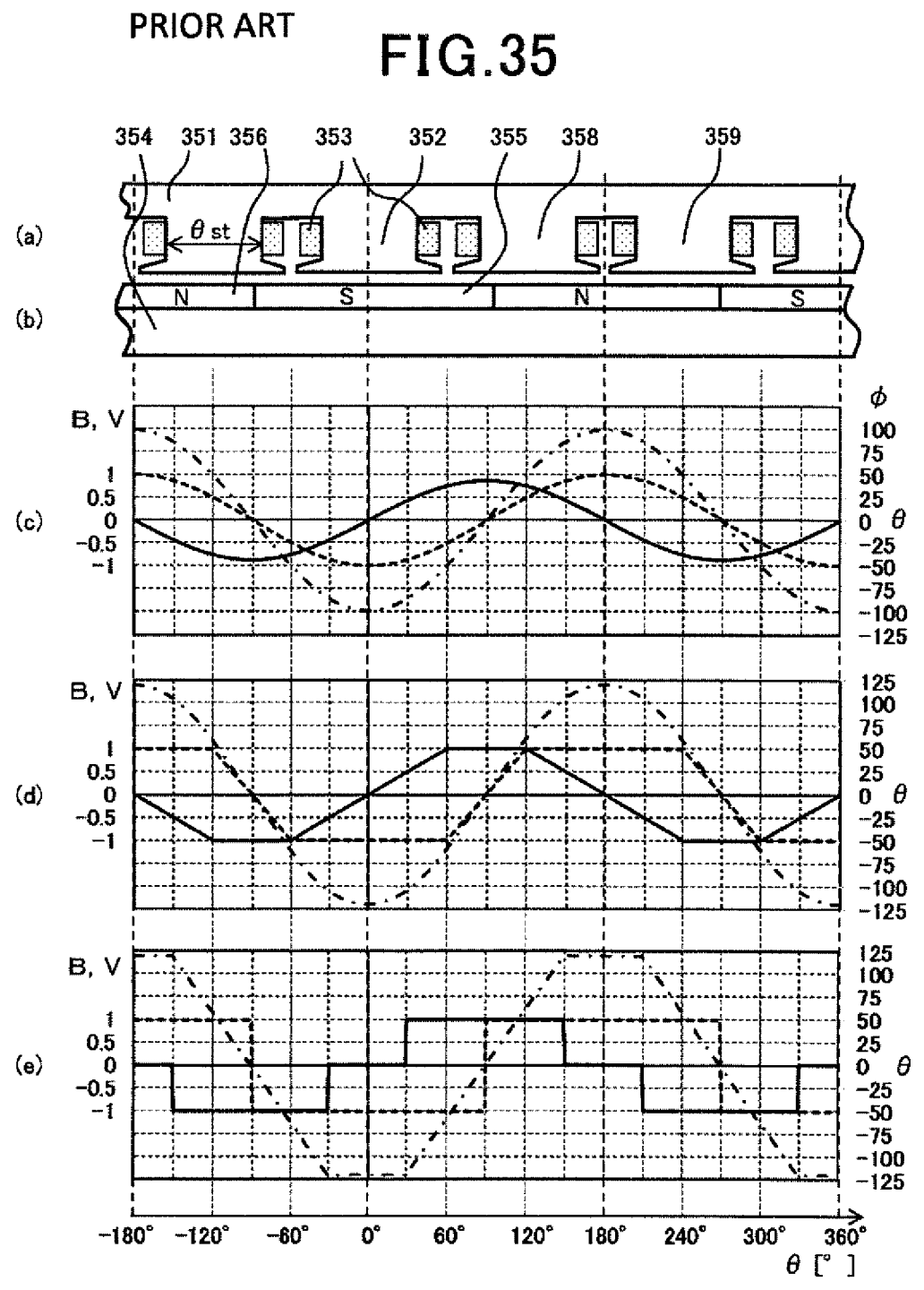

First, the characteristics of the conventional surface magnet synchronous motor SPMSM, shown in FIG. 34, are described for comparison with the inventive motor shown later. Examples of the distribution of the magnetic flux density B, the interlinkage flux φ passing through the concentrated windings, and the induced voltage V generated in the concentrated windings of this surface magnet synchronous motor SPMSM are shown and described in FIGS. 35(c), (d), and (e). The horizontal axis in FIG. 35 shows the electrical angular position θ [°] of the rotation angle relative to the center position of the U-phase stator poles 352, and the right direction in FIG. 35 shows the counterclockwise rotation direction CCW in FIG. 34. The rotational angle position θ [°] common to (a), (b), (c), (d), and (e) in FIG. 35 is shown at the bottom of FIG. 35. The U-phase stator pole 352 in FIG. 35 corresponds to one portion 342 shown in FIG. 34. The rotation angle position θ [°] is the rotational angle position of the center position of rotor pole 345 in FIG. 34 and the center position of a rotor pole 355 in FIG. 35. The rotation angle position θ [°] is also the rotor rotation angle position θ [°].

The dashed line shown in (c) of FIG. 35 shows a magnetic flux density B at the air gap surface of each stator pole at the rotor rotation angle position θ=0 [°]. The maximum value of this magnetic flux density B is normalized and its maximum value is 1.0. The magnetic flux density B shown in FIG. 35 (c) is an example of a sinusoidal distribution, with the value of magnetic flux density B shown on the left-hand axis.

The one-pointed chain line shown in (c) of FIG. 35 shows a magnetic flux φ passing through the U-phase stator poles 352 and interlinked with the concentrated winding 353. In this calculation, when the magnetic flux density B is 1.0, the magnetic flux φ at an electric angle of 1 [°] in the circumferential angle width is 1.0. For example, if the magnetic flux density B=1.0 and is uniform and the stator pole width is 90 [°] in electric angle, an interlinkage flux φ=90, and values of the interlinkage flux φ are shown on the right-hand axis in part (c) of FIG. 35. The circumferential width of the U-phase stator pole 352 is 120 [°] in electric angle, and the maximum positive and negative values of the interlinkage flux φ are 99.24.

The solid line in FIG. 35 (c) shows an induced voltage of the concentrated winding 353, V, and the induced voltage V is shown standardized on the left-hand axis. In this showing, the rotor is assumed to rotate at a constant speed to the CCW direction. The induced voltage V is expressed by the following equation when the number of turns of the concentrated winding 353 is Nw [turn].

$$V = Nw \times (d\varphi/dt) \tag{1}$$

$$= Nw \times (\Delta\varphi/\Delta t) = Nw \times (\Delta\varphi/\Delta\theta) \times (\Delta\theta/\Delta t) \tag{2}$$

The value of the induced voltage V is normalized, with the maximum positive and negative values being 1.0. $\Delta\theta/\Delta t$ indicates a rotor rotation speed. In the calculations for the diagram in FIG. 35, a minute rotation angle $\Delta\theta$ is set to an electric angle of 1.0 [°]. A minute interlinkage flux $\Delta\varphi$ indicates an amount of interlinkage flux that changes in response to the minute rotation angle $\Delta\theta$. From these relationships, the number of turns Nw [turn] and the rotor rotation speed $\Delta\theta/\Delta t$ can be expressed as follows.

$$Nw \times (\Delta\theta/\Delta t) = 1/2 \tag{3}$$

Furthermore, in (c) of FIG. 35, the solid line shows the shape of the waveform of the induced voltage V. By comparing the waveform shape of the induced voltage V with this waveform shape, the magnitude of the torque can be evaluated relative to a conventional sinusoidal drive. As shown later in equations (23) and (25), an induced voltage constant Kv and a torque constant Kt are the same value. It is noted that equation (1) shows a qualitative relationship, and the values of magnetic flux density B and induced voltage V are normalized. Thus, conversion processes are necessary to obtain accurate values.

The solid waveform showing the induced voltage V indicates the induced voltage of the concentrated winding 353 when the rotor is rotating at a constant speed in the CCW direction. In this sense, if the horizontal axis of the solid induced voltage V is considered as a time axis, the rotor rotation position G at each point in time can be seen as indicated by G in the lower part of FIG. 35. Conversely, in a static state, the induced voltage V does not occur, and if it is not seen as such, the meaning shown in FIG. 35 is contradicted. In FIG. 35, only the induced voltage V of the U phase of the 353 concentrated winding is shown, and the induced voltages of the other V and W phase windings generate the same voltage waveforms, but the voltage phases differ by 120 [°] in electrical angle, respectively.

The characteristic in (c) of FIG. 35 has a sinusoidal distribution with the magnetic flux density B normalized to an amplitude of 1.0, shown by the dashed line. The induced voltage Vu of the U-phase concentrated winding 353 was 0.866 in the normalized amplitude. A positional relationship of the stator shown in (a) of FIG. 35 and the rotor shown in (b) of the same figure is set so that the phase of the U-phase voltage Vu is 0 [°]. Although not shown, the induced voltage of the V-phase stator pole 357 has a phase delay of 120 [°] and the induced voltage of the W-phase stator pole 358 has a phase delay of 240 [°].

As will be explained in more detail later in FIG. 21 and other figures, when it is assumed that the torque T and power P provided by a sinusoidal AC voltage and sinusoidal AC current with an amplitude 1.0 is set to 1.0, the torque T and power P provided by a square wave AC voltage and a square wave AC current with an amplitude 1.0 is set to 2.0. The torque T and power P are thus doubled. For example, in the case of a trapezoidal AC wave with an amplitude of 1.0, a rising width of 30 [°] at an electric angle, a flat part width of 120 [°] at an electric angle, and a falling width of 30 [°] at an electric angle, the torque T and power P are 1.555 times greater. A short-pitch coefficient of 0.866 is also converted to 1.555/0.866=1.7956 times. Furthermore, as will be explained in detail later, if the rotor surface magnetic flux density B is increased from 1.2 [T] to 1.8 [T], it is calculated that 1.7956×1.8/1.2=2.6934 times the torque T and power P are obtained. According to the calculations, the torque T and power P are 2.333 times greater than the torque T and power P, even if the short-pitch coefficient of 0.866 is excluded from the consideration.

The following is an explanation of how to calculate each of the values shown in (c) of FIG. 35 using chart-calculating software. First, the distribution of the magnetic flux density B, shown by the dashed line, is represented by a number sequence with a resolution of 1 [°] electrical angle. Next, the interlinkage fluxes φ of the concentrated winding 353 of the U-phase are summed for each width of 120 [°] electric angle to make a number sequence for each rotor rotation position θ. The interlinkage flux φ is shown by a single dotted line. Next, the U-phase voltage Vu of the U-phase concentrated winding 353 is obtained as a number sequence representing differences of the interlinkage flux φ based on the equations (2) and (3). FIG. 35 (c) shows a scatter plot of these values.

The purpose of the calculation algorithm shown in this example (c) of FIG. 35 is to obtain the induced voltage waveform when the magnetic flux density distribution of the rotor is not a sinusoidal wave but a rectangular wave, trapezoidal wave, or other irregular-shaped flux density distribution, and the winding pitch is not 180 [degrees] in electric angle. FIG. 35 (c) is an example of a sinusoidal magnetic flux density distribution. The foregoing can be applied to examples of rectangular or trapezoidal wave magnetic flux density distributions. In those cases, the winding pitch is 216 [°], for example, when there are five stator poles and six rotor poles. Under such conditions, the same algorithm can be used to calculate the induced voltage waveform. As described above, a sinusoidal AC voltage waveform with an amplitude of 0.866 was obtained for the sinusoidal magnetic flux density distribution of (c) in FIG. 35 and a pitch of 120° for the concentrated winding. This value is consistent with the short-pitch coefficient cos ((180°−120°)/2)=0.866 in sinusoidal AC theory, confirming the correctness of this algorithm.

It is noted that when graphs of magnetic flux density distribution, voltage waveforms, etc. are displayed in the range of 0° to 360°, the magnetic pole boundaries are visually difficult to see. For this reason, each characteristic is displayed with an extended display range from −180° to 360°. If the display range does not need to be extended, the characteristics from 0° to 360° are displayed. The distributions of magnetic flux density B, interlinkage flux φ of the concentrated winding, and induced voltage V of the concentrated winding, which are according to the present disclosure, are calculated using Microsoft Excel spreadsheet software. The specification also presents the terms and conditions of the calculations. Thus, anyone can use equivalent spreadsheet software to reproduce the characteristic charts shown in the disclosure.

The next example is shown in FIG. 35 (d). The magnetic flux density B of the motor shown in FIG. 34 has a distribution which has a trapezoidal shape with an increasing portion of 30 [°], a flat portion of 120 [°], and a decreasing portion of 30 [°], as shown by the dashed line, with S and N poles. The winding pitch is shown as a single dotted line for the interlinkage flux φ of the concentrated winding 353 of the U phase with an electrical angle of 120 [°]. A U-phase voltage Vu is shown as a solid line. This voltage Vu has a trapezoidal wave shape with an increasing part of 60 [°], a flat part of 60 [°], and a decreasing part of 60 [°]. Thus, for a 120 [°] short-pitch winding, the shape of the U-phase voltage Vu changes with respect to the shape of the magnetic flux density distribution.

As shown in FIG. 35 (c), when the magnetic flux density distribution is sinusoidal, the voltage induced in the 120 [°] short pitch winding has a magnitude of 0.866 short-pitch coefficient, but its shape is the same sinusoidal shape. In contrast, it is noted that, for shapes other than the sinusoidal distribution, and if the winding pitch is other than 180 [°], the shape also changes. In the case of full-pitch winding with a winding pitch of 180 [°] electrical angle, the shape of the magnetic flux density distribution and the waveform shape of the voltage are the same.

In the graph in (d) of FIG. 35, it is assumed that the current is energized with the same shape as the voltage shape. In this case, the torque is 1.283 times higher than in the sinusoidal case shown (c) in FIG. 35. However, when the magnetic flux density of the rotor in FIGS. 34 and 35 is increased to 1.8 [T] or close to that value, as described above, the slot cross-sectional area where the winding is wound becomes smaller. This rather results in a reduction in torque.

Next, an example shown in a part (e) of FIG. 35. In the motor shown in FIG. 34, a distribution of magnetic flux density B has S and N poles each having a 180 [°] wide rectangular wave shape, as shown by the dashed line. An interlinkage flux φ of the U-phase concentrated winding 353, whose winding pitch is 120 [°] in electrical angle, is shown by a dotted line, and its U-phase voltage Vu is shown by a solid line. As shown in the figure, the waveform shape of the U-phase voltage Vu is a 120 [°] wide square wave. Thus, in a case where there are provided a 120 [°] short-pitch winding and a flux density B of 180 [°] wide, a voltage of 120 [°] wide can be generated. However, when the magnetic flux density of the rotor in FIGS. 34 and 35 is increased to a value such as 1.8 [T], as described above, the slot cross-sectional area where the winding is wound becomes small. This is also rather attributed to the problem of reduced torque.

As a conventional example, motors with fractional slots are known. This motor is referred to as a fractional motor in which the number of slots, q, in each phase per pole is a fractional number. For example, for a concentrated winding motor with 9 stator poles and slots and 8 rotor poles, the number 9 is given such that q=(9 slots)/ (3 phases×8 poles)=3/8. This is referred to as a 3-phase concentrated winding motor with fractional slots. In this motor, a short-pitch coefficient is cos 10°=0.9848 and a distribution coefficient is (1+2×cos 20°)/3=0.9598. Therefore, the winding coefficient is 0.9452, which can be relatively large. In addition, since the three windings with slightly different phases are connected in series, harmonic components can be canceled out. Furthermore, this configuration has a feature of reducing torque ripples. However, when the magnetic flux density of the rotor is increased up to about 1.8 [T] to increase the motor's torque, the slot cross-sectional area where the stator windings are wound becomes smaller. As a result, the torque is rather reduced. In addition, when a trapezoidal shape of the induced voltage is attempted for higher torque, the foregoing canceling effect of the harmonic components becomes disadvantageous, which is detrimental to the trapezoidal shape.

As another conventional example, a concentrated winding motor with 12 stator poles and slots and a 10-pole rotor is also be provided. This motor is structured as being q=(12 slots)/(3 phases×10 poles)=2/5 and is offered as a 3-phase concentrated winding motor with fractional slots. This motor also has similar characteristics to those described above and has the foregoing features. However, in the case of this motor, the slot cross-sectional area becomes smaller when the magnetic flux density increases to about 1.8 [T].

The winding form in which the winding is concentrated on each tooth of the stator has a different meaning from the original concentrated winding in some aspects. For this reason, the name of a motor that winds windings concentratedly on each tooth is sometimes referred to as a magnetically concentrated winding motor. However, since there is no confusion in the form of winding in this specification, motors in which windings are wound concentratedly on each tooth will be referred to as concentrated winding motors.

The motor configuration is symbolized by the number of stator poles PS (NS) and the number of rotor poles PR (NR). For example, a motor provided with stator poles whose number is NS=7 and rotor poles whose number is NR=8 is referred to as a 7S8R motor. Motors in which this motor 7S8R configuration is arranged circumferentially, with only a multiple of the pole pair number, NN1, shall also be included in each of the disclosed issues of this application. That is, the motor configuration 7S8R shall implicitly include motors such as 14S16R and 21S24R. According to this way of expressing the motor configuration, "(the number of stator poles in the minimum configuration NS)/(the number of pole pairs in the minimum configuration NR/2)" is an irreducible fraction. For example, for motors such as 7S8R, 14S16R, and 21S24R, applying this formula yields 7/4, where 7/4 is an irreducible fraction. An irreducible fraction is a fraction that cannot be further subdivided, or a fraction whose denominator and numerator are prime to each other.

The number of stator poles corresponds to the number of slots between respective adjacent two teeth of the whole stator teeth. A division of (the number of slots)/(pole pair number) is a fraction. A motor with a configuration like the above is called a fractional-slot motor. However, the present disclosure also includes a configuration that adds a bypass magnetic path PBP in the circumferential middle between the conventional slots. Furthermore, in the present disclosure, the slot is to be divided into two parts on both sides of the magnetic path PBP. Hence, in such a configuration, the number of slots changes to twice as many. The term "fractional slot" is not positively used in the present specification because it is confusing.

In the present disclosure, alphabets and other letters and symbols used shall be treated as different characters, using upper- and lower-case letters separately, and full-width and half-width characters shall be treated as the same character without distinction. When displaying characteristics such as magnetic flux density distributions and voltage waveforms in graphs as described above, the display range is extended to a range of −180° to 360° in terms of electrical angle because the magnetic pole boundaries are visually difficult to see in the 0° to 360° range. If the display range does not need to be extended, the characteristics provided in a range of 0° to 360° are displayed.

First Embodiment

Next, a cross-sectional view of the motor according to a first exemplary mode is shown in FIG. 1. In FIG. 1, a reference number 11 indicates a stator, a reference number 14 indicates a rotor, and a reference number 17 indicates a rotor shaft, respectively. The number of stator poles is 7 and the number of rotor poles is 8, which is referred to as a 7S8R motor configuration in the present disclosure. A reference number 12 is the first-phase stator pole, and a reference number 13 is a concentrated winding wound around the first-phase stator pole 12. A stator pole 18 is a phase with a phase delay of circumferential pitch θsp=205.71 [°] relative to the first-phase stator pole 12 in the circumferential direction of the stator poles. The voltage phases of the respective stator poles differ, mutually and relatively, in phase by an integer multiple of 360/7=51.43 [°]. A concentrated winding is wound around the stator pole in each phase. A circumferential center position of the first-phase stator pole 12 is set as the position of a motor rotation angle θ=0 [°], and the CCW direction is defined as the positive direction. A reference number 15 indicates the first rotor pole among the rotor poles. The rotation start point of the rotor is set as the circumferential center position of the first rotor pole 15, and the rotation in the CCW direction is set as a positive rotation on the paper in FIG. 1. A reference number 16 indicates the second rotor pole. Reference numbers 15 and 16 indicate S-pole and N-pole permanent magnets, respectively. The S- and N-pole permanent magnets are arranged alternately in the circumferential direction. The circumferential boundary (i.e., magnet-to-magnet) portion between the permanent magnets of respective rotor poles is composed of a space, i.e., a pole-to-pole space.

Figure 2:
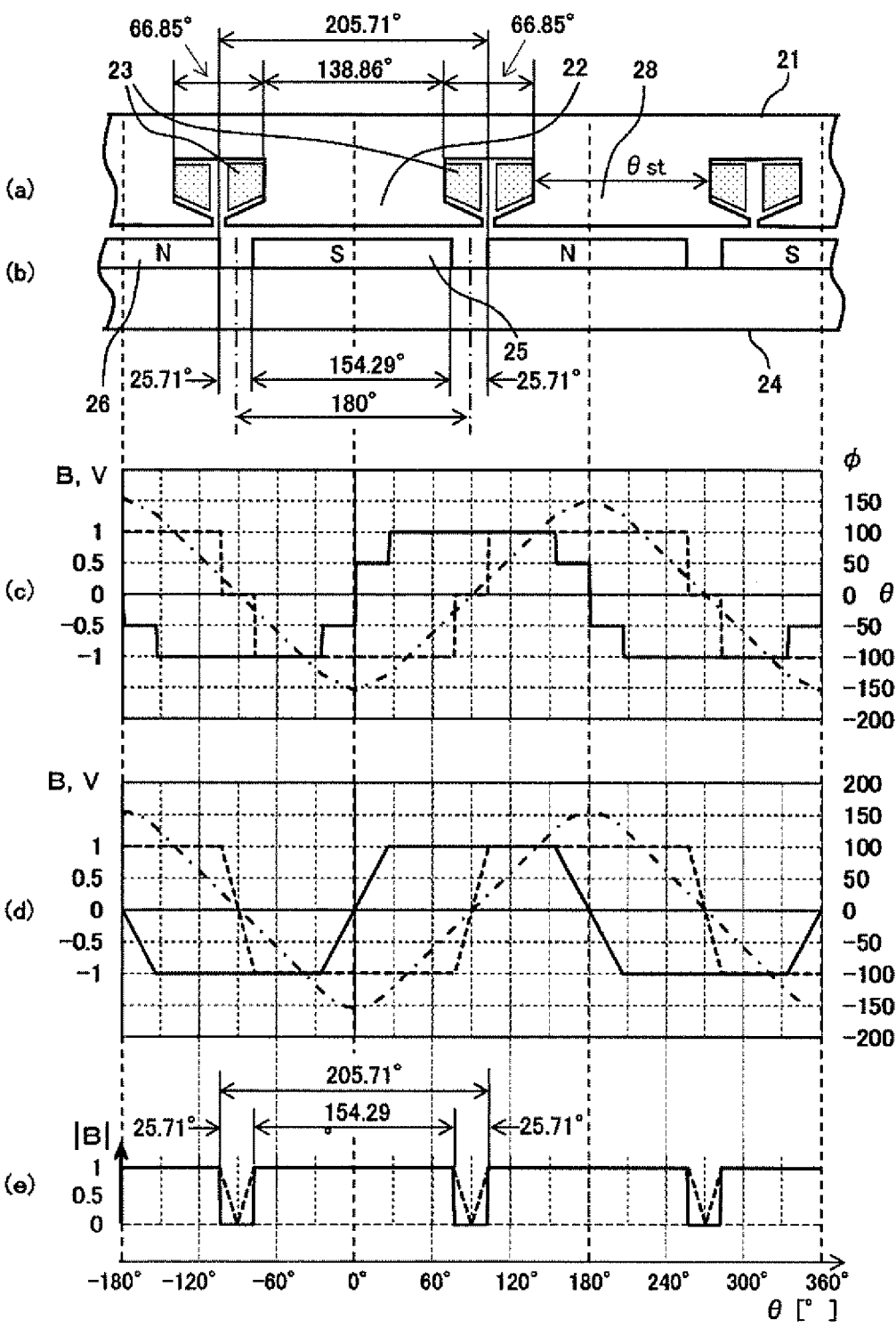
FIG. 2 is an illustration exemplifying a distribution of magnetic fluxes, states of interlinkage magnetic fluxes, and induced voltages.

The configuration shown in FIG. 2 will then be described. FIG. 2 shows a development of the motor shown in FIG. 1, with the cross-section of the motor transformed into a straight line. This development shows a portion of the motor in FIG. 1, and the outside of the dashed portions on the left and right in (a) and (b) of FIG. 2 are omitted. The right direction on the paper in FIG. 2 indicates the counterclockwise rotation direction CCW on the paper in FIG. 1. A reference number 21 in (a) of FIG. 2 shows the stator and a reference number 24 in (b) of FIG. 2 shows the rotor. A reference number 22 corresponds to the first-phase stator pole 12 in FIG. 1 and is provided as the first-phase stator pole. A reference number 28 shows a stator pole with a phase delay of 205.71 [°]. A reference number 23 shows the concentrated winding wound around the first-stator pole 22. A reference number 25 corresponds to the first rotor pole 15 in FIG. 1 and is provided as an S-pole permanent magnet. A circumferential pitch between the permanent magnets is 180 [°] in electric angle. A reference number 26 shows an N-pole permanent magnet.

Since this motor has the 8 poles, the total circumference of the motor is 360×4=1440 [°] in electrical angle. The circumferential pitch θsp of the stator poles is 1440/7=205.71 [°]. The circumferential width θrt of each permanent magnet is 180−(205.71−180)=154.29 [°] in electric angle. In a concave space between the mutually adjacent permanent magnets, the circumferential width θou of a part with a small magnetic flux density is 25.71 [°]. The stator pole 22 has a portion facing the air gap, and the circumferential width θstg of this portion is the same as the circumferential pitch θsp of the stator poles, which is 205.71 [°]. The circumferential width of each slot opening is idealized, modeled, and assumed here as 0 [°].

Next, the tooth width θst of the flux-passing portion of the first-phase stator poles 22 will now be explained. Since the angular width θst of each tooth portion through which magnetic flux of the stator pole passes and the circumferential angular width θss of each slot are aligned in the circumferential direction, the sum of such angular widths is provided as a stator-pole circumferential pitch θsp, which is a constant value. If the number of stator poles is NS2 and the number of rotor poles is NR2, as described above, the stator-pole circumferential pitch θsp is 180×NR2/NS2 [°].

$$\theta sp = 180 \times NR2/NS2 = 180 \times 8/7 = 205.71 \tag{4}$$

$$\theta sp = \theta st + \theta ss \tag{5}$$

Therefore, especially when the magnetic flux density B of the rotor poles, i.e., the rotor's permanent magnet, is a large value, the circumferential angle width θss of each of the slots must be larger in order to wind more stator windings. From this point of view, from equation (5), a smaller stator-tooth angle width θst is preferable. Conversely, however, a larger magnetic flux φ passing through the stator poles 22 and interlinking to the windings 23 produces a larger torque. That is, such two angle widths, θst and θss, have a trade-off relationship. From the relationship in equation (5), the selection of the number of stator poles NS2 and the number of rotor poles NR2 in equation (4) takes precedence in order to obtain the proper value of θsp, and the various combinations will be described later.

Now, the rotor rotation position θ shown in FIG. 1 and the partial views (a) and (b) in FIG. 2 is a rotor rotation position θ=0 [°] where the magnetic flux φ of the rotor poles passing through the first-phase stator poles 12 and the first-phase stator poles 22 shows a negative maximum. Then, in the partial view (b) of FIG. 2, it is assumed that the maximum surface magnetic flux density Bagm of the permanent magnet of each rotor pole is set to a large value, for example, 1.8

[T], and the magnetic flux density is uniform during the circumferential width θrt of the permanent magnet. Furthermore, it is assumed that the maximum magnetic flux density Bstm of the electromagnetic steel sheets used for each stator pole is 2.0 [T]. The following equation is obtained under the condition that the rotor position θ=0 [°] in the partial view (b) of FIG. 2 and the tooth width θst of each of the stator poles is the smallest value.

$$\theta rt \times Bagm = \theta st \times Bstm$$

$$\theta st = \theta rt \times Bagm/Bstm = 154.29 \times 1.8/2.0 = 138.86 \tag{6}$$

Therefore, from equation (5), the circumferential angle width θss of each of the slots is 205.71−138.86=66.85 [°]. This value of θss=66.85 [°] is a practical size for a motor.

Next, a partial view (c) of FIG. 2 shows an example of the following characteristics showing a permanent magnet flux density 1.8 [T], a circumferential width of permanent magnet θrt=154.29 [°], a circumferential pitch of stator poles θsp=205.71°, a stator flux-passing portion tooth width θst=138.86 [°], and a slot width θss=66.85 [°], respectively. In the partial view (c) of FIG. 2, the dashed line shows the magnetic flux density B in each portion of the stator at the rotational angle position θ=0 [°] of the rotor. The magnetic flux density of the dashed line can be considered as the magnetic flux density in the air gap on the center line of the stator poles 22, obtained when the rotor rotates in the CCW direction and the rotor rotation position is θ. The same values are thus shown in such a rotated state. The left axis shows 1.8 [T], normalized to a maximum value of 1.0. The spreadsheet calculations are rounded off and 154.29 [°] is approximated to θrt=154 [°]. In calculating θou the boundary, i.e., the pole-to-pole portion, of the rotor poles, 25.71 [°] is approximated to 26 [°] and its magnetic flux density is 0 [T]. The single-dotted line shows the interlinkage flux φ of the concentrated winding 23 on each of the first-phase stator poles 22, which is obtained when the rotor rotates to in the CCW direction and the rotor position is 8. The value of its interlinkage flux φ is shown on the right-hand axis. When the magnetic flux density B is 1.0, the magnetic flux φ at an electric angle of 1 [°] in the circumferential angle width is 1.0. Since the magnetic pole width θrt of the air gap surface of the S-pole permanent magnet 25 is about 154 [°], the maximum value of the interlinkage flux φ shown by the single-pointed line is 154.

The solid line in (c) of FIG. 2 shows the induced voltage V of the concentrated winding 23, when the rotor rotates to CCW at a constant speed and the rotor position is θ. This induced voltage is calculated according to the equations (1), (2), and (3). To summarize the operations on the diagram calculation software, this induced voltage is a value which can be obtained by dividing, by 2, a difference between the values of respective 1 [°] of the chain flux φ. The values of the induced voltage V are shown on the left-hand axis and are a normalized value, with a maximum value of 1.0. As explained in the example in FIG. 35, the waveform of the induced voltage V is an induced voltage of the concentrated winding 353 in a state where the rotor rotates to CCW at a constant speed shown in equation (3). In this sense, the horizontal axis of the curve of the solid induced voltage V can be considered as a time axis, and the rotor rotation position θ at each time can be seen as indicated by θ in the lower part of FIG. 2.

When the winding pitch of the concentrated winding 23 is obtained as 206° electromagnetically, the induced voltage V has a staircase-like waveform which is different from the distribution shape of the magnetic flux density B shown by the dashed line. This waveform has a sharp staircase shape because it is a modeled calculation. In reality, however, it is assumed that the voltage waveform will be smoothed out a little bit due to leakage flux near the boundary of the magnet poles. This solid staircase waveform can also be seen as an abbreviated trapezoidal shape.

In an electrical view, the product of voltage V and current I is power P, whilst, in a mechanical view, the product of torque T [N·m] and rotational angular velocity dθ/dt [rad/sec] is power P. By neglecting internal losses such as winding resistance and motor friction and ignoring stored energy such as magnetic energy, equation (7) is obtained.

$$P = V \times I = T \times d\theta/dt \qquad (7)$$

At a constant rpm, power P and torque T are proportional to each other. Equation (7) is also expressed for one phase of a motor which is shown for example in FIG. 1. However, this can be extended to consider (V×I) in equation (7) as the sum of all phases of the product of the induced voltage V and current I, and T in equation (7) as the torque output of the entire motor.

The induced voltage of the winding of the stator pole 28 is a voltage with a phase delay of 205.71 [°] in electric angle with respect to the induced voltage shown by the solid line in (c) of FIG. 2. The voltage phases of the five stator poles further to the right shown in (a) of FIG. 2 are 51.43 [°], 257.14 [°], 102.86 [°], 308.57 [°], and 154.29 [°] phase lag, respectively. The respective voltages form 7-phase voltages with phase delays which are integer multiples of 360/7=51.43 [°].

Next, when a permanent magnet is placed in the space between the permanent magnets shown in (b) and (c) of FIG. 2, its magnetic flux density gradually changes between the N and S poles. A distribution of that gradually changing magnetic flux density B is exemplified in (d) of FIG. 2. As shown by the dashed line, the magnetic flux density B has a trapezoidal shape with an increasing portion of 13 [°], a flat portion of 154 [°], and a decreasing portion of 13 [°], and the distribution of magnetic flux density B alternates between the S and N poles. The single-pointed line shows the interlinkage flux φ of the concentrated winding 23, as in (c) in FIG. 2, and its value is shown on the right-hand axis. The solid line shows the induced voltage V of the concentrated winding 23 when the rotor rotates to CCW at a constant speed and the rotor position is θ. The induced voltage V is normalized. The waveform shape of the induced voltage V has a trapezoidal waveform shape with a voltage increasing part of 26 [°], a constant voltage part of 128 [°], and a decreasing part of 26 [°], resulting in an AC voltage with positive and negative values. The solid voltage V shown in (d) of FIG. 2 has a different waveform shape in the area where the voltage changes between positive and negative values, compared with the solid voltage V shown in (c) of FIG. 2. The average voltage is the same. Both of the voltages are sufficiently large compared to sinusoidal voltages of the same amplitude and are good voltage waveforms.

Next, the features and effects of the examples in FIGS. 1 and 2 will now be explained. The present disclosure aims to achieve higher torque, smaller size, lighter weight, and lower manufacturing cost for permanent magnet type concentrated winding motors. To realize these requirements, the following requirements are required at the same time. The motor configuration must be such that the phases of each stator pole can be secured; the induced voltage of each winding must be trapezoidal with a larger effective voltage compared to a sinusoidal wave of the same amplitude; a slot cross-sectional area should be secured for winding a reasonable number of windings in the stator while the magnetic flux density of the rotor poles is large enough to be the maximum flux density of a soft magnetic material, for example, 1.8 [T]; the drive circuit must be capable of freely driving currents such as square waves, trapezoidal waves, and sinusoidal waves, and the operating rate and utilization rate of each part of the motor and each part of the drive circuit must be high. In addition, multi-phasing such as 7-phase is effective for low torque ripple, low vibration and low noise. The embodiment shown in FIGS. 1 and 2 meet all of these requirements. The distribution shape of the magnetic flux density B shown by the dashed line in (d) of FIG. 2 is trapezoidal, which is advantageous in terms of vibration and noise of the motor because the changes in the attractive force between the stator poles and the rotor can be smoother than in a rectangular shape. The details of the individual technologies and driving circuits will be explained later.

Figure 3:
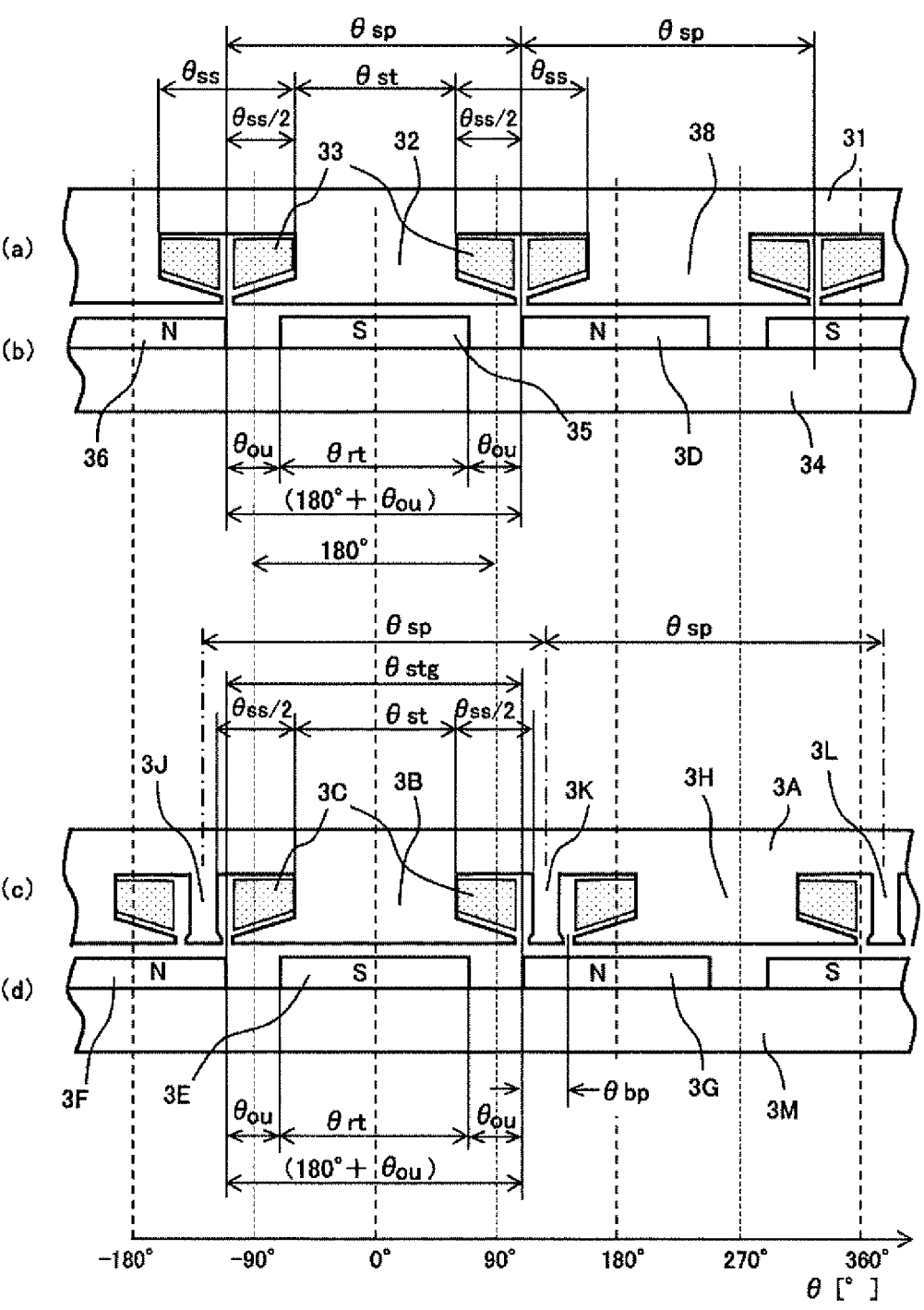
FIG. 3 is an example showing a linearly developed view of the motor according to the present disclosure.

Next, (a) and (b) of FIG. 3 shows generalization of the linear developments shown in (a) and (b) of FIG. 2, in which each shape of the parameters is shown and a correlation between the motor parameters θsp, θst, θss, θrt, and θou is explained. For example, this can be applied to various motor configurations such as 4S6R, 5S6R, 7S8R, 8S10R, etc. For examples of specific values of the motor parameters, the motor characteristics are shown with the distribution of magnetic flux density B of the rotor, interlinkage flux φ of the windings, and the induced voltage V. The motor characteristics are outlined as follows.

The shapes shown in (a) and (b) of FIG. 3 are similar to those shown in (a) and (b) of FIG. 2. A reference 32 shows the first-phase stator pole and a reference 33 shows the concentrated winding around the first-phase stator pole 32. A reference 38 indicates a stator pole having a phase delayed by the stator pole pitch θsp. The right direction on the paper in FIG. 3 corresponds to the direction of CCW, and this direction is employed as the positive direction. Concentrated windings are wound around the stator poles of each phase, respectively. The circumferential center position of the first-phase stator pole 32 is set as the position where the rotation angle θ of the motor is 0 [°]. A reference 35 is the first rotor pole among the rotor poles, the starting point of the rotor is the circumferential center position of rotor pole 35, and rotation in the CCW direction is taken as the positive rotation in FIG. 3. A reference 36 is the second rotor pole. The first rotor pole 35 is an S-pole permanent magnet and the second rotor pole 36 is an N-pole permanent magnet, with the S and N poles located alternately in the circumferential direction. A boundary portion, i.e., magnet-to-magnet portion or inter-magnet portion, located between two of the permanent magnets composing the rotor poles is composed of a space, i.e., magnet-to-magnet space or inter-magnet space, as shown, in this example. This space can be composed of a non-magnetic and a non-conducting material, such as resin with non-electromagnetic action. Permanent magnets with various magnetic flux distributions may be placed in this space. Such a magnetic flux distribution may be a trapezoidal distribution of the magnetic flux density B in the circumferential direction, as shown in (d) of FIG. 2 by the dashed line. It should be noted that the structure shown in FIG. 3 does not specify the structure of the entire motor, so that it may be generalized to be applied to motor configurations of various types of structures. The circumferential pitch of the stator poles is denoted by θsp, the angular width of the portion of the teeth through which magnetic flux of the stator poles passes is denoted by θst, and the circumferential width of each of the slots is denoted by θss. The circumferential width of each permanent magnet in the rotor is denoted by θrt, while the circumferential width of the space which is formed between mutually adjacently located permanent magnets or the portion where the magnetic flux density decreases is denoted by θou.

Though the respective motor parameters θsp, θst, θss, θrt, and θou have already been explained, the structures shown in (a) and (b) of FIG. 3 will now be explained again. Each angular width is expressed in electric angle [°]. A symbol θsp shows a circumferential pitch of the stator poles and is indicated by the relationship in equation (4). A symbol θst shows a width of the portion of the tooth through which the magnetic flux of the stator poles passes, and a symbol θss shows a circumferential width of each slot, which are combined by the relationship in equation (5).

The pitch θrp of the rotor poles is, of course, 180 [°]. The circumferential width θrt of each of the permanent magnets on the rotor side and the circumferential width θou of the small portion of magnetic flux density, which is the concave space between the mutually adjacent permanent magnets, are shown by the following relationship.

$$\theta rt + \theta ou = 180 \tag{8}$$

If the angle width θrt is larger, more magnetic flux φ effective for torque generation can be supplied to the stator poles. If the other angle width θou is larger, the one angle width θrt is smaller, so that The maximum value of interlinkage flux φ of the stator windings decreases. Therefore, the tooth width θst of each of the stator poles becomes smaller based on the relationship defined in equation (6). According to the relationship of both equation (5) and especially equations (11) and (12) shown below, the circumferential width θss of each of the slots can be increased, and the number of windings can be increased.

Here, it will be explained how to make the slot cross-sectional area Sss, where the stator windings are wound, larger in a state where the magnetic flux density Bagm on the air gap surface of each of the rotor poles is large. For example, it is assumed that a situation where the maximum magnetic flux density Bstm of a soft magnetic steel sheet is assumed to be 2.0 [T] and Bagm is 1.8 [T]. Based on this assumption, a method to increase the slot cross-sectional area Sss or the circumferential width θss of each of the slots is considered. To begin with, since the objective is to obtain a large torque, the magnetic flux density Bagm of each of the rotor poles must be large, the circumferential width θrt of each of the rotor poles must be large, and the circumferential width θss of each of the slots in which the winding is wound must be large, at the same time.

Examples of configurations that meet these requirements are illustrated in (a) and (b) of FIG. 2 and in (a) and (b) of FIG. 3. Here, the relationship between the circumferential angle width θsp of each stator pole and each angle width, corresponding thereto, of the rotor is defined by the following equation.

$$\theta sp = 180 + \theta ou \tag{9}$$

$$= \theta rt + 2 \times \theta ou \tag{10}$$

Here, the stator pole width θsp is equal to or greater than 180 [°] and includes two circumferential widths θou in which the magnetic flux density is small. As shown in equation (12), this condition can increase the winding amount because the two widths θou can be utilized to expand the circumferential width θss of each of the slots.

Here, the aforementioned circumferential width θou=0 [°]. For this reason, it is considered the state in which there is no space between the S-pole permanent magnet 35 and the N-pole permanent magnet 36 and no space between the S-pole permanent magnet 35 and the N-pole permanent magnet 3D in part (b) of FIG. 3, and the respective rotor permanent magnets are adjacent to each other in the circumferential direction. When the stator pole pitch θsp becomes larger than 180 [°], some of the N-pole flux circulates with the S-pole flux in the teeth of the stator pole 32 even at the rotor rotation position θ=0 [°], as shown in parts (a) and (b) of FIG. 2, where the magnetic flux passing through the stator pole, that is, the interlinkage flux φ in its concentrated winding, is the maximum value. That is, its circulating flux does not pass through the 33 concentrated windings and is cancelled in the teeth. Therefore, this circulating flux, or flux that is canceled out, is a flux component that does not contribute much to generation of the torque. This circulating flux, i.e., the canceled flux, also acts to locally magnetically saturate the magnetic performance of the teeth, which is harmful and problematic in this sense. The conditions described in (a) and (b) in FIGS. 1, 2, and 3, and in Equations (9) and (10) are motor configurations that have a relationship where the canceled magnetic flux, which is this circulating magnetic flux, is exactly 0 [Wb], which is a very convenient motor configuration. However, it is not limited to the configuration described by the formulas (9) and (10), and various states of magnetic flux density distribution in the circumferential width θou can be selected, as shown below.

In the case of the configurations of (a) and (b) shown in FIG. 3, the slot width θss becomes the following equation based on equations (5), (6), (9), and (10).

$$\theta ss = \theta sp - \theta st = \theta sp - (\theta rt \times Bagm/Bstm) \tag{11}$$

$$= \theta rt + 2 \times \theta ou - (\theta rt \times Bagm/Bstm) = 2 \times \theta ou + \theta rt \times (1 - Bagm/Bstm) \tag{12}$$

The second term in equation (12) reduces as the maximum flux density Bagm of each of the rotor poles increases. Therefore, when the maximum flux density Bagm is set to a large value, the increase in the slot width θss is not expected to be large. The circumferential width θss of each of the slots then approaches twice that of the width θou. On the other hand, since the circumferential widths θrt and θou are determined by the relationship shown in equation (8), it is not possible to increase both θrt, which is proportional to the maximum value of interlinkage flux of the stator winding, and θou, which is approximately proportional to the slot cross-sectional area, that is, the amount of winding. The circumferential widths θrt and θou are trade-offs, and thus the circumferential widths θrt and θss are also trade-offs.

Next, the correlation between the circumferential width θrt of each permanent magnet and the circumferential width θss of each slot will now be explained. Based on equations (8) and (9), the circumferential width θrt of each permanent magnet can be written as $$\theta rt = 180 - \theta ou = 180(\theta sp - 180) = 360 - \theta sp \tag{13}$$

Figure 7:
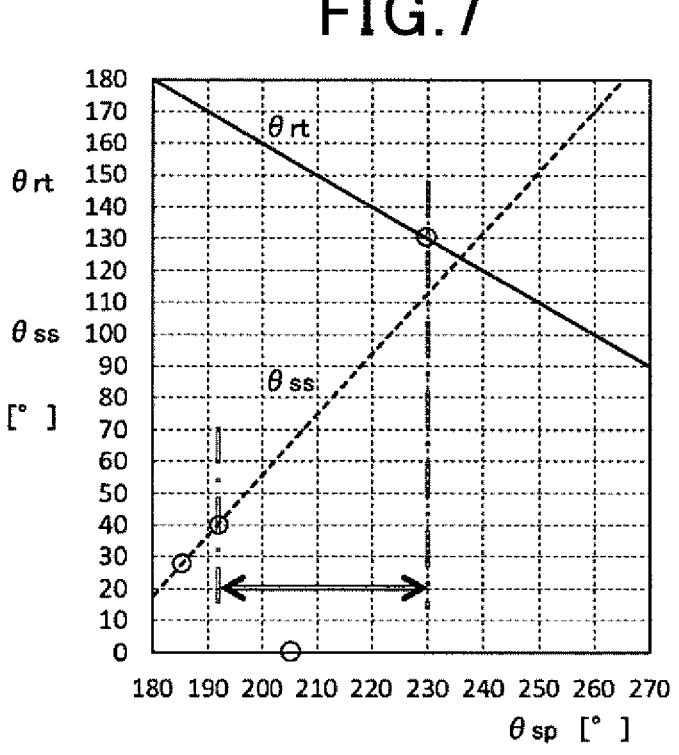
FIG. 7 is a graph showing a circumferential width θrt of each rotor pole and a circumferential width θss of each slot.

Assuming now that the magnetic flux density Bagm of the rotor poles is 1.8 [T] and the maximum magnetic flux density Bstm of the soft magnetic steel sheet is 2.0 [T], the magnetic characteristics with stator pole pitch θsp employed as one parameter are shown in FIG. 7 based on equations (11) and (13).

For example, under the condition that the circumferential width of the slot θss=40 [°] or more, the stator pole pitch θsp is 192 [°] or more and the circumferential width of each rotor pole θrt is 168 [°] or less. Under the condition that the circumferential width θrt of each of the rotor poles is 130 [°] or more, the stator pole pitch θsp is 230 [°] or less and the circumferential width θss of each of the slots is 113 [°] or less. The area that satisfies these two conditions is a range indicated by the arrow line in FIG. 7. This range is a specific, practical range. It can then be further narrowed down from this range to a more suitable value.

The values shown in (a) and (b) of FIG. 2 are the midpoints of these values and represent the operating points when θsp=206 [°], θrt=154 [°], and θss=67 [°]. For example, when considering 28 [°] as the minimum value of the circumferential width of the slot θss, θsp=185 [°] and θrt=175 [°] are given. In this way, the range of parameters allowed by the conditions can be known, and better conditions can be calculated to ensure interlinkage flux and to satisfy both conditions of winding the stator windings. Both of these parameters are trade-offs, with aspects similar to the relationship between magnetic and electrical loading. As will be explained later, changing the Bagm, Bstm, and θou conditions will also change the characteristics shown in FIG. 7.

Figure 8:
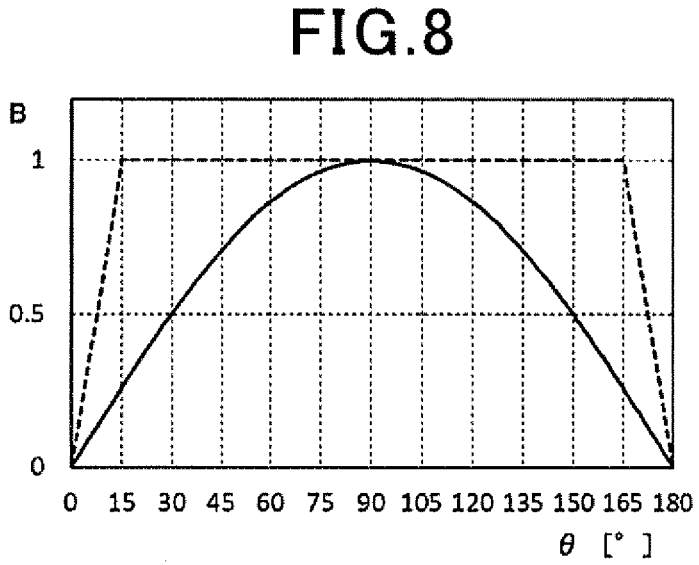
FIG. 8 is a graph showing characteristics of both a sinusoidal-wave distribution and a trapezoidal-wave distribution of magnetic fluxes.

Next, the circumferential width of the slot θss, which is calculated in the present disclosure, is not utilized in conventional motors. The four reasons for this will now be explained below. The second reason is that the characteristics of the region where the magnetic flux density B decreases at both ends of each rotor pole have not been effectively utilized. For example, if the distribution of magnetic flux density B has a sinusoidal waveform shape as shown in FIG. 8, the center is 1.0 and both ends are 0. The average value is thus $2/\pi$=0.63662. Now consider a simplified motor model in which the maximum flux density Bstm of the electromagnetic steel sheets (made of soft magnetic material) of the stator is 2.0 [T] and the maximum flux density Bagm of the rotor poles is 2.0 [T]. Let us assume that the circumferential width θstg of the surface along the air gap of each stator pole is 180 [°] in electric angle, and that its maximum value in the sinusoidal magnetic flux density B distribution in FIG. 8 is 2.0 [T]. The magnetic flux density of 2.0 [T] and 180 [°]×0.63662 passes through the flux-passing portion of the width θst of each stator pole tooth. Therefore, θst=180×0.63662=114.6 [°] is provided. Therefore, the slot width θss formed by the teeth at both ends is (180−114.6)=65.4 [°]. Therefore, the ratio of the slots in the circumferential direction of the stator is 36.34 [%].

By way of comparison, consider the sinusoidal distribution where the maximum value of magnetic flux density B is 2.0 [T] in the case of the conventional motors shown in FIGS. 34 and 35. The circumferential width θstg is 120 [°]=(2π/3), and the maximum value of the passing magnetic flux is the flux in the range of 30 [°] to 150 [°] of the sine wave shown in FIG. 8, whose average value is (2×cos 30°)/(2π/3)=0.827. θst=120×0.827=99.24 [°] is thus provided. The slot width θss is (120−99.24)=20.76 [°], which is 17.3% [%] as the ratio of slots in the circumferential direction of the stator. The ratio drops to about 1/2.

Also consider an ordinary motor with 3 phases, sinusoidal AC, 2-poles full-pitch winding, 12 slots, 12 teeth, and a distribution number of 2. The circumferential width θstg of the surface along the air gap of each stator pole is 30 [°], or (π/6), and the maximum value of the passing magnetic flux is the flux in the range of 75 [°] to 105 [°] of the sine wave shown in FIG. 8, whose average value is (2×cos 75°)/(π/6)=0.9886. For each tooth, θst=30×0.9886=29.66 [°] is provided. The slot width θss is (30−29.66)=0.34 [°], and the slot ratio in the circumferential direction of the stator is 1.13 [%]. This is a small value, and in terms of utilizing the low flux density areas at both ends of each rotor pole, it is a waste of structure. However, when converted to the air-gap section, the magnetic loading is 98.886 [%] and the electrical loading is 1.13 [%], which are not a problematic area according to the common practice of conventional motors. This can also be seen as a simple calculation in the sinusoidal magnetic flux density distribution shown in FIG. 8, where 36.3% of the status pace, that is, (1−2/π)=0.363, which is a region where B is less than 1.0, is not utilized.

The third reason is to utilize not only the area of low magnetic flux density in the range of 0 to 180 [°], as shown in the distribution of the rotor poles in FIG. 8, but also the area of low magnetic flux density of the rotor poles on both sides in the circumferential direction. This is not a problem with conventional motors, but in the present motor, the pitch θsp of the stator poles is widened to a value of 180 [°] or more, such as 210 [°], and areas of low magnetic flux density of the rotor poles on both sides are also utilized for widening the slot width θss. For example, as shown in (e) of FIG. 2 in the example of the present motor shown in FIG. 1, if the rotor pole width θrt=154.29 [°] and the width of the low flux density region θou=25.71 [°], both adjacent rotor pole regions are also utilized on the assumption that the stator pole pitch θsp=θrt+2×θou=205.71 [°]. Therefore, the slot width θss can be increased because twice the width θou can be utilized. The vertical axis shown in (e) of FIG. 2 shows the absolute value of the magnetic flux density B. One of the reasons for setting the pitch θsp of the stator poles to a value of 180 [°] or higher, as described above, is also to provide a relative phase to each of the stator poles as a fractional slot motor.

The fourth reason is that the distribution shape of the magnetic flux density of the rotor poles of the present motor is not sinusoidal, but an abbreviated trapezoidal shape with a shape similar to a square wave to increase torque. Here, when the maximum flux density Bagm of the rotor pole approaches the maximum flux density Bstm of the soft magnetic material of the stator pole, the slot width θss must depend on the width θou of the low flux density region, as shown in equation (12). When considering only the increase in torque, it is advantageous to have the magnetic flux distribution of the rotor poles as a square wave and θrt=180 [°]. However, it is also advantageous to be able to reduce θrt slightly from the viewpoint of current reversal and sudden changes in current control. Therefore, it is more advantageous to be able to create a width θou in the low flux density region without decreasing the maximum flux density Bagm of the rotor poles, as in equation (8).

Next, the shapes and names of the parts in FIG. 4, (a) and (b) thereof, will now be explained. This is one example of the structure shown in (a) and (b) of FIG. 3. A reference number 41 indicates a stator, a reference number 42 indicates the first-phase stator pole, and a reference number 43 indicates a concentrated winding wound around the first-phase stator pole 42. A stator pole 48 is a phase with a circumferential pitch θsp phase delay relative to the first-phase stator pole 42. The right direction on the paper in FIG. 4 corresponds to the CCW of the rotor rotation and is set as the positive direction. Concentrated windings are wound around the stator poles of each phase. The circumferential center position of the 42 stator poles of the first phase is set as the position where the rotation angle θ of the motor is 0 [°]. A reference number 44 indicates the rotor. A reference number 45 indicates the first rotor pole among the rotor poles. The starting point of the rotor is set at the circumferential center position of the first rotor pole 45, and the rotation in the CCW direction is set as a forward rotation in the paper plane of FIG. 4. A reference number 46 indicates the second rotor pole. A reference number 45 and a reference number 46 indicate S-pole and N-pole permanent magnets, respectively. The S-pole and N-pole are arranged alternately in the circumferential direction. The boundary portion between the permanent magnets that form each of the rotor poles is formed as a space, i.e., magnet-to-magnet spatial portion or inter-magnet spatial portion. The overall configuration of the motor is not specified, but is generalized so that it can be applied to various motor configurations. The circumferential pitch θsp of the stator poles, the angular width θst of the portion of the teeth through which the magnetic flux of the stator poles passes, and the circumferential width θss of the slots are shown. The circumferential width θrt of each permanent magnet of the rotor and the circumferential width θou of the spatial portion between mutually adjacent permanent magnets in the circumferential direction are shown.

Figure 4:
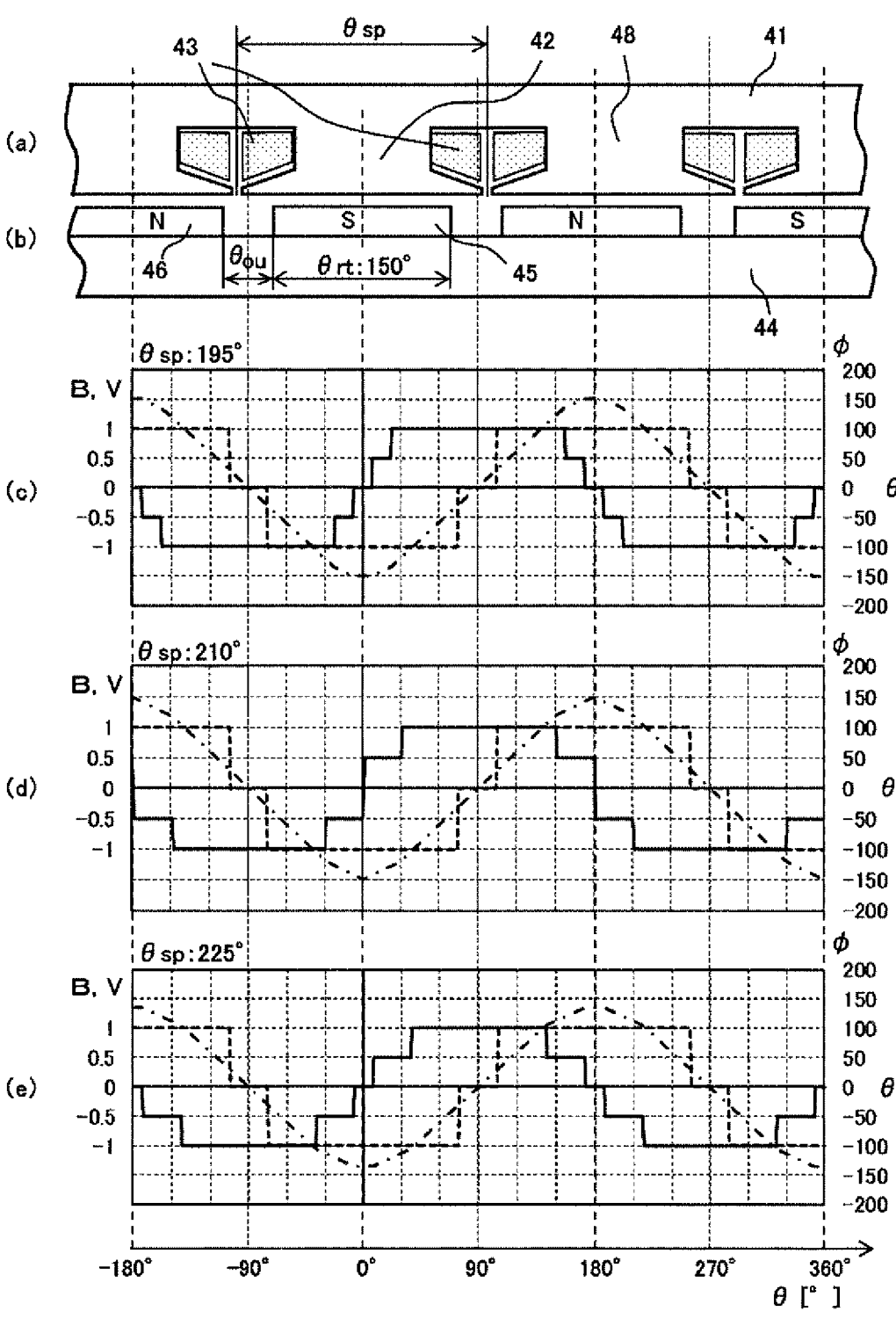
FIG. 4 is another example showing a linearly developed view of the motor according to the present disclosure.
Figure 5:
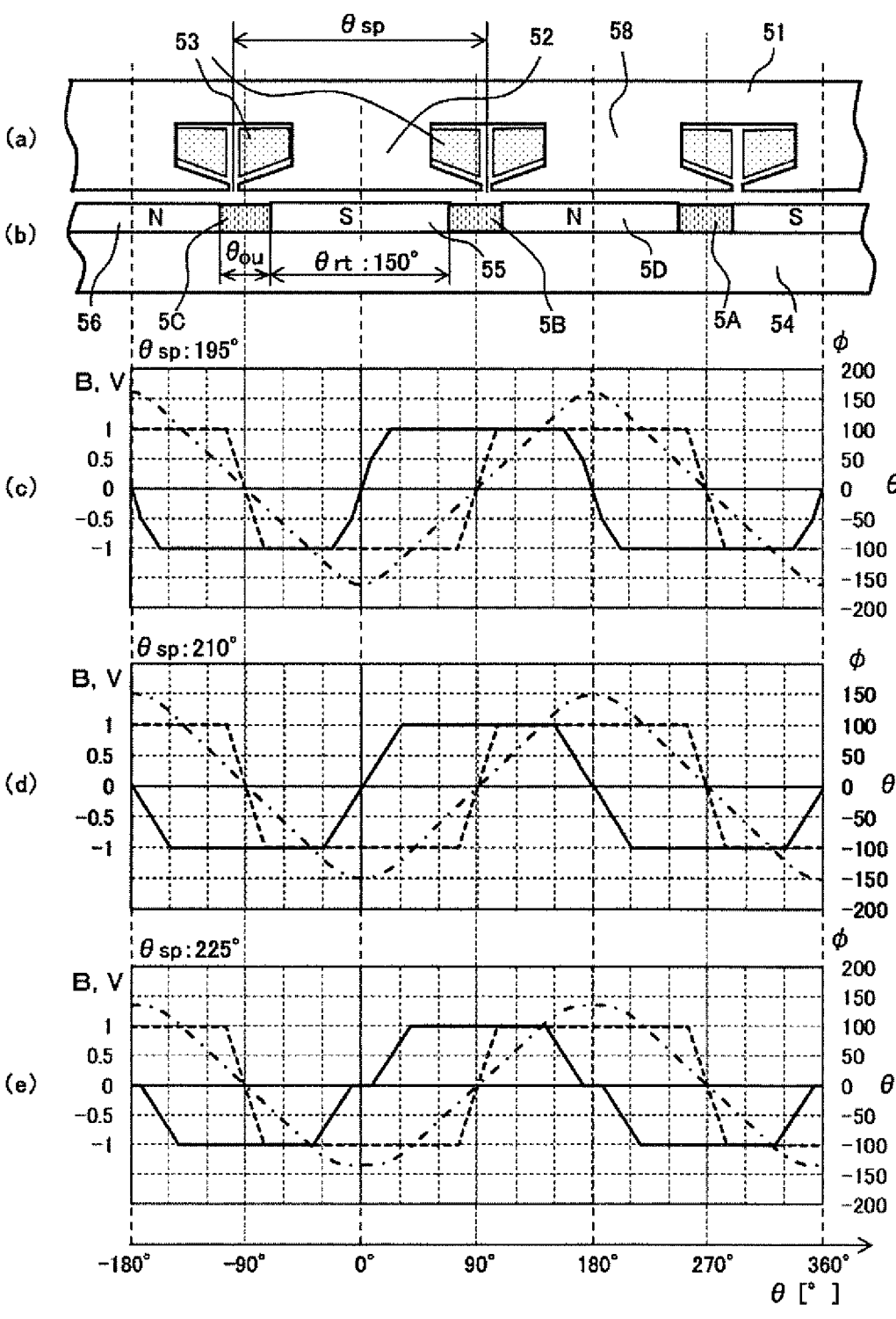
FIG. 5 is another example showing a linearly developed view of the motor according to the present disclosure.

Next, the characteristics shown in parts (c), (d), and (e) of FIG. 4 are explained. These characteristics are explained using a square wave that takes positive and negative values with the rotor pole width θrt fixed at 150 [°]. The induced voltage waveforms obtained when the stator pole pitch θsp is varied to 195 [°], 210 [°], and 225 [°], respectively. As values in accordance with equations (8), (9), and (10), when the rotor pole width is θrt=150 [°], the circumferential width of the portion with small magnetic flux density is θou=30 [°], and the corresponding stator pole pitch is θsp=210 [°]. This corresponds to the characteristic shown in part (d) of FIG. 3. However, although equations (8), (9), and (10) have rationality, they are not inevitable, and the values of circumferential width Gou and magnetic pole width θrt described above can be freely selected to some extent. Parts (c) and (e) of FIG. 4 are examples of characteristics when deviating from equation (9). FIG. 1, 2, and parts (c), (d), and (e) of FIG. 4 illustrate an example in which the magnetic flux density B in the circumferential width Gou of the small magnetic flux density area is 0. However, as shown in FIG. 5, 6, 26, etc., the distribution states of the magnetic flux density B in the θou region can also be selected to various values.

Part (c) of FIG. 4 shows the characteristics obtained when θrt=150 [°], θou=30 [°], and θsp=195 [°]. The dashed lines indicate the magnetic flux density distribution of the rotor poles. It also means the distribution of magnetic flux density in the air gap section and each stator section at the rotor rotation position θ=0 [°]. The amplitude of the magnetic flux density is normalized to 1.0. The single-pointed line shows the interlinkage flux φ of the concentrated winding 43 wound around the first-phase stator pole 42. The solid line shows the induced voltage V of the concentrated winding 43, and the amplitude is normalized to 1.0. Since the circumferential pitch θsp=195 [°] of each of the stator poles is close to 180 [°] provided by the full-pitch winding, the shape of the characteristics of the induced voltage V is close to the shape of the flux distribution of the rotor poles with permanent magnet width θrt=150 [°]. The circumferential width is 135 [°] at the induced voltage V=1.0. The overall shape of the induced voltage V is staircase-shaped, and if smoothed a little, it can also be said to be an AC voltage waveform with an abbreviated trapezoidal shape.

Part (d) of FIG. 4 shows the characteristics obtained when θrt=150 [°], θou=30 [°], and θsp=210 [°]. This is obtained from a configuration that conforms to the relationships in equations (8), (9), and (10). The magnetic flux density distribution of the dashed line is the same as that in part (c) of FIG. 4 which has been described. The single-pointed line shows the interlinkage flux φ of the intensively wound winding 43. The solid line shows the induced voltage V induced in the intensively wound winding 43, which is wider over the width θsp=210 [°] of the stator poles 42, thus increasing the change from the shape of the flux distribution of the permanent magnet width θrt=150 [°] of each of the rotor poles. The circumferential width of the induced voltage V=1.0 is reduced to 120 [°]. The overall shape of the induced voltage V is a slightly gentler staircase shape than that shown in part (c) of FIG. 4. If being smoothed a little, it can be said to be an abbreviated trapezoidal shape.

Part (e) of FIG. 4 shows the characteristics obtained when θrt=150 [°], θou=30 [°], and θsp=225 [°]. The magnetic flux density distribution of the dashed line is the same as that shown in part (c) of FIG. 4 described above. The single-pointed line indicates the interlinkage flux φ of the concentrated winding 43. The solid line shows the induced voltage V of the concentrated winding 43, which is further widened to the width θsp=225 [°] of the stator poles 42. Therefore, the change from the shape of the magnetic flux distribution of the permanent magnet width θrt=150 [°] of the rotor poles is larger. The circumferential width of the induced voltage V=1.0 is further reduced to 105 [°]. The overall shape of the induced voltage V is a gentler staircase shape than that shown in part (d) in FIG. 4. If being smoothed a little, it can be said to be an abbreviated trapezoidal shape.

As described, FIG. 4 shows how each induced voltage waveform changes when the rotor pole width θrt is fixed at 150 [°] and the stator pole pitch θsp is changed to 195 [°], 210 [°], and 225 [°]. Thus, the stator pole pitch θsp can be changed. Not only does each induced voltage waveform changes, but also the circumferential width of the slot, θss, changes as well. The rotor pole width θrt can be set to a fixed value, and the average value of the induced voltage and the circumferential width θss of the slot can be shown graphically as shown in FIG. 8. In other words, the appropriate parameter can be selected depending on applications.

Next, the shapes and names of the parts (a) and (b) shown in FIG. 5 are explained. These are similar to those in FIG. 4. A reference number 51 indicates the stator, a reference number 52 indicates the stator poles of the first phase, and a reference number 53 indicates the concentrated winding wound around the first-phase stator pole 52. The stator poles 58 are the phases with a phase delay of the circumferential pitch θsp of each of the stator poles relative to the concentrated winding 52. The right direction on the paper in FIG. 5 corresponds to the rotor CCW rotation, and this direction is set to positive. Concentrated windings are wound around the stator poles of each phase. The circumferential center position of the first-phase stator pole 52 corresponds to the position where the rotation angle θ of the motor is 0 [°]. A reference number 54 indicates the rotor. A reference number 55 indicates the first rotor pole among the rotor poles. The starting point of the rotor corresponds to the circumferential center position of the first rotor pole 55. On the paper in FIG. 5, rotation in the CCW direction corresponds to the positive direction. A reference number 56 shows the second rotor pole. A reference number 55 indicates an S-pole permanent magnet, a reference number 56 indicates an N-pole permanent magnet, and a reference number SD indicates an N-pole permanent magnet. The S-pole and N-pole are arranged alternately in the circumferential direction. The magnetic flux density B on the surface of these permanent magnets is a constant value. A reference number 5B indicates a permanent magnet. The characteristic of the magnetic flux density B changes gradually from the circumferentially adjacent S-pole permanent magnets 55 to the N-pole permanent magnets 56. Reference numbers 5A and 5C also indicate permanent magnets similarly constructed.

Next, the characteristics shown in parts (c), (d), and (e) of FIG. 5 are explained. Since the rotor has permanent magnets configured as described above, the distribution of magnetic flux density B shown by the dashed line in part (c) of FIG. 5 is obtained. The distributions of magnetic flux density B shown by the dashed lines in parts (d) and (e) of FIG. 5 are provided as similar characteristics. These characteristics differ from the rectangular and staircase-shaped magnetic flux density B distributions shown in FIG. 4, which have positive and negative trapezoidal distribution shapes.

Part (c) of FIG. 5 shows the characteristics under the conditions $\theta rt=150$ [°], $\theta ou=30$ [°], and $\theta sp=195$ [°]. The dashed line indicates the magnetic flux density distribution of each of the rotor poles. This is also the distribution of the magnetic flux density in the air gap section and each stator section at the rotor rotation position $\theta=0$ [°]. Magnitudes of the magnetic flux densities are normalized to 1.0. The single-pointed line shows the interlinkage flux $\varphi$ of the concentrated winding 53 wound around the first phase stator pole 52. The solid line shows the induced voltage V of the concentrated winding 53, and the amplitude is normalized to 1.0. The shape of the induced voltage V is close to the characteristics at the circumferential pitch $\theta sp=195$ [°] of the stator poles and 180 [°] of the full-pitch winding, which is similar to the shape of the flux distribution at the permanent magnet width $\theta rt=150$ [°] of the rotor pole. The circumferential width of the induced voltage V=1.0 is 135 [°]. The shape of the voltage waveforms in the ranges where the induced voltage V changes from positive to negative and from negative to positive are different from the characteristics shown in part (c) of FIG. 4.

Part (d) of FIG. 5 shows the characteristics at $\theta rt=150$ [°], $\theta ou=30$ [°], and $\theta sp=210$ [°]. The magnetic flux density distribution shown by the dashed line is the same as the distribution shown in part (c) of FIG. 5 described above. The single-pointed line shows the interlinkage flux $\varphi$ of the concentrated winding 53. The solid line shows the induced voltage V of the concentrated winding 53, and the width of the stator poles 52 is wider to $\theta sp=210$ [°]. Therefore, the change is larger in terms of the shape of the magnetic flux distribution of the permanent magnet width $\theta rt=150$ [°] of the rotor poles. The circumferential width of the induced voltage V=1.0 is reduced to 120 [°]. And the shape of the voltage waveforms in the areas where the induced voltage V changes from positive to negative and from negative to positive is different from the characteristics shown in part (d) of FIG. 4.

Part (e) of FIG. 5 shows the characteristics at $\theta rt=150$ [°], $\theta ou=30$ [°], and $\theta sp=225$ [°]. The magnetic flux density distribution shown by the dashed line is the same as the distribution shown in part (c) of FIG. 5 described above. The single-pointed line shows the interlinkage flux $\varphi$ of the concentrated winding 53. The solid line shows the induced voltage V of the concentrated winding 53, and the width of the stator poles 52 is wider to $\theta sp=225$ [°]. Therefore, the change is larger in terms of the shape of the magnetic flux distribution of the permanent magnet width $\theta rt=150$ [°] of the rotor poles. The circumferential width of the induced voltage V=1.0 is further reduced to 105 [°]. The shape of the voltage waveforms in the portions where the induced voltage V changes from positive to negative and from negative to positive is different from the characteristics shown in part (e) in FIG. 4.

As described, FIG. 5 shows the changes in each induced voltage waveform when the stator pole pitch $\theta sp$ is varied to 195 [°], 210 [°], and 225 [°] with the magnetic flux density distribution of the rotor poles fixed in a trapezoidal shape. Thus, the stator pole pitch $\theta sp$ can be varied. Not only each induced voltage waveform changes, but also the circumferential width of the slot, $\theta ss$, also changes. The rotor pole width $\theta rt$ can be set to a fixed value, and the average value of the induced voltage and the circumferential width of the slot $\theta ss$ can be shown graphically as shown in FIG. 8, thus allowing the selection of a suitable parameter for applications.

Figure 6:
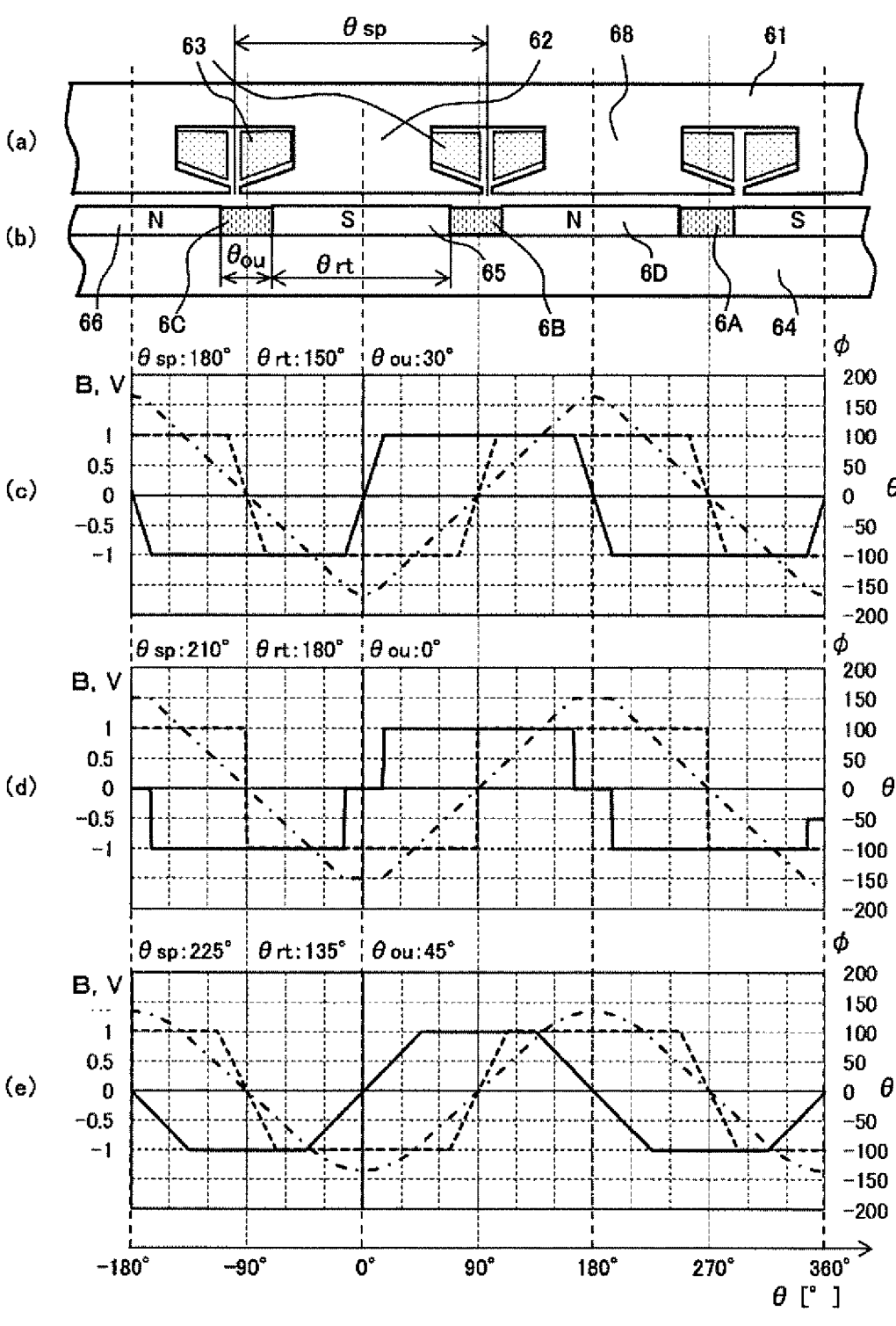
FIG. 6 is another example showing a linearly developed view of the motor according to the present disclosure.

Next, the shapes and names of parts (a) and (b) of FIG. 6 are explained. A reference number 61 shows the stator, a reference number 62 shows the first phase stator pole, and a reference number 63 shows the concentrated winding around the first phase stator pole 62. The stator pole 68 is a phase with a phase delay corresponding to the circumferential pitch $\theta sp$ of the stator poles relative to the first phase stator poles 62. A reference number 64 shows a rotor. A reference number 65 shows a first rotor pole among the rotor poles, the starting point of the rotor is set to the circumferential center position of the first rotor pole 65, and the rotation in the CCW direction is positive on the paper in FIG. 6. A reference number 65 shows an S-pole permanent magnet, a reference number 66 shows an N-pole permanent magnet, and a reference number 6D shows an N-pole permanent magnet, with S and N poles alternating in the circumferential direction. The magnetic flux density B on the surface of these permanent magnets is assumed to be large, close to 2.0 [T], and the magnetic flux density B over the entire surface is a constant value. A reference number 6B shows a permanent magnet with the characteristic that the magnetic flux density B gradually changes from the circumferentially adjacent S-pole permanent magnet 65 to N-pole permanent magnet 66. Reference numbers 6A and 6C are similar permanent magnets.

Next, the characteristics shown in part (c) in FIG. 6 are explained. The pitch of the concentrated winding is 180 [°] electromagnetically. The part (c) of Fig. shows the characteristics for $\theta rt=150$ [°], $\theta ou=30$ [°], and $\theta sp=180$ [°]. The dashed line shows the distribution of the magnetic flux density B at the rotor poles, and the amplitude of the magnetic flux density B is normalized to 1.0. The single-pointed line shows the interlinkage flux $\varphi$ of the concentrated winding 63 wound around each of the first phase stator poles 62. The solid line shows the induced voltage V of the concentrated winding 63, whose amplitude is normalized to 1.0. Part (c) of FIG. 6 shows the case of $\theta sp=180$ [°], where the concentrated winding 63 is full-pitch winding, and the configuration is such that the distribution waveform of the magnetic flux density B and the induced voltage V have the same and similar waveform. However, in this example, the adjacent neighboring stator poles are also in phase, and a multiphase fractional slot motor cannot be configured. The electromagnetic characteristics are shown for reference to illustrate the electromagnetic characteristics. This is also an example where twice the space of $\theta ou$ cannot be utilized for the circumferential width $\theta ss$ of the slot.

Next, the characteristics shown in part (d) of FIG. 6 are explained. It is an extreme example of a square wave with the magnetic flux density B of each rotor pole near 2.0 [T]. The part (d) of FIG. 6 shows the characteristics for θrt=180 [°], θou=0 [°], and θsp=210 [°]. The dashed line shows the distribution of the magnetic flux density B at the rotor poles, with the amplitude of the magnetic flux density B normalized to 1.0. Since θrt=180 [°], so the distribution of the magnetic flux density B is a perfectly rectangular wave-shaped example. The single-pointed line shows the inter-linkage flux φ generated by the concentrated winding 63 wound on the first phase stator pole 62. The solid line shows the induced voltage V of the concentrated winding 63, whose amplitude is also normalized to 1.0. In this charac-teristic, the circumferential width where the induced voltage V becomes 1.0 is 150 [°], which is an excellent voltage characteristic. However, assuming a large magnetic flux density B with the rotor pole surface close to 2.0 [T], the magnetic flux that cancels out near the tooth tip in the stator pole increases in the vicinity of the maximum interlinkage flux of the stator winding 63. In addition, the rate of changes in the induced voltage, shown by the solid line, is large, and there is a problem regarding controllability of the current at high speeds.

Next, the characteristics shown in part (e) of FIG. 6 are explained. This is an example of a motor configuration in which the slot circumferential width θss can be increased, thus allowing for a higher winding volume. The character-istics shown in part (e) of FIG. 6 are θrt=135 [°], θou=45 [°], and θsp=225 [°]. The dashed line shows a distribution of the magnetic flux density B at the rotor poles, wherein the distribution is slightly reduced to increase θss. The ampli-tude of the magnetic flux density B is normalized to 1.0. The single-pointed line shows the interlinkage flux φ of the concentrated winding 63 wound around the first phase stator pole 62. The solid line shows the induced voltage V of the concentrated winding 63, whose amplitude is normalized to 1.0. In this characteristic, the circumferential width at which the induced voltage V is 1.0 is reduced to 90 [°]. When the maximum flux density of the rotor is 1.8 [T], the circum-ferential slot width θss becomes as large as 103.5 [°] from formula (12). The amount of concentrated winding can then be increased.

Second Embodiment

Figure 9:
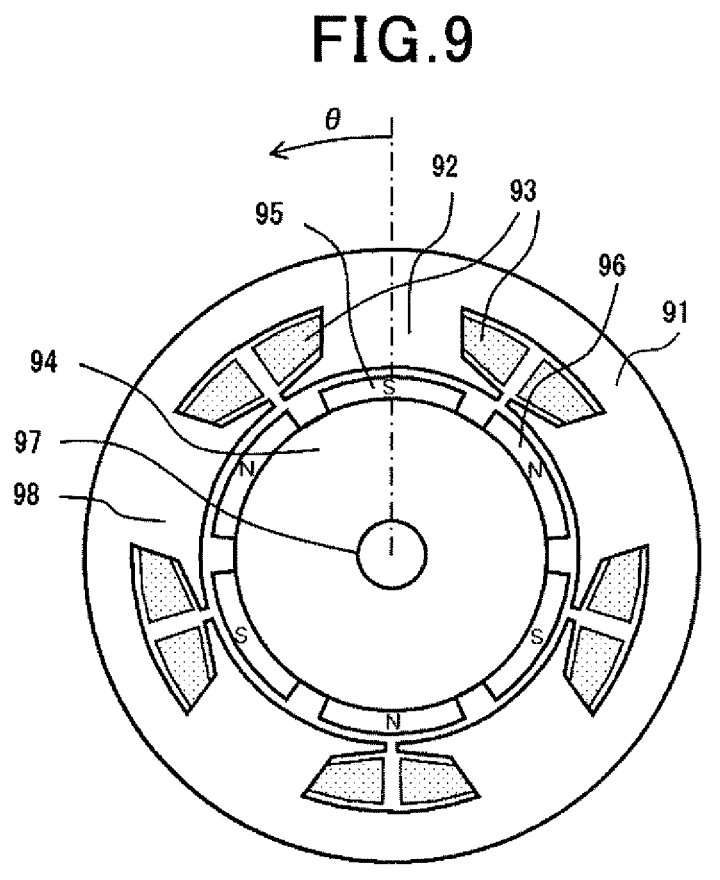

Next, a cross-sectional view of the motor of another example of the first exemplary mode is shown in FIG. 9. A reference number 91 is a stator, a reference number 94 is a rotor, and a reference number 97 is a rotor shaft. The number of stator poles is 5 and the number of rotor poles is 6. According to the nomenclature method for this disclosure, these are the motor configuration of 5S6R. A reference number 92 is a first phase stator pole, and a reference number 93 is the concentrated winding around the first phase stator pole 92. A stator pole 98 have a phase lag of the circumferential pitch θsp of the stator poles relative to the first phase stator pole 92. Assume that the CCW direction is positive on the paper in FIG. 9. Concentrated windings are wound around the stator poles in each phase. The circum-ferential center position of the first phase stator pole 92 is set at the rotation angle θ=0 [°] of the motor. A reference number 95 is the first rotor pole among the rotor poles, and the starting point of the rotor is the circumferential center position of the first rotor pole 95. Rotation in the CCW direction on the paper in FIG. 9 is forward rotation. A reference number 96 is the second rotor pole. The first rotor pole 95 is a S-pole permanent magnet and the second rotor pole 96 is a N-pole permanent magnet. S and N poles are arranged alternately in the circumferential direction.

Figure 10:
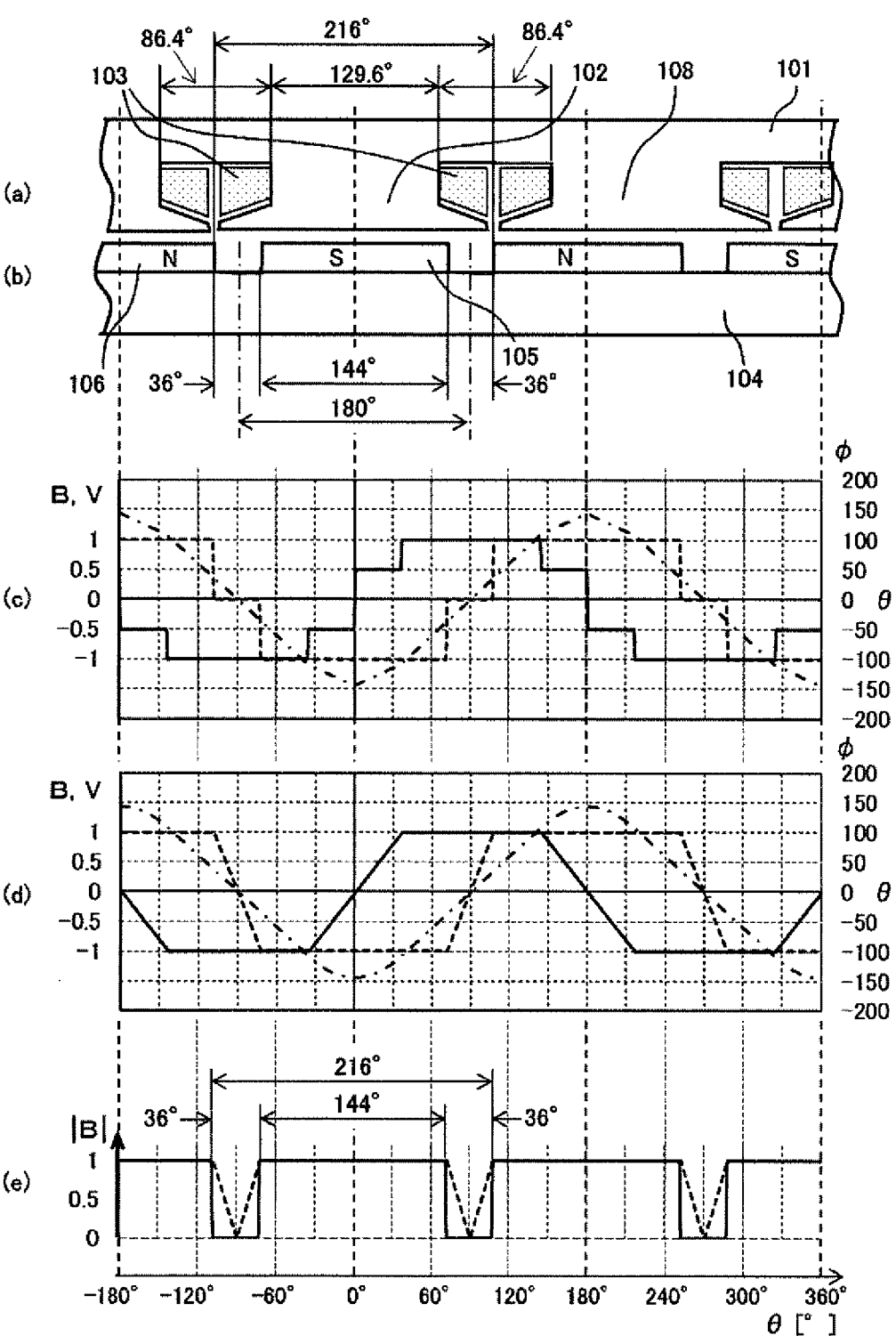
FIG. 10 is an illustration exemplifying a distribution of magnetic fluxes, states of interlinkage magnetic fluxes, and induced voltages.

The configuration shown in FIG. 10 is described next. FIG. 10 is a development view of the motor shown in FIG. 9, with the cross-section of the motor transformed into a straight line. FIG. 10 shows a portion of the motor in FIG. 9, with the outside of the dashed portions on the left and right in FIGS. 10(*a*) and 10(*b*) omitted. In the paper face of FIG. 10, its right direction indicates the counterclockwise rotation direction CCW in the paper face of FIG. 9. A reference number 101 in FIG. 10(*a*) shows the stator, and a reference number 104 in FIG. 10(*b*) shows the rotor. A reference number 102 indicates a stator pole corresponding to the first phase stator pole 92 shown in FIG. 9. A stator pole 108 is a phase which has phase lag with respect to the stator pole 102 by the circumferential pitch θsp of the stator pole. A reference number 103 is the concentrated winding that winds around the first phase stator pole 102. A reference number 105 is a S-pole permanent magnet corresponding to the first rotor pole 95 shown in FIG. 9. The circumferential pitch of each permanent magnet is 180 [°] in electric angle. A reference number 106 indicates an N-pole permanent magnet.

The total circumference of the motor is 360×3=1080 [°] in electrical angle since it has 6 poles. The circumferential pitch θsp of the stator poles is 1080/5=216 [°]. The circum-ferential width θrt of each permanent magnet is 180–(216–180)=144 [°] in electric angle. The circumferential width θou of the concave space between each permanent magnet, where the magnetic flux density is small, is 36 [°]. The circumferential width θstg of the portion of the stator pole 22 facing the air gap is the same as the circumferential pitch θsp of the stator poles, which is 216 [°]. Note that an idealized modeling is assumed here where the circumferen-tial width of each slot aperture is 0 [°].

Next, the cog width θst of the first phase stator pole 102 and the circumferential angle width θss of the slot are calculated according to equations (6), (8), and (12). Assume that the maximum surface magnetic flux density Bagm of the permanent magnet of the rotor poles is taken to be a large value, 1.8 [T]. Furthermore, assume that the magnetic flux density is uniform across the circumferential width θrt of the permanent magnet. The maximum flux density Bstm of the electromagnetic steel sheet used for each stator pole is assumed to be 2.0 [T]. Under these assumptions, the fol-lowing equation holds.

$$\theta rt = 180 - \theta ou = 144$$

$$\theta st = \theta rt \times Bagm/Bstm = 144 \times 1.8/2.0 = 129.6$$

$$\theta ss = \theta sp - \theta st = 2 \times \theta ou + \theta rt \times (1 - Bagm/Bstm) = 86.4$$

Next, the characteristics of the aforementioned conditions are explained based on FIG. 10(*c*). The dashed line shows the magnetic flux density distribution of the rotor pole. The amplitude of the flux density is normalized to 1.0. The single-pointed line indicates the interlinkage flux φ of the concentrated winding 103 around the first phase stator pole 102. The solid line shows the induced voltage V of the concentrated winding 103, whose amplitude is normalized to 1.0. Regarding the shape of the induced voltage V, the width of V=1.0 was 128 [°] in (c) of FIG. 2 with the 7S8R structure, whereas the width of V=1.0 decreases to 108 [°] in the motor configuration with the 5S6R structure shown in FIG. 10(*c*) and its voltage is reduced. This difference in motor configuration is reflected in the difference in characteristics.

Next, FIG. 10(*d*) shows the characteristics of an example in which the magnetic flux density distribution at the boundary of the rotor poles is changed to a trapezoidal shape. The dashed line shows the distribution of magnetic flux density B. The absolute value of the magnetic flux density B is shown in FIG. 10(*e*). The solid line is the absolute value of magnetic flux density B shown in FIG. 10(*c*), while the dashed line is the absolute value of magnetic flux density B shown in FIG. 10(*d*). The single-pointed line indicates the interlinkage flux φ of the concentrated winding 103 around the first phase stator pole 102. The solid line shows the induced voltage V of the concentrated winding 103, whose amplitude is normalized to 1.0. The width of the region where the voltage V is 1.0 is the same as in FIG. 10(*c*) and is 108 [°]. The characteristics of the slope portion of the voltage V have changed. In other words, for the staircase-shaped voltage V shown in FIG. 10(*c*), that shown in FIG. 10(*d*) has changed to a trapezoidal shape. FIGS. 10(*c*) and 10(*d*) are illustrated assuming an idealized model of magnetic flux distribution. However, in a real motor, leakage flux and other fluxes occur at the boundaries of the rotor poles, and the magnet characteristics also change. Therefore, the characteristics in FIG. 10(*c*) are closer to those in FIG. 10(*d*).

Next, a second exemplary mode will now be described. The exemplary mode relates to a motor and its control device having a configuration of a low flux area ROU with low flux density provided at the circumferential pole boundary of the rotor, where the induced voltage of the concentrated winding WS of each phase is an abbreviated trapezoidal shaped voltage and an abbreviated trapezoidal shaped current is energized. Some examples are shown in FIGS. 1 through 6. Specifically, they relate to an example of the distribution of the magnetic flux density B of the rotor poles, the induced voltage V induced in the concentrated winding, and the current I energizing the concentrated winding. The effect of the torque increase was also explained. The waveform of the induced voltage V and the waveform of the current I do not necessarily have to be proportional or identical.

Third Embodiment

Next, a third exemplary mode will now be described. The basic configuration of the motor for the third exemplary mode is shown in FIGS. 3(*c*) and 3(*d*). It is shown in comparison with FIGS. 3(*a*) and 3(*b*), with the addition of 3J, 3K, and 3L, the bypass magnetic path PBPs in (c) and (d). In the case of motors with fractional slots, which is the subject of this disclosure, there are many combinations of the number of stator poles PS (NS) and the number of rotor poles PR (NR). Among them, for example, for combinations that fall within the range indicated by the arrows in FIG. 7, θrt and θss can be a combination of practical characteristics even when the magnetic flux density of the rotor poles is increased. However, in the region where the stator pole pitch θsp on the right side of the paper in FIG. 7 becomes larger, the effective rotor pole width θrt becomes smaller, i.e., the maximum interlinkage flux of the winding becomes smaller, resulting in lower torque. For example, in FIG. 7, when the stator pole pitch θsp is 220 [°] or higher, the circumferential width opposite the stator poles becomes too large. As a result, the effective rotor pole width θrt becomes smaller and smaller, resulting in a degradation of motor characteristics.

In the case of the configurations of in FIGS. 3(*c*) and 3(*d*), in a combination motor for such an area, the rotor flux of excessive circumferential width can be prevented from acting on the stator poles. This motor configuration provides good voltage and torque characteristics. It is also a method to always obtain optimal voltage and torque characteristics.

In FIGS. 3(*c*) and 3(*d*), a reference number 3B indicates the first phase stator pole, and reference number 3C indicates the concentrated winding around the first phase stator pole 3B. A reference number 3H indicates the stator poles. The stator poles of the other phases are also arranged in the circumferential direction, and a concentrated winding is wound around the stator poles of each phase. Between each stator pole, 3J, 3K, and 3L, the bypass magnetic paths PBPs, are added. The circumferential center position of the first phase stator pole 3B is set at the rotation angle θ=0 [°] of the motor. The CCW direction corresponds to the positive direction. Reference number 3E indicates the first rotor pole among the rotor poles. The starting point of the rotor is the circumferential center position of the first rotor pole 3E. Rotation in the CCW direction is set to forward rotation on the paper in FIG. 3. Reference number 3F is the second rotor pole. Reference number 3E indicates an S-pole permanent magnet, and reference number 3F indicates an N-pole permanent magnet. S and N poles are arranged alternately in the circumferential direction. The boundary of the permanent magnets of each rotor pole is formed as a space. This boundary can be changed to a trapezoidal flux distribution, as in FIGS. 10(*d*) and (*e*) above.

The circumferential width of the bypass magnetic path PBP is θbp, and the circumferential width θbp for the third exemplary mode is defined in the range smaller than the value of "θsp−185°".

$$\theta bp \leq \theta sp - 185° \tag{14}$$

The function of the bypass path PBP is to allow excess and unwanted magnetic flux φ bp in the area opposite the rotor to pass to the back yoke side of the stator. This flux φ bp is not chained to each phase winding and, therefore, in principle, does not generate torque. In reality, however, reluctance torque due to differences in magnetic resistance and other factors will occur.

The circumferential pitch of the stator poles is θsp. In particular, the circumferential width of the air gap surface of the stator poles is θstg. As illustrated in FIG. 3(*c*), since the bypass path PBP is placed in the center of each slot, the slots are divided in the circumferential direction. This changes the definition of the circumferential width of the slot, θss. The angle width from the teeth of the flux-passing portion of the stator poles to the flux-passing portion of the bypass magnetic path PBP is θss/2.

The parameters θrt and θou on the rotor side in FIG. 3(*d*) are the same as those in equations (8) in FIGS. 3(*a*) and (*b*), and are expressed as follows.

$$\theta rt + \theta ou = 180$$

The relationship of each parameter in FIGS. 3(*c*) and 3(*d*) differs from that in (a) and (b), as illustrated in the figure, and is expressed as follows.

$$\theta sp = \theta stg + \theta bp \tag{15}$$

$$\theta stg = 180 + \theta ou \tag{16}$$

$$= \theta rt + 2 \times \theta ou \tag{17}$$

The tooth width θst of the stator poles is the same as in equation (6) and is expressed as follows.

$$\theta rt \times Bagm = \theta st \times Bstm$$

The cog width θbpt of the flux-passing portion of the bypass path is expressed as follows.

$$\theta bpt = \theta bp \times Bagm / Bstm \qquad (18)$$

In equation (18), the cog width θbpt of the flux-passing portion of the bypass magnetic path PBP is reduced by the value of Bagm. The circumferential width of the slot, θss, is expressed from FIGS. 3(*c*) and (*d*) as follows.

$$\theta ss = \theta sp - \theta st - \theta bpt \qquad (19)$$

The circumferential width of the slot θss can be expressed in terms of the magnetic flux density Bagm of the rotor poles and the maximum flux density Bstm of the stator cog. In other words, since both flux densities are affected, the following equation is obtained by substituting (6) into equation (20).

$$\theta ss = \theta sp - \theta rt \times Bagm / Bstm - \theta bp \times Bagm / Bstm \qquad (20)$$

The relationship is that as the magnetic flux density Bagm of the rotor poles decreases, the slot circumferential width θss increases. However, the relationship is established under the conditions of equations (16) and (17). Since there are degrees of freedom in the relationship between the values of θstg and θou, these equations will also change if the value of θstg is different from that in equation (16).

Fourth Embodiment

Figure 11:
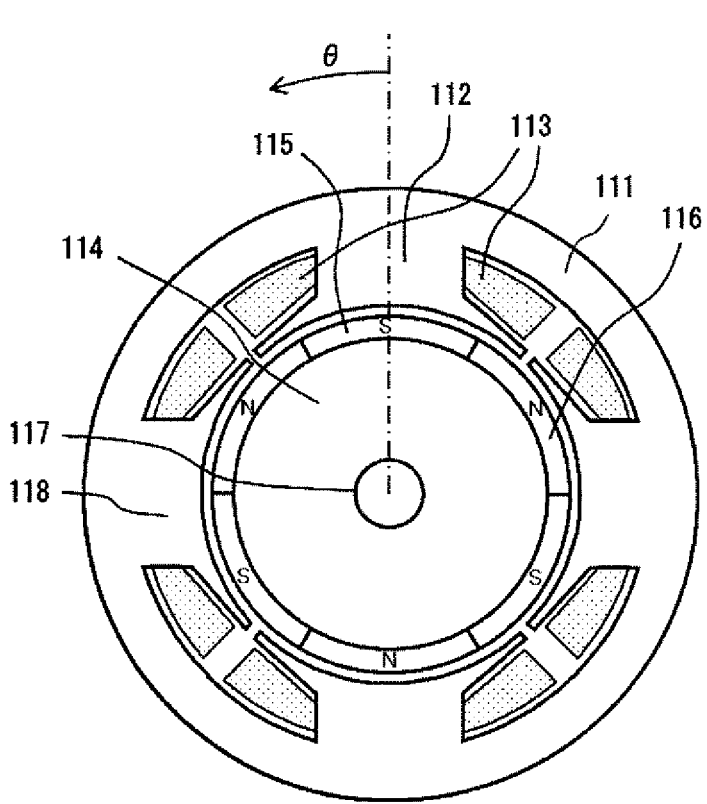
FIG. 11 is a laterally sectioned view of a motor whose number of stator poles is 4 and whose number of rotor poles is 6.
Figure 12:
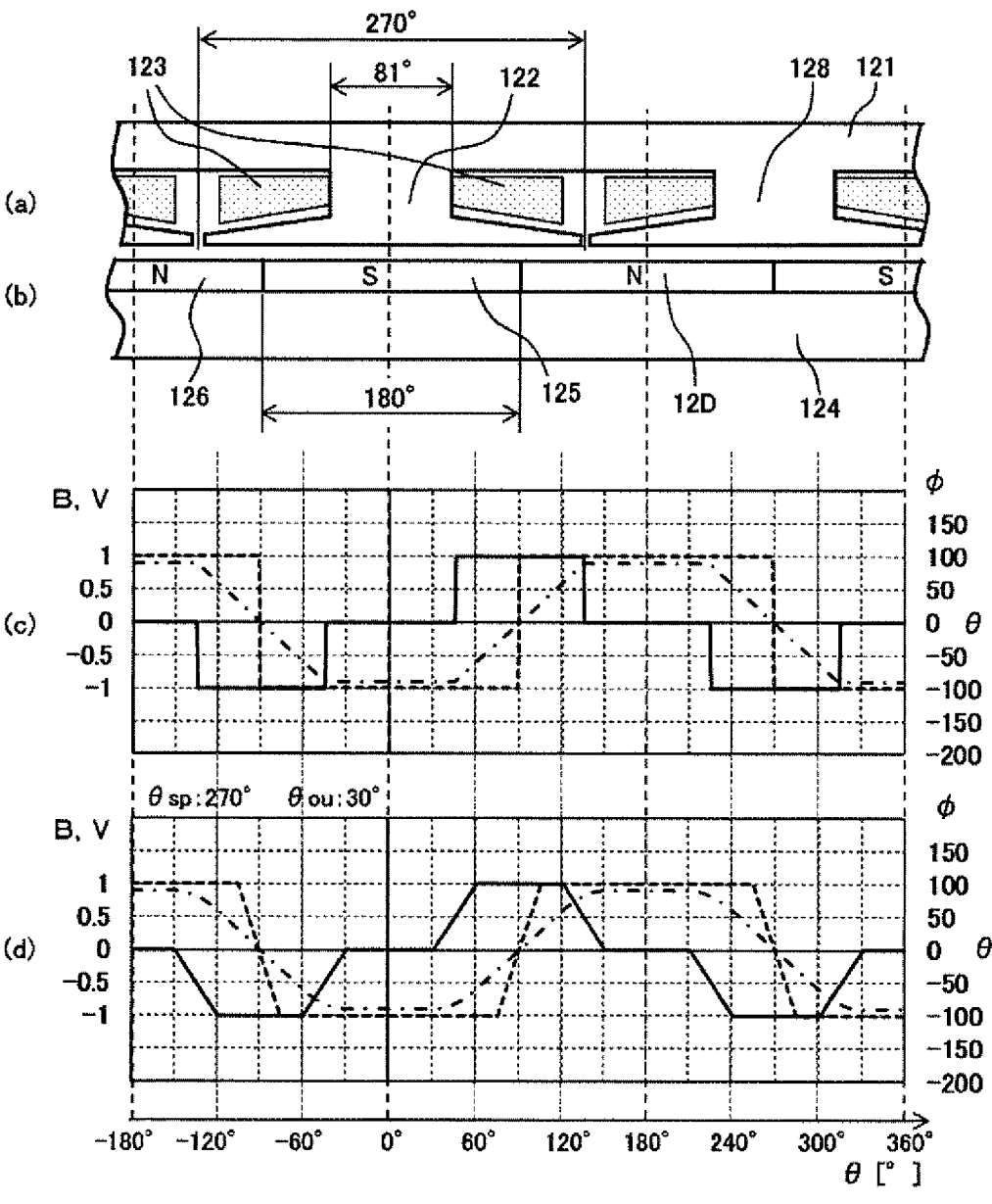
FIG. 12 is an illustration exemplifying a distribution of magnetic fluxes, states of interlinkage magnetic fluxes, and induced voltages.
Figure 13:
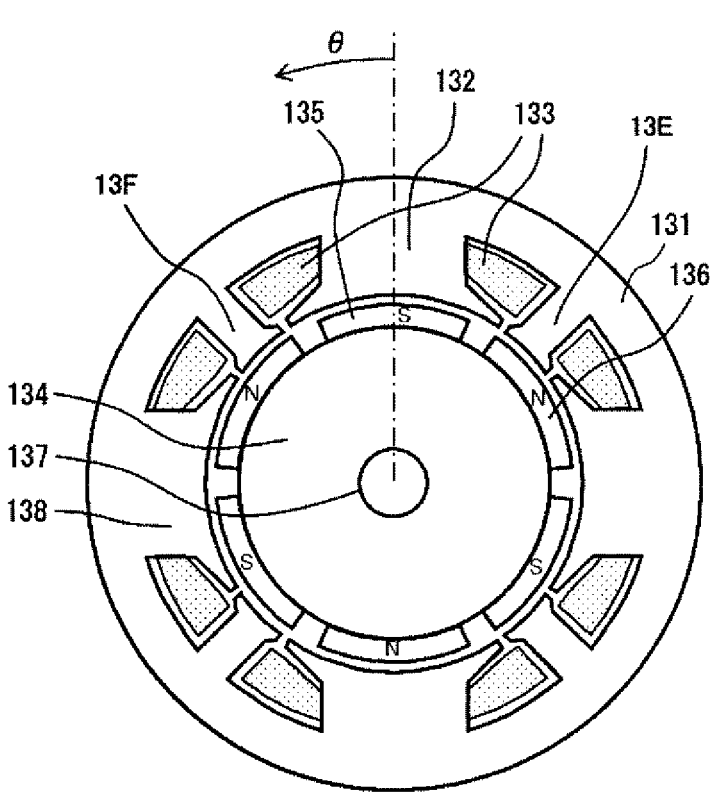
FIG. 13 is a laterally sectioned view of a motor whose number of stator poles is 4 and whose number of rotor poles is 6.
Figure 14:
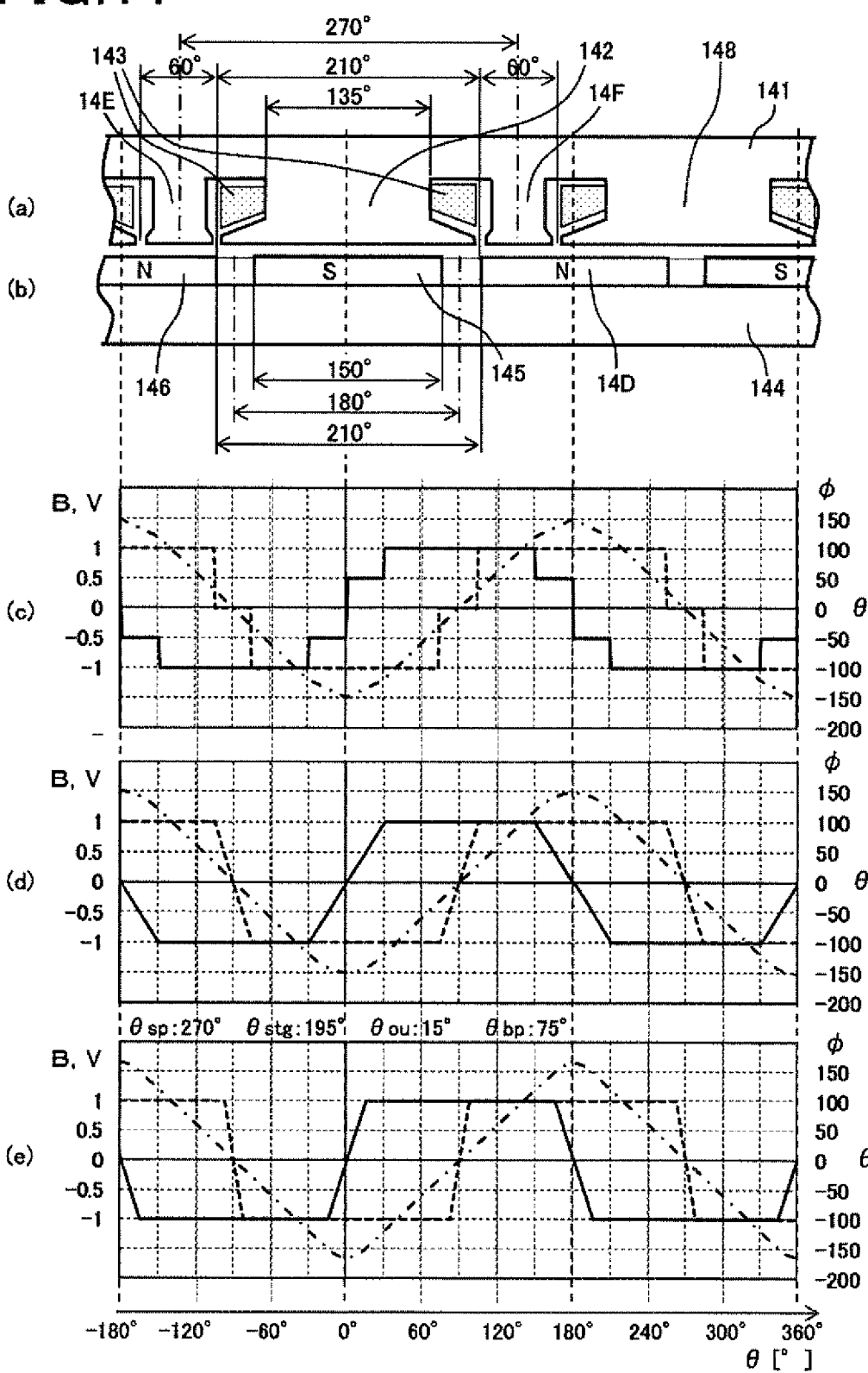
FIG. 14 is an illustration exemplifying a distribution of magnetic fluxes, states of interlinkage magnetic fluxes, and induced voltages.

Next, FIGS. 13 and 14 are illustrated as examples of the third exemplary mode. Before explaining such examples, FIGS. 11 and 12 will be explained, which are then transformed into the configurations shown in FIGS. 13 and 14 in order to clarify the problem. FIG. 11 shows a cross-sectional view of the motor before applying the third exemplary mode. A reference number 111 indicates the stator, a reference number 114 indicates the rotor, and a reference number 117 indicates the rotor shaft. The number of stator poles PS is 4 and the number of rotor poles PR is 6. The nomenclature method provides a 4S6R motor configuration. A reference number 112 indicates the first phase stator poles, and a reference number 113 indicates the concentrated winding around the first phase stator pole 112. The stator pole 118 is a phase with a phase delay of the circumferential pitch θsp of the stator poles relative to the first phase stator pole 112. On the paper in FIG. 11, set the rotor rotation in the CCW direction to the positive direction. Concentration windings are wound around the stator poles in each phase. The circumferential center position of the first phase stator pole 112 is at the rotation angle θ=0 [°] of the motor. A reference number 115 indicates the first rotor pole among the rotor poles, and the starting point of the rotor is the circumferential center position of the first rotor pole 115. On the paper in FIG. 11, rotation in the CCW direction is forward rotation. Reference number 116 indicates the second rotor pole. A reference number 115 indicates an S-pole permanent magnet. The second rotor pole 116 is an N-pole permanent magnet. S and N poles are arranged alternately in the circumferential direction. Unlike the structures shown in FIGS. 1, 9, and other drawings, in this example there is no spatial area between the permanent magnets 115 and 116, i.e., a region of low magnetic flux density B. The magnetic flux density B on the surfaces of permanent magnets 115 and 116 is a constant value.

The configuration in FIG. 12 is described next. FIG. 12 is a linear development of the cross-section of the motor shown in FIG. 11. FIG. 12 shows a portion of the motor in FIG. 11. The outside of the left and right dashed areas in FIGS. 12(*a*) and 12(*b*) are omitted. The right direction in the paper of FIG. 12 indicates the counterclockwise rotation direction CCW in the paper of FIG. 11. Reference number 121 in FIG. 12(*a*) shows the stator, and reference number 124 in FIG. 12(*b*) shows the rotor. Reference number 122 corresponds to the element 112 shown in FIG. 11 and indicates the first phase stator pole. The stator pole 128 is a phase with a phase delay of the circumferential pitch θsp of the stator poles relative to the first phase stator pole 122. Reference number 123 indicates the concentrated winding around the first phase stator pole 122. A reference number 125 corresponds to the element 115 shown in FIG. 11 and indicates an S-pole permanent magnet. The circumferential pitch of each permanent magnet is 180 [°] in electric angle. Reference number 126 and 12D indicate permanent magnets with N-pole poles.

The total circumference of the motor is 360×3=1080 [°] in electrical angle, since this motor has 6 poles. The circumferential pitch θsp of the stator pole is 1080/4=270 [°]. This value of pitch θsp is large. Therefore, at the rotor rotation position θ=0 [°] in FIG. 12 (*b*), some of the magnetic flux from N-pole poles 126 and 12D circulates through S-pole pole 125 in the cog of stator pole 122. Thus, the magnetic fluxes are offset in the cog. As a result, the maximum value of interlinkage flux effectively acting on the concentrated winding 123 depends on the magnetic flux at a width of 180−(270−180)=90 [°] in electric angle. The problem is that the magnetic flux is significantly reduced and torque is also reduced. The aforementioned circulating and countervailing magnetic fluxes also act to locally magnetically saturate the cog, which is harmful and problematic in this sense.

Next, FIG. 12(*c*) shows the specific characteristics of the motor configuration shown in FIGS. 12(*a*) and 12(*b*), including the induced voltage waveforms. In FIG. 12(*c*), the dashed line shows the magnetic flux density distribution of the rotor poles. This distribution is rectangular in shape and has a rotor pole width θrt of 180 [°] at an electric angle. The amplitude of the flux density is normalized to 1.0. The single-pointed line indicates the interlinkage flux φ of the concentrated winding 123 wound around the first phase stator pole 122. Some of the magnetic fluxes of the S and N poles are circulated and offset in the cog of the first phase stator pole 122. Therefore, the maximum value of its magnetic flux φ is 90, and the rotor angle width is only 90 [°]. The solid line shows the induced voltage V of the concentrated winding 123, whose amplitude is normalized to 1.0. The shape of the induced voltage V is illustrated under the 7S8R motor configuration shown in FIG. 1. In other words, in the case of the characteristic shown in FIG. 2(*c*), the width of V=1.0 was 128 [°] in magnitude, but in the case of the 4S6R motor configuration shown in FIGS. 11 and 12 (*c*), the width of V=1.0 decreases to 90 [°] and the average voltage decreases. Therefore, torque is also reduced. The difference in motor configuration is reflected in the difference in motor output characteristics.

Next, the example shown in FIG. 12(*d*) is explained. Compared to the distribution of the magnetic flux density of the square wave shown in FIG. 12(*c*), the distribution of magnetic flux density B shown in FIG. 12(*d*) varies in a trapezoidal shape at the boundary between the S- and N-pole permanent magnets, as shown in the figure. This trapezoidal shape has an increasing portion of 15 [°], a flat portion of 150 [°], and a decreasing portion of 15 [°], with alternating distribution of positive N-poles and negative S-poles. The single-pointed line indicates the interlinkage flux φ of the concentrated winding 123 wound around the first phase stator pole 122. Some of the magnetic fluxes of the S and N poles are circulated and offset within the cog of the first phase stator pole 122. Therefore, the maximum value of the magnetic flux φ is 90, which is the same value shown in FIG. 12(*c*). The solid line shows the induced voltage V of the concentrated winding 123, whose amplitude is normalized to 1.0. This induced voltage V has a trapezoidal shape with a width of V=1.0 decreasing to 60 [°]. This changes from the square wave shown in FIG. 12(*c*) to the trapezoidal wave shown in FIG. 12(*d*).

As shown above, the motor configuration shown in (a) and (b) of FIGS. 11 and 12 has its stator pole pitch θsp as large as 270 [°]. Thus, the magnetic flux of the neighboring rotor poles circulates and offset in the stator poles, so that part of the flux does not act effectively. As a result, the induced voltage drops and torque decreases. In addition, as mentioned above, as the circulating and countervailing fluxes in the cog increase, a local magnetic saturating effect occurs, causing an increase in torque ripple and other harmful problems.

Next, the example of the third exemplary mode is described based on the motor cross-sectional view in FIG. 13. This example eliminates the problems associated with FIGS. 11 and 12 and increases the output torque of the motor. Reference number 131 indicates the stator, reference number 134 indicates the rotor, and reference number 137 indicates the rotor shaft. The number of stator poles is 4 and the number of rotor poles is 6. According to the nomenclature method, a 4S6R motor configuration is indicated. In the motor configuration shown in FIG. 13, a bypass magnetic path PBP, indicated by reference numbers 13F and 13E, is further added between each stator pole. This bypass magnetic path PBP allows unwanted and harmful flux components to pass between the rotor and stator. This eliminates the aforementioned problems described using FIGS. 11 and 12 and improves the torque characteristics of the motor. No windings are wound in the bypass magnetic paths PBP, which is 13F and 13E.

A reference number 132 indicates the first phase stator pole, and a reference number 133 indicates the concentrated winding wound around the first phase stator pole 132. Stator pole 138 is a phase with a phase delay corresponding to the circumferential pitch θsp of the stator poles relative to the first phase stator pole 132. Rotor rotation in the CCW direction is set as positive rotation on the paper in FIG. 13. Concentration windings are wound around the stator poles in each phase. The circumferential center position of the first phase stator pole 132 is set as the position of the motor rotation angle θ=0 [°]. Reference number 135 indicates the first rotor pole among the rotor poles. The starting point of the rotor is set at the circumferential center position of the first rotor pole 135. Rotor rotation in the CCW direction on the paper in FIG. 13 is treated as forward rotation. Reference number 136 indicates the second rotor pole. Reference number 135 indicates an S-pole permanent magnet, and reference number 136 indicates an N-pole permanent magnet. S and N poles are arranged alternately in the circumferential direction. A space (i.e., magnet-to-magnet space) or portion (i.e., magnet-to-magnet portion) of low magnetic flux density is provided between the permanent magnet 135 and the permanent magnet 136. The magnetic flux density on the surfaces of permanent magnets 135 and 136 is a constant value.

Next, the configuration in FIG. 14 is explained. FIG. 14 is a linear development of the cross-section of the motor shown in FIG. 13. This development shows a portion of the motor shown in FIG. 13, and the outside of the left and right dashed areas shown in FIGS. 14(*a*) and 14(*b*) are omitted from the figure. The right direction in the paper in FIG. 14 shows the counterclockwise CCW rotation in the paper in FIG. 13. In FIG. 14(*a*), reference number 141 indicates the stator, and in FIG. 14(*b*), reference number 144 indicates the rotor. A reference number 142 corresponds to component 132 in FIG. 13 and indicates the first phase stator pole. A stator pole 148 is a phase with a phase delay corresponding to the circumferential pitch θsp of the stator poles relative to the first phase stator pole 142. A reference number 143 indicates the concentrated winding around the first phase stator pole 142. A reference number 145 corresponds to component 135 shown in FIG. 13 and indicates an S-pole permanent magnet. The circumferential pitch of each permanent magnet is 180 [°], expressed as an electric angle. Reference numbers 146 and 14D indicate N-pole permanent magnets.

The total circumference of the motor is 360×3=1080 [°] in electrical angle, since this motor has 6 poles. The circumferential pitch θsp of the stator poles is 1080/4=270 [°]. The circumferential width θbp of the bypass magnetic paths PBP, which is 13F and 13E, is 60 [°] as an example. The characteristic shown in FIG. 14(*c*) is that the circumferential width θrt of each permanent magnet of the rotor is 150 [°]. The boundary between each permanent magnet is a space and its circumferential width θou is 30 [°] as an example. The dashed line shows the magnetic flux density distribution of the rotor poles. The amplitude of the flux density is normalized to 1.0. The single-pointed line indicates the interlinkage flux φ of the concentrated winding 143 around the first phase stator pole 142. The maximum value of its interlinkage flux φ is 150. The solid line shows the induced voltage V of the concentrated winding 143, whose amplitude is normalized to 1.0. The induced voltage V has a staircase-like waveform, the circumferential width of which V=1.0 is 120 [°], and both sides of the waveform are staircase-like and falling. Slight smoothing of this staircase-shaped waveform results in an AC voltage waveform with an abbreviated trapezoidal shape. The average voltage increases 10/6=1.67 times compared to the induced voltage V in the motor without the bypass magnetic path PBP shown in FIG. 12(*c*). The characteristics shown in FIG. 14(*c*) are exactly the same as those shown in FIG. 4(*d*), shown earlier as a motor model with relatively good performance. In other words, the motor shown in FIG. 14 physically has a stator pole pitch θsp=270 [°], but the characteristics shown in FIG. 4(*d*), where stator pole pitch θsp=210 [°], have been obtained.

Next, the characteristic shown in FIG. 14(*d*) corresponds to the characteristic obtained when the distribution of magnetic flux density B, indicated by the dashed line, is changed to a trapezoidal shape compared to that shown in FIG. 14(*c*). In other words, the flux distribution has a trapezoidal shape with an increasing portion of 15 [°], a flat portion of 150 [°], and a decreasing portion of 15 [°], with alternating positive and negative components. The single-pointed line indicates the interlinkage flux φ of the concentrated winding 143 around the first phase stator pole 142. The solid line shows the induced voltage V generated in the concentrated winding 143. Its amplitude is normalized to 1.0. The induced voltage V has a circumferential width of 120 [°] with V=1.0 and a trapezoidal shape with a constant slope down on both sides. The average voltage increases 10/6=1.67 times compared to the induced voltage V that occurs in a motor without a bypass magnetic path PBP shown in FIG. 12(*d*). The characteristics shown in FIG. 14(*c*) are exactly the same as those shown in FIG. 5(*d*), described earlier as a motor model with relatively good performance. The motor shown in FIG. 14 has a stator pole pitch θsp=270 [°], but in terms of performance, the characteristics shown in FIG. 5(*d*) with stator pole pitch θsp=210 [°] have been obtained.

Next, the characteristics illustrated in FIG. 14(*e*) are explained. In this characteristic, as shown by the dashed line, to increase the amount of magnetic flux from that shown in FIG. 14(*d*), the distribution of magnetic flux density B is set in a trapezoidal shape with its increasing part at 7.5 [°], its flat part at 165 [°], and its decreasing part at 7.5 [°]. This corresponds to θrt=165 [°] and θou=15 [°] in equation (8). The circumferential width θstg of the tooth tip facing the air gap section of the stator pole has the relationship shown in equation (16) and is 195 [°]. The circumferential width θbp of the tooth tip of the bypass path is 75 [°], as described in equation (15).

The single-pointed line shown in FIG. 14(*e*) shows the interlinkage flux φ with the concentrated winding 143 wound around the first phase stator pole 142. The maximum value of this interlinkage flux is 165. The solid line shows the induced voltage V of the concentrated winding 143. Its amplitude is normalized to 1.0. The induced voltage V has a circumferential width of 150 [°] at V=1.0 and a trapezoidal waveform with a constant slope down on both sides. Compared to the induced voltage V of a motor without a bypass magnetic path PBP, shown in FIG. 12 (*d*), the average voltage has increased by 11/6=1.83 times.

However, assume a configuration with the relationship in equations (19) and (20), where the maximum flux density Bagm of the rotor pole shown in FIG. 14(*e*) is close to and larger than the maximum flux density Bstm of the stator pole. In this assumption, the circumferential width of the slot, θss, is a small value, which reduces the amount of windings that can be wound, resulting in lower torque. For example, if Bagm and Bstm are 2.0 [T], then θss=30 [°], a small value from equation (20). In the case of Bagm=1.7 [T] and Bstm=2.0 [T], a value of θss=66 [°] is taken, which is a practical value with increased winding dose from equation (20). Thus, if the maximum flux density Bagm of the rotor pole is slightly smaller than the maximum flux density Bstm of the stator pole, the rotor pole width θrt can be increased to near the limit, as shown in FIG. 14(*e*). In this case, the circumferential width of the slot, θss, can be secured to some extent.

As shown in FIGS. 13 and 14 above, for motors with a configuration in which the pitch θsp of the stator poles is large, the circumferential width θstg of the cog tip facing the air gap of the stator pole can be set to an optimal value by adding a bypass magnetic path PBP. As mentioned above, the induced voltage characteristics of the motor can be freely adjusted by the stator pole pitch θstg and the magnetic flux density B distribution of the rotor poles. Of course, the bypass magnetic path PBP does not generate torque. Therefore, the condition that the induced voltage characteristics of each stator winding are optimal and the circumferential width θbp of the bypass path PBP is small is more favorable. In the case of a motor with a configuration that allows the bypass path PBP to be installed after the winding is wound, the space where the bypass magnetic path PBP should be installed can be used as free space for winding the winding. This improves the productivity of the winding fabrication process.

Figure 15:
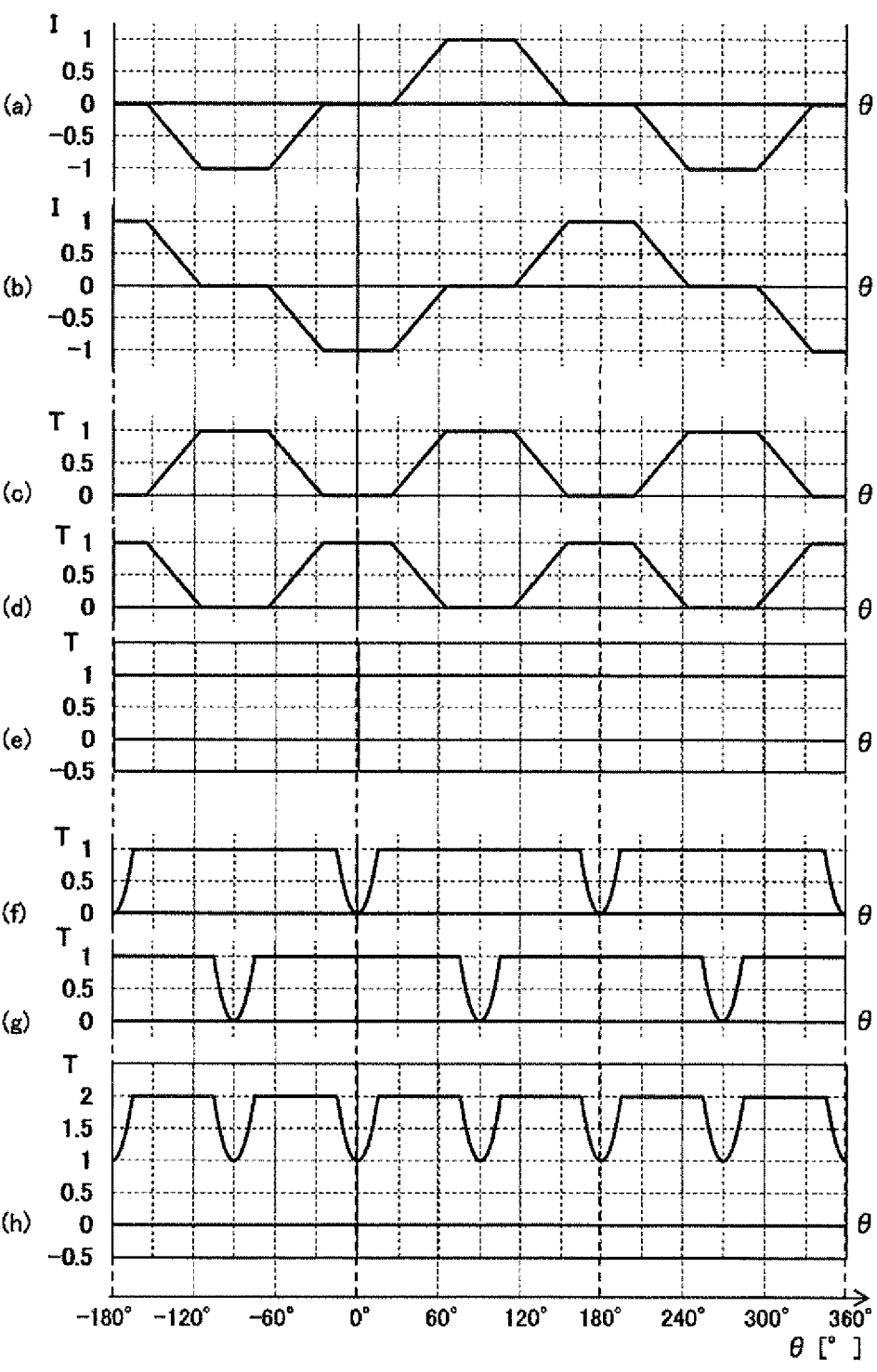
FIG. 15 is a graph exemplifying current waveforms and torque changes.

Next, FIG. 15 describes the torque ripple problem that occurs in the motors shown in FIGS. 13 and 14. A motor with the 4S6R configuration shown in FIGS. 13 and 14 will have 180 [°] opposite stator poles and target configuration in terms of machine angle. Therefore, this motor can be controlled with two phase currents for the first and second phases. In such a case, when the induced voltage shown in FIG. 14 is generated, a large torque ripple is generated, for example, if a trapezoidal-shaped current with the same waveform is energized. This is theoretically a torque ripple because the number of phases is only two and not sinusoidal. The characteristics of the induced voltage of a motor composed of permanent magnets are limited in the range that can be varied during motor operation, but the waveform of the motor current can be freely controlled by its drive circuit.

An example of torque ripple support is shown in FIG. 15. First, an example of controlling the torque region below 1/2 of the maximum torque in a motor with configuration 4S6R shown in FIGS. 13 and 14 is described. Assume now that the induced voltage of the winding of the first phase lags the phase of the induced voltage of the winding of the second phase by 90 [°] in electrical angle behind the value shown in FIG. 14(*e*). The solid line shown in FIG. 14(*e*), which indicates the induced voltage of the first phase, changes as follows. That is, the induced voltage is 1.0 for 0 from 15 [°] to 165 [°] and −1 for 0 from 195 [°] to 345 [°]. The current in the first phase winding is energized as a trapezoidal current waveform with θ between 25 [°] and 65 [°] and θ between 205 [°] and 355 [°], as shown in FIG. 15(*a*). In this case, the induced voltage during this period is a constant value that takes +1 and −1, so the torque generated is shown in FIG. 15 (*c*). On the other hand, the induced voltage of the second phase winding is assumed to lag behind its phase by 90 [°] in electrical angle with respect to FIG. 14(*e*). Therefore, the induced voltage is 1.0 for θ from 105 [°] to 255 [°] and −1 for θ from 285[d° ] to 435 [°]. As an example, the current in the second phase winding is energized as a trapezoidal current waveform between θ from 115 [°] to 155 [°] and between θ from 295 [°] to 4455 [°], as shown in FIG. 15(*b*). In this case, the induced voltages between them are constant values, taking +1 and −1, respectively. Therefore, its generated torque is shown in FIG. 15 (*d*). As a result, the total torque of phases 1 and 2 becomes a constant value, as shown in FIG. 15 (*e*). In simple theory, the torque ripple can be reduced to zero, resulting in a quiet motor drive with low vibration and noise.

On the other hand, in a motor with the 4S6R configuration shown in FIGS. 13 and 14, the following is an example of controlling a large torque range, such that the motor is driven by the maximum current of the transistors in a given drive circuit. In this case, the current cannot be constrained as shown in FIGS. 15(*a*) and 15(*b*). Therefore, the first phase current waveform must be trapezoidal, as shown by the solid line in FIG. 14(*e*). The torque then takes on the shape shown in FIG. 14(*f*). Similarly, the current waveform of phase 2 is delayed by 90 [°] in phase from that of the first phase, and the torque of phase 2 has the shape shown in FIG. 14(*g*). Any waveform is shown normalized, with its maximum value shown as 1.0. The total torque for the first and second phases has the shape shown in FIG. 14(*h*). At this time, the torque ripple is 50%, which is a large value. However, the motor with the 4S6R configuration shown in FIGS. 13 and 14 can be controlled with two sets of currents, which has the great advantage of simpler drive equipment and lower cost. Also, when driven at low torque, vibration and noise are low. For this reason, there are many applications where it does not matter if the torque ripple increases at high torque above a certain speed, as long as the motor drives quietly.

Fifth Embodiment

Figure 18:
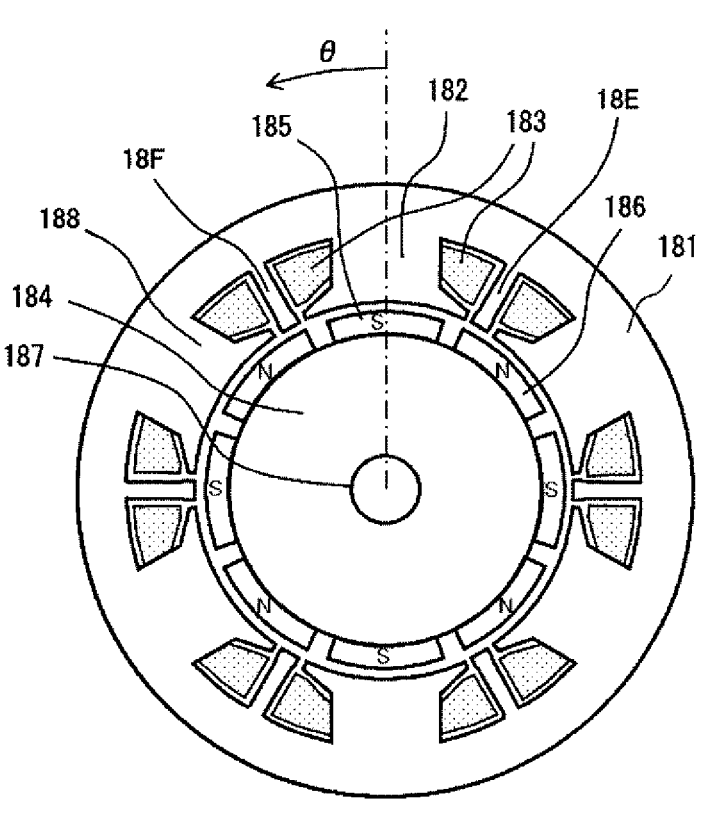
FIG. 18 is a laterally sectioned view of a motor whose number of stator poles is 6 and whose number of rotor poles is 8.
Figure 19:
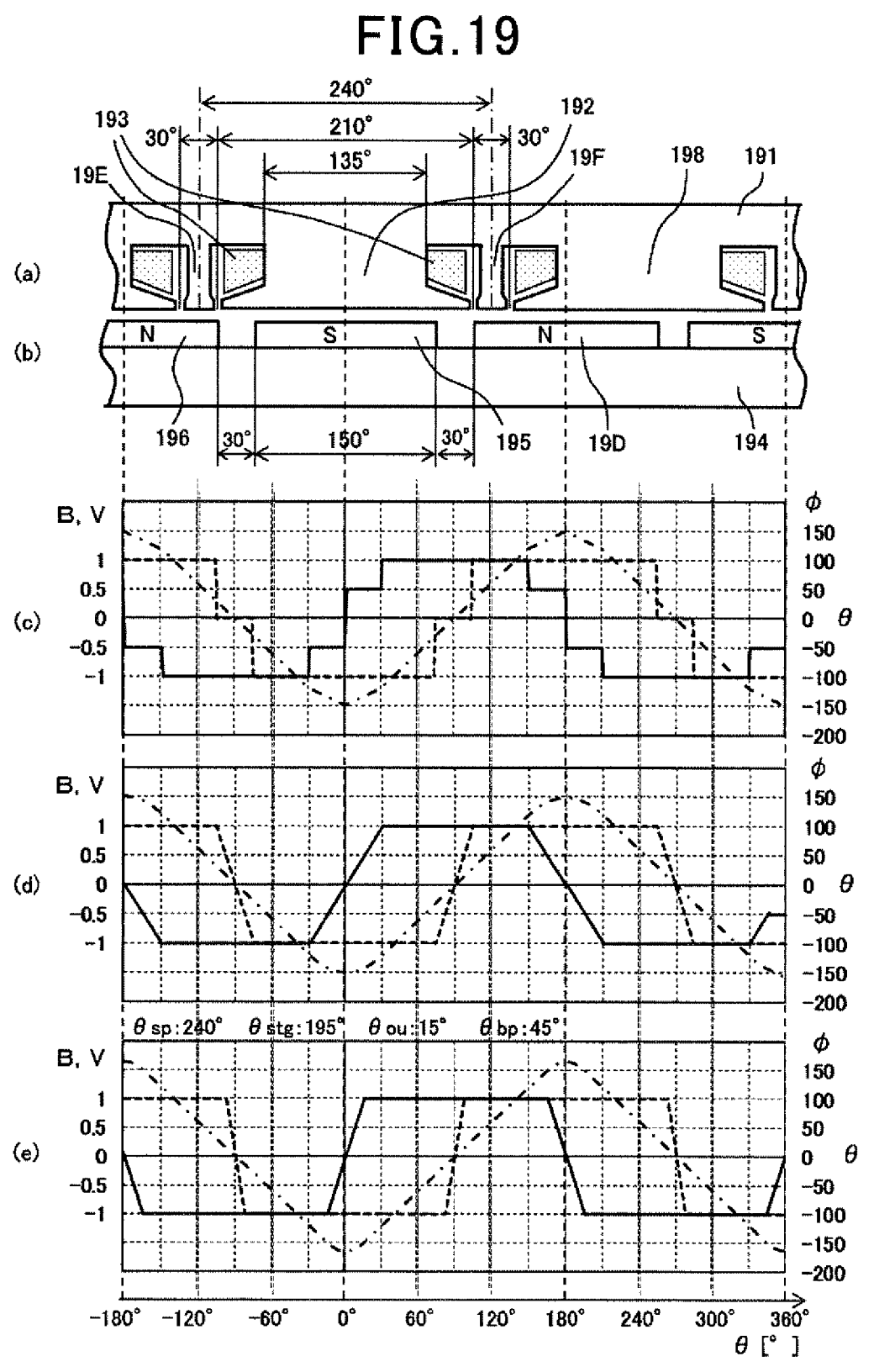

Next, the motor according to a further example of the third exemplary mode is shown in FIGS. 18 and 19. In this motor, the number of stator poles PS is 6 and the rotor poles PR are 8, having a motor configuration that is called 6S8R according to this nomenclature. Similar to the configuration shown in FIG. 13, the configuration has a bypass magnetic path PBP between each stator pole. The motor configuration shown in FIG. 18 is driven by 3-phase voltage and current.

Figure 16:
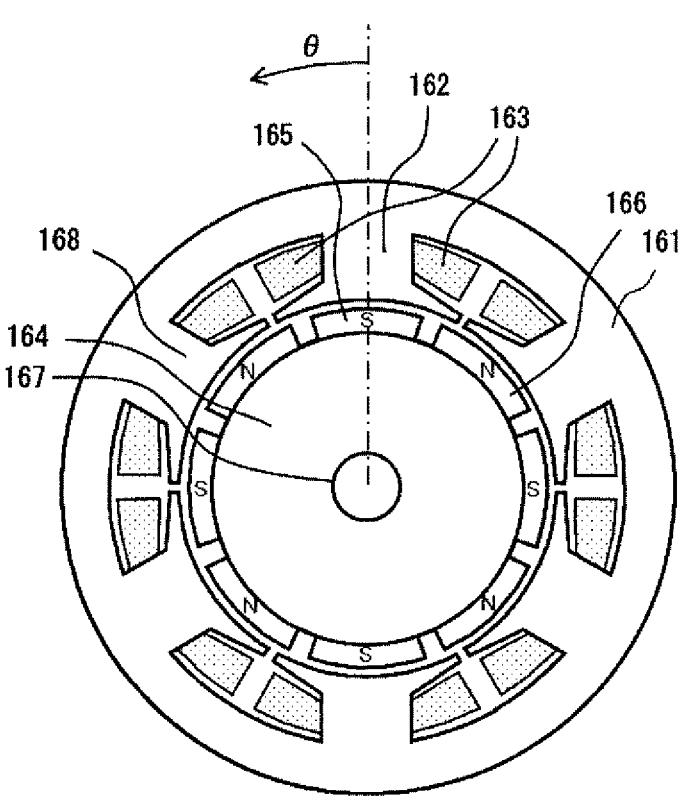
FIG. 16 is a laterally sectioned view of a motor whose number of stator poles is 6 and whose number of rotor poles is 8.
Figure 17:
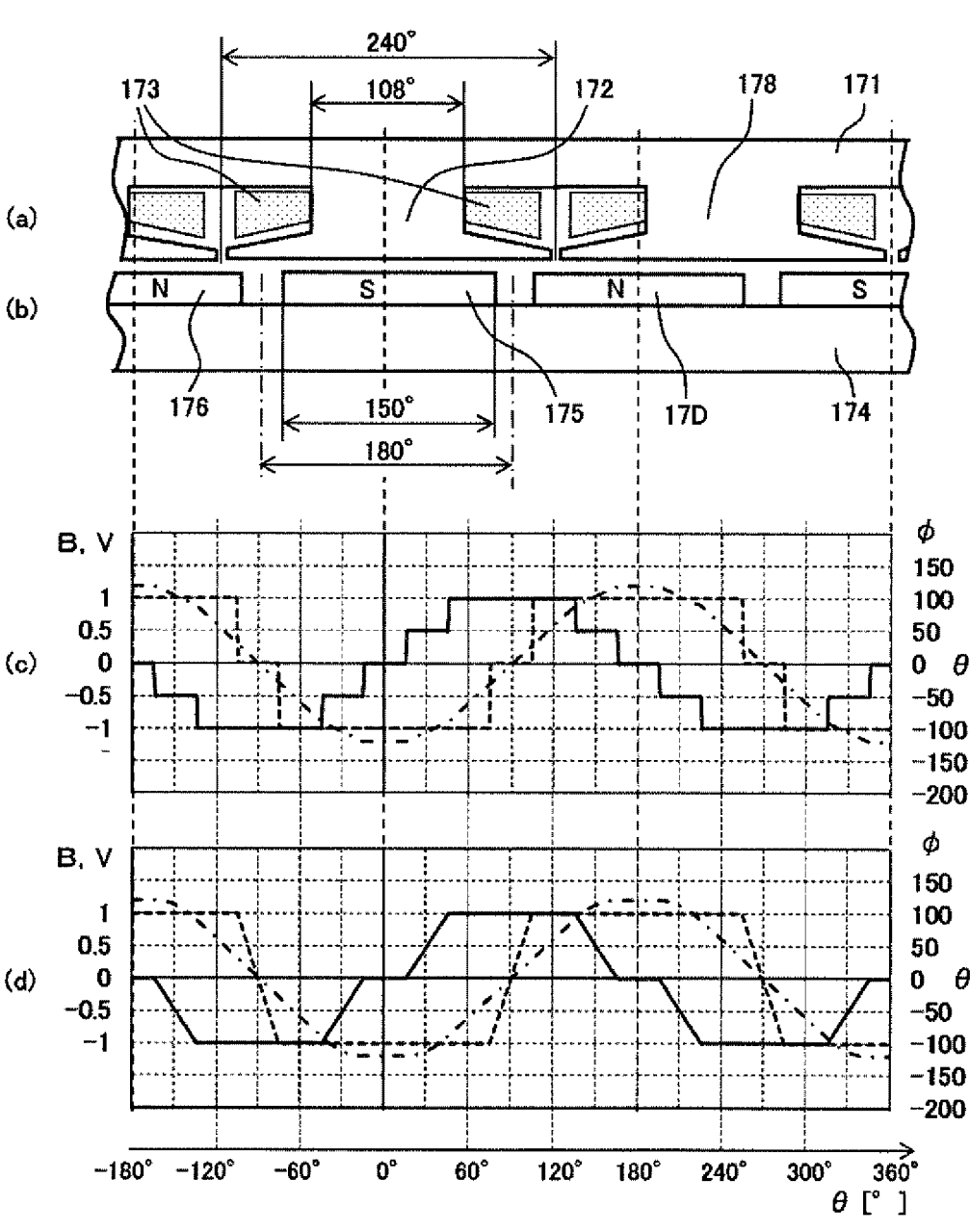
FIG. 17 is an illustration exemplifying a distribution of magnetic fluxes, states of interlinkage magnetic fluxes, and induced voltages.

Before explaining FIGS. 18 and 19, the motor configuration of 6S8R without an additional bypass magnetic path PBP is shown in FIGS. 16 and 17 to illustrate its characteristics and problems. FIG. 16 shows a cross-sectional view of the motor before applying the third exemplary mode. Reference number 161 indicates the stator, reference number 164 indicates the rotor, and reference number 167 indicates the rotor shaft. The number of stator poles PS is 6 and the number of rotor poles PR is 8, forming a 6S8R motor configuration according to the nomenclature. A reference number 162 indicates the first phase stator pole, and a reference number 163 indicates the concentrated winding wound around the first phase stator pole 162. A stator pole 168 is a phase that has a phase delay relative to the first phase stator pole 162 by the circumferential pitch θsp of the stator poles. On the paper in FIG. 16, rotor rotation in the CCW direction is defined as the positive direction. Concentration windings are wound around the stator poles in each phase. The circumferential center position of the first phase stator pole 162 is set at the rotation angle of the motor θ=0 [°]. A reference number 165 indicates the first rotor pole among the rotor poles. The starting point of the rotor is set at the circumferential center position of the first rotor pole 165. Rotation in the CCW direction is positive on the paper in FIG. 16. A reference number 166 indicates the second rotor pole. A reference number 165 indicates an S-pole permanent magnet, and a reference number 166 indicates an N-pole permanent magnet. S and N poles are arranged alternately in the circumferential direction. A space or space portion is provided between permanent magnets. The magnetic flux density B on the surfaces of permanent magnets 165 and 166 is a constant value in this example.

Next, the configuration in FIG. 17 is explained. FIG. 17 is a development of the motor shown in FIG. 16 in a linear cross-sectional view. This figure shows a portion of the motor in FIG. 16, and the outside of the dashed portions on the left and right in FIGS. 17(*a*) and 17(*b*) are omitted. The right direction on the paper in FIG. 17 corresponds to the counterclockwise rotation direction CCW on the paper in FIG. 16. Reference number 171 indicates the stator in FIG. 17(*a*), and reference number 174 indicates the rotor in FIG. 17(*b*). Reference number 172 corresponds to element 162 in FIG. 16 and indicates the first phase stator pole. A stator pole 178 is a phase with a phase delay relative to first phase stator pole 172 by the circumferential pitch θsp of the stator poles. Reference number 173 indicates the concentrated winding that is wound around the first phase stator pole 172. A reference number 175 corresponds to element 115 in FIG. 11 and indicates an S-pole permanent magnet. The circumferential pitch of each permanent magnet is 180 [°] in electric angle. Reference numbers 176 and 17D indicate permanent magnets with N poles.

The total circumference of the motor is 360×4=1440 [°] in terms of electric angle, since the motor has 8 poles. In addition, the circumferential pitch θsp of the stator poles is 1440/6=240 [°]. This value of pitch θsp is rather large, and at the rotor rotation position θ=0 [°] shown in FIG. 12(*b*), a portion of the magnetic flux of N-pole poles 126 and 12D circulates opposite the flux of S-pole pole 125 and offsets in the cog within the cog of stator pole 122. As a result, the maximum value of interlinkage flux effectively acting on the concentrated winding 123 is provided by the magnetic flux at a width of 180−(240−180)=120 [°], in terms of electrical angle. This flux is significantly lower than that at 180 [°] of the rotor pole pitch, and therefore the torque is also reduced. The circulating and counterbalancing magnetic fluxes cause local magnetic saturation in the cog and reduce performance, so improvements are needed.

Next, FIG. 17(*c*) shows the specific characteristics of the motor configuration shown in FIGS. 17(*a*) and 17(*b*), including the induced voltage waveforms. The dashed lines show the magnetic flux density distribution of the rotor poles. This distribution is rectangular in shape and has a rotor pole width θrt of 150 [°] at an electric angle. The amplitude of the magnetic flux density B is normalized to 1.0. The single-pointed line indicates the interlinkage flux φ of the concentrated winding 173 around the first phase stator pole 172. Some of the magnetic fluxes of the S and N poles are circulated within the cog of the first phase stator pole 172 to cancel each other out. Therefore, the maximum value of its magnetic flux φ is 120, and the rotor angle width is only 120 [°]. The solid line shows the induced voltage V of the concentrated winding 173, whose amplitude is normalized to 1.0. From the viewpoint of the shape of the induced voltage V, the width of V=1.0 was 128 [°] in the characteristics shown in FIG. 2(*c*), for the 7S8R motor configuration shown in FIG. 1. In contrast, in the case of the 6S8R motor configuration shown in FIGS. 16 and 17 (*c*), the width of V=1.0 decreased to 90 [°] and the average voltage decreased. Therefore, the torque also decreases. The waveform of the induced voltage V was staircase-shaped.

The next example is shown in FIG. 17 (*d*). Compared to the square wave magnetic flux density distribution shown in FIG. 17(*c*), the magnetic flux density B shown in FIG. 17(*d*) has a flux density distribution that varies in a trapezoidal shape at the boundaries of the S and N pole permanent magnets, as shown in the figure. Its trapezoidal shape has an increasing portion of 15 [°], a flat portion of 150 [°], and a decreasing portion of 15 [°], with alternating distribution of positive N-poles and negative S-poles. The single-pointed line indicates the change in interlinkage flux φ of the concentrated winding 173 around the first phase stator pole 172. Some of the magnetic fluxes of the S and N poles circulate in the cog of the first phase stator pole 172 and are offset. Therefore, the maximum value of its magnetic flux φ is 120, which is the same value as the flux shown in FIG. 17(*c*). The solid line shows the induced voltage V induced in the concentrated winding 173, whose amplitude is normalized to 1.0. In the shape of this induced voltage V, the width of V=1.0 decreases to 90 [°] and has a trapezoidal shape.

As shown above, the stator pole pitch θsp is as large as 240 [°] in the motor configuration shown in FIGS. 16 and 17(*a*), (*b*). Therefore, the magnetic flux of the neighboring rotor poles will circulate in the stator poles and cancel each other out, so that some of the magnetic flux will not be effective. As a result, the induced voltage drops and torque decreases. As mentioned above, when the circulating and countervailing fluxes in the cog become large, they are locally magnetically saturated. This causes inconveniences such as increased torque ripple.

Next, as another example of the third exemplary mode, a cross-sectional view of the motor is shown and described in FIG. 18. This is aimed at eliminating the problems described in connection with FIGS. 16 and 17 and increasing the output torque of the motor. Reference number 181 indicates the stator, reference number 184 indicates the rotor, and reference number 187 indicates the rotor shaft. The number of stator poles is 6 and the number of rotor poles is 8, and according to the nomenclature of this disclosure, a 6S8R motor configuration is provided. In the motor configuration shown in FIG. 18, a bypass magnetic path PBP, indicated by reference numbers 18F and 18E, is specially added between each stator pole. This bypass magnetic path PBP allows unwanted and harmful flux components to pass between the rotor and stator, eliminating the foregoing problems related to FIGS. 11 and 12 and improving the motor's torque characteristics. No windings are wound in the bypass magnetic paths PBP, i.e., 18F and 18E.

A reference number 182 indicates the first phase stator pole of, and a reference number 183 indicates the concentrated winding wound around the first phase stator pole 182. A stator pole 188 is a phase with a phase delay corresponding to the pitch θsp in the circumferential direction of the stator poles relative to the first phase stator pole 182. The CCW direction on the paper in FIG. 18 corresponds to positive rotor rotation. Concentration windings are wound around the stator poles in each phase. The circumferential center position of the first phase stator pole 182 is set at the rotation angle θ=0 [°] of the motor. Reference number 185 indicates the first rotor pole among the rotor poles, and the starting point of the rotor is the circumferential center position of the first rotor pole 185. Rotation in the CCW direction is set to forward rotation on the paper in FIG. 18. Reference number 186 indicates the second rotor pole. Reference number 185 indicates an S-pole permanent magnet, and reference number 186 indicates an N-pole permanent magnet. S and N poles are arranged alternately in the circumferential direction. Between the permanent magnets 185 and 186, there is a magnet-to-magnet space or a space whose magnetic flux density is low. The magnetic flux density on the surfaces of permanent magnets 185 and 186 is a constant value.

Next, the configuration shown in FIG. 19 is explained. FIG. 19 is a linear development of the cross-section of the motor shown in FIG. 18. This shows a portion of the motor shown in FIG. 18, and the outside of the left and right dashed areas in FIGS. 19(*a*) and 19(*b*) are omitted. The right direction in the paper in FIG. 19 indicates the counterclockwise rotation direction CCW in the paper in FIG. 18. In FIG. 19(*a*), reference number 191 indicates the stator, and in FIG. 19(*b*), reference number 194 indicates the rotor. Reference number 192 corresponds to element 182 in FIG. 18 and indicates the first phase stator pole. A stator pole 198 is a phase with a phase delay corresponding to the pitch θsp in the circumferential direction of the stator poles relative to the first phase stator pole 192. A reference number 193 indicates the concentrated winding around the first phase stator pole 192. A reference number 195 corresponds to element 185 shown in FIG. 18 and indicates an S-pole permanent magnet. The circumferential pitch of each permanent magnet is 180 [°] in electric angle. Reference number 196 and 19D are N-pole permanent magnets.

The total circumference of the motor is 360×4=1440 [°] in electrical angle, since this motor has 8 poles. The circumferential pitch θsp of the stator poles is 1440/6=240 [°]. The circumferential width θbp of the bypass path PBP, indicated by the reference numbers 19F and 19E, is 30 [°] as an example. The characteristic shown in FIG. 19(*c*) describes a configuration example in which the circumferential width θrt of each permanent magnet of the rotor is 150 [°], and the boundary portion (i.e., magnet-to-magnet portion) of those permanent magnets is a space, and furthermore, the circumferential width θou is 30 [°], which describes the configuration example. The dashed lines show the distribution of the magnetic flux density at the rotor poles. The amplitude of the magnetic flux density is normalized to 1.0. The single-pointed line indicates the interlinkage flux φ of the concentrated winding 193 around the first phase stator pole 192. The maximum value of this interlinkage flux φ is 150. The solid line is the induced voltage V induced in the concentrated winding 193, amplitude normalized to 1.0. The induced voltage V has a circumferential width of 120 [°] at V=1.0, and both sides of the voltage have a staircase-like voltage waveform. Slight smoothing of this staircase shape results in an AC voltage waveform with an abbreviated trapezoidal shape. Compared to the induced voltage V of the motor without the bypass magnetic path PBP shown in FIG. 17(*c*), the average voltage has increased 10/8=1.25 times. The characteristics shown in FIG. 19(*c*) are the same as those in FIG. 14(*c*), shown earlier as an example of a relatively good motor model, and also the same as those shown in FIG. 4(*d*). The stator pole pitch θsp of the motor shown in FIG. 19 is θsp=240 [°], and the characteristics shown in FIG. 4(*d*), where the stator pole pitch θsp=210 [°], are obtained.

Next, the characteristic shown in FIG. 19(*d*) represents an example of trapezoidal adjustment of the distribution of magnetic flux density B, indicated by the dashed line, if compared to the characteristic shown in FIG. 19(*c*). It is trapezoidal in shape with its increasing part 15 [°], its flat part 150 [°], and its decreasing part 15 [°], and has a repeated flux distribution with alternating positive and negative. The single-pointed line indicates the interlinkage flux φ of the concentrated winding 193 around the first phase stator pole 192. The solid line shows the induced voltage V of the concentrated winding 193, whose amplitude is normalized to 1.0. The shape of the induced voltage V is a trapezoidal shape with a circumferential width of 120 [°] at V=1.0 and a constant slope on both sides. Compared to the induced voltage V of the motor without the bypass magnetic path PBP shown in FIG. 17(*d*), the average voltage has increased 10/8=1.25 times. The characteristics shown in FIG. 19(*d*) are exactly the same as those shown in FIG. 5(*d*), which have been already described as a relatively good motor model. The stator pole pitch θsp of the motor shown in FIG. 19 is θsp=270 [°], and the characteristics shown in FIG. 5(*d*), where the stator pole pitch θsp=210 [°], are obtained.

Next, the characteristic example in FIG. 19(*e*) is explained. This example is intended to increase the magnetic flux, as shown by the dashed line, over the flux shown in FIG. 19(*d*). Specifically, the distribution of magnetic flux density B is set in a trapezoidal shape with an increasing part=7.5 [°], a flat part=165 [°], and a decreasing part= 7.5 [°]. This corresponds to θrt=165 [°] and θou=15 [°] in equation (8). The circumferential width θstg of the cog tip facing the air gap section of the stator pole is 195 [°], based on the relationship in equation (16). The circumferential width θbp of the cog tip of the bypass magnetic path is 45 [°] from formula (15).

The single-pointed line shown in FIG. 19(*e*) shows the interlinkage flux φ of the concentrated winding 193 around the first phase stator pole 192, with a maximum value of 165. The solid line is the induced voltage V induced in the concentrated winding 193, whose amplitude is normalized to 1.0. The induced voltage V has a circumferential width=150 [°] with V=1.0, and its sides are trapezoidal voltages with constant slope. The average voltage is increased by 11/8=1.375 times compared to the induced voltage V of the motor without the bypass magnetic path PBP shown in FIG. 17(d).

However, as explained in the example shown in FIG. 14(e), from equation (20), there is a trade-off between the circumferential width of the slot θss and the magnetic flux density Bagm of the rotor poles. Therefore, when the rotor pole width θrt is close to and larger than the maximum flux density Bstm of the stator poles, care must be taken to ensure that the slot circumferential width θss is sufficient. These four parameters are correlated and have relationships from equations (15) to (20).

As shown above in FIGS. 14 and 19, even if the stator pole pitch θsp is large, good induced voltage characteristics can be obtained by adding an appropriate bypass magnetic path PBP. This allows for greater motor torque. In other words, the width θbp of the bypass path PBP can be freely selected and designed according to the motor characteristics required for each application, and at the same time, the distribution of the rotor magnetic flux density B can be optimized. This optimizes motor characteristics.

Sixth Embodiment

Next, a fourth exemplary mode will now be described. In this disclosure, the number of stator poles is NS3×NN3 and the number of rotor poles is NR3×NN3. It relates to motors with a configuration where NS3/(NR3/2) is an irreducible fraction when NN3 is a positive integer. In the fourth exemplary mode, if NS3 is odd, the motor is controlled by the current of phase NS3. At this time, the NN3 motor windings of the same phase are connected in series to stator windings of form set NS3, and the current of phase NS3 is applied to each stator winding. On the other hand, if NS3 is an even number, the motor is controlled by current of phase (NS3/2). At this time, (NN3×2) motor windings of the same and opposite phases are connected in series to stator windings of form set (NS3/2), and current of phase (NS3/2) is energized in each stator winding. Since NS3/(NR3/2) is assumed to be an irreducible fraction, when NS3 is even, (NR3/2) is odd, and there are no other divisors between NS3 and (NR3/2).

The purpose of the fourth exemplary mode is to both improve the torque of the motor and reduce the torque ripple that increases with it. As shown in FIGS. 1, 9, 13, 18, etc., to increase the motor torque, it is effective to increase the magnetic flux density B of the rotor poles and to energize a trapezoidal current by inducing a trapezoidal induced voltage as close to a rectangular shape as possible. FIG. 21 shows examples of voltage V, current I, and torque T for sinusoidal and trapezoidal waves. Each value is normalized and is shown with an amplitude of 1.0. A single-pointed line indicates a sinusoidal AC voltage waveform and a current waveform with the same waveform shape. The two-pointed chain line then indicates the power defined by their product. This power is proportional to torque. The dashed line shows the voltage waveform of a trapezoidal AC with the same amplitude as the sine wave, and the current waveform with the same waveform shape. The solid line is their product, which is proportional to torque. However, this is subject to the condition that it is valid under a constant rotation speed, and neglects factors such as resistance loss, iron loss, friction loss, etc., as well as magnetic energy and stored energy of kinetic energy. As shown in the figure, the trapezoidal waveform is represented by an AC waveform with an increasing part of 30 [°] in width, a flat part of 120 [°] in width at a constant value, and a decreasing part of 30 [°] in width, which takes positive and negative values. If the average torque of the voltage and current of the sine wave shown by the two-pointed chain line is 1.0, the average torque of the trapezoidal wave in the solid line is 1.555. In addition, since the voltage and current of each phase of the motor is assumed to be trapezoidal wave AC, the torque of each phase is 1.555 times higher than that of sinusoidal wave AC. Furthermore, the total torque of the motor is the sum of the torque components of each phase.

The torque produced when the width of the flat portion, which is the constant value portion of the trapezoidal waveform, is 180 [°], i.e., a completely square wave, is 2.0 times greater than the torque of a sine wave drive of the same amplitude although this is a theoretical value. The constant values of the trapezoidal waveform, with flat section widths of 150 [°], 120 [°], 90 [°], and 60 [°], are 1.777, 1.555, 1.333, and 1.111 times the torque compared to sinusoidal drive, respectively. When the width of the flat part, which is a constant value of the trapezoidal waveform, decreases to 60 [°], the torque is 1.111 times higher than that of the sinusoidal wave ratio, which is close to the torque generated when driving sinusoidal AC.

Regarding the copper loss of the motor, compared to the copper loss that occurs when driven at sine wave time, the copper loss that occurs when driven at square wave time is twice as great. The transistors driven by both waveforms have the same voltage and current amplitude, so the transistors also have the same current capacity. Here, the gain or loss that occurs when driving with a square wave is qualitatively checked compared to that of a sine wave. Under the condition that the total current capacity of the transistors in the drive circuit is the same, the torque of the square wave is doubled and the motor copper loss is also doubled as mentioned above. This allows the drive circuit to be relatively compact. Under the condition that the copper loss of the motor is the same, the current amplitude of the square wave is (1/1.414)=0.707. Therefore, the torque due to square wave driving is 1.414 times greater, and the current capacity of the transistor in the drive circuit operating with square wave can be downsized by a factor of 0.707. Although the differences in voltage and current waveforms are discussed here, other factors include the difference in magnetic flux density and the difference in torque reduction effect due to the winding coefficient of a sinusoidal AC motor, which will be discussed later. Therefore, the comparative total of the motor torque is the product of those ratios. For example, in the case of motor-driven electric vehicles, a large torque is required for driving on a steep uphill slope. As a result, the current capacity of the inverter's transistor requires a low-speed rotation and high-torque operation mode, so there are many applications like the one in this example. In addition, there are many applications that require a low-speed, high-torque operating mode for maximum motor losses. They are directly related to the overall cost of the motor system. Therefore, trapezoidal wave driving, which is close to square wave driving, is effective from those perspectives.

Next, a comparison that also takes into account winding coefficient and magnetic flux density will be explained. In the conventional motor with the 12S8R configuration shown in FIG. 34, the electromagnetic winding pitch of the concentrated winding is 1200 in electric angle, the short-pitch coefficient is cos 30°=0.866, the distributed coefficient is 1, and the winding coefficient is 0.866. Then, it is assumed that that the maximum flux density Bagm of the rotor pole is 1.2 [T], the magnetic flux distribution is a sinusoidal distribution, and the winding induced voltage waveform and current waveform are both sinusoidal waveforms. On the other hand, assume that the motor model of the motor for which the present disclosure is being compared is the one shown in FIGS. 5(*a*), 5(*b*), and 5(*d*). In other words, it is assumed that the rotor is driven by a trapezoidal wave induced voltage with an increasing section width of 30 [°], a constant value flat section width of 120 [°], and a decreasing section width of 30 [°], and the maximum flux density Bagm of the rotor poles is 1.8 [T]. Compared to the motor shown in FIG. 34, the torque multiplier of the motors shown in FIGS. 5(*a*), 5(*b*), and 5(*d*) is 2.693 times greater, as follows. Differences in waveforms, magnetic flux density, and winding coefficients are reflected.

$$1.555 \times 1.8/1.2 \times 1/0.866 = 2.693$$

Since the winding coefficient of a conventional motor varies depending on its motor model, it is also considered a conventional motor with a 9S8R configuration, which has a relatively large winding coefficient. When driven by 3-phase sinusoidal voltage and current, the maximum flux density Bagm of the rotor poles is assumed to be 1.8 [T]. The short-pitch coefficient cos 20°=0.940, which means that three windings are connected in series. Therefore, the voltage reduction factor corresponding to the distributed coefficient is 0.960, and the winding coefficient is 0.940× 0.960=0.902. Thus, as mentioned above, the torque is 2.586 times greater than the torque produced in the present disclosure, as follows.

$$1.555 \times 1.8/1.2 \times 1/0.902 = 2.586$$

As mentioned above, the torque of the motor model shown in FIGS. 5(*a*), 5(*b*), and 5(*d*) for this disclosure can generate 2.5 times larger torque than a conventional sine-wave motor with a 12S8R configuration and a 9S8R configuration under the aforementioned rotor flux density and the same maximum current value. Note that the above comparison is a simplified motor model comparison, not an exact but approximate comparison. The comparison is also not made under conditions where the motor copper loss is the same, as described above. In this example, the necessary condition for the motor is to generate torque by effectively utilizing the induced voltage of each concentrated winding, as described above. Specifically, when NS3 is odd, it is to be controlled by the current of phase NS3, and when NS3 is even, it is to be controlled by the current of phase (NS3/2). It can then be driven by the induced voltage of the trapezoidal wave and the current of the trapezoidal wave. However, a device may be added to reduce the total number of currents by connecting multiple windings in series that are close in phase to the induced voltage. The current waveform can also be modified as described later, for example, a sinusoidal current can be used in the high-speed rotation region.

Next, the torque ripple problem associated with higher torque and its solution will be described. The 12S8R conventional sine-wave motor and 9S8R conventional sine-wave motor described above are driven by a sine-wave current, which roughly follows 3-phase AC theory, making it easy to reduce torque ripple. In contrast, the torque of each phase due to the abbreviated trapezoidal wave voltage and abbreviated trapezoidal wave current of the present motor will contain many harmonic torque components, and measures to reduce the torque ripple of the motor as a whole are necessary. In the fourth exemplary mode, as described above, by making the motor multiphase with (NS3/2) phase currents, i.e., 5, 7, 8, etc. phases, the harmonic components of the multiphase torque are added and smoothed to reduce torque ripple.

Figure 22:
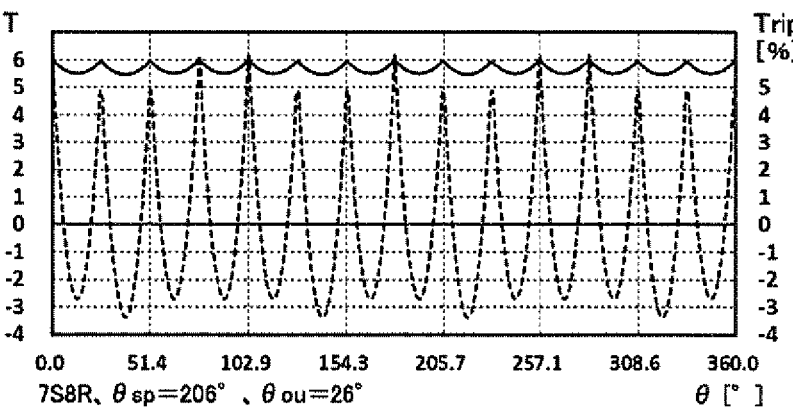
FIG. 22 is a graph exemplifying characteristics of changes in torque T and torque ripples Trip.

Next, FIG. 22 shows an example of the characteristics of torque T and torque ripple for the 7-phase motors shown in FIGS. 1 and 2(*a*) and (*b*). The characteristic shown in FIG. 22 is the characteristic obtained when, in the 7S8R configuration motor shown in FIG. 1, an induced voltage V with the waveform shape shown by the solid line in FIG. 2(*d*) is generated in the concentrated winding of each of the seven phases, and each of the seven phase currents I with the same waveform shape is energized in each phase winding. The amplitude values of V and I are normalized to 1.0 as shown in FIG. 2(*d*). The solid line in FIG. 22 shows the total torque; the average torque during 360° electric angle is 5.65. The dashed line indicates the torque ripple Trip [%], which is obtained from the following equation.

$$\text{Trip}=(\text{Torque value}-\text{Average torque})/\text{Average torque} \times 100 \quad (21)$$

The characteristics shown in FIG. 22 indicate that the torque ripple Trip is about 8 [% p-p]relative to the positive and negative peak values.

In FIG. 22, the reason why the torque ripple Trip shown by the dashed line swings up and down three times between 0 and 360 [°] of the motor rotation angle θ on the paper is as follows. This is because this calculation is performed in units of 1 [°] using spreadsheet software, and rotation angles θ less than 1 [°] have an error component due to rounding. Since it is 7-phase, there are many angles θ that are fractions. This error component can be eliminated by increasing the resolution of the calculation of the rotation angle θ. Of the 7-phase torque totals shown in solid lines in FIG. 22, the respective torque shapes for each phase have a shape similar to the characteristics shown in solid lines in FIG. 21. In other words, the phases differ by 360/7 [°], respectively. Among the torque shapes shown by solid lines in FIG. 21, it can be inferred that each of them contains many higher harmonics.

Figure 23:
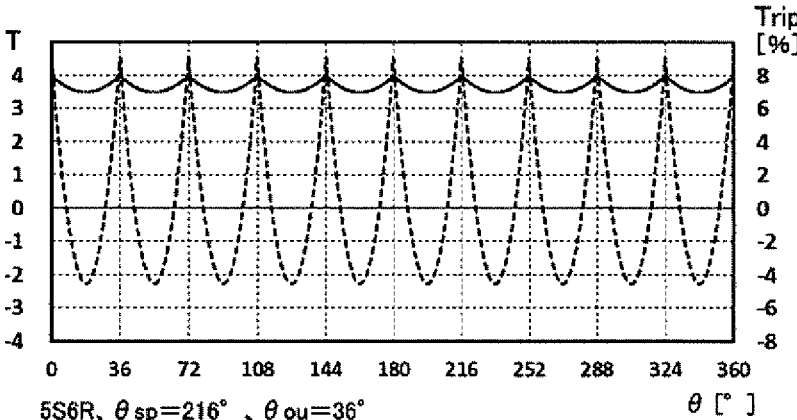
FIG. 23 is another graph exemplifying characteristics of changes in torque T and torque ripples Trip.

Next, an example of the same characteristics as above for torque T and torque ripple Trip for the 5-phase motors shown in FIGS. 9 and 10 (*a*) and (*b*) is shown in FIG. 23. The characteristic in FIG. 23 is the characteristic obtained when, in a motor with the 5S6R configuration shown in FIG. 9, an induced voltage V with the waveform shape shown by the solid line in FIG. 10(*d*) is generated in the concentrated winding of each of the 5-phase, and each of the 5-phase currents I with the same waveform shape is energized in each phase winding. In FIG. 23, the solid line indicates the total torque. The average torque during 360° electric angle is 3.67. The dashed line indicates the torque ripple Trip [%], which is the value obtained by equation (21). From the characteristics in FIG. 23, the torque ripple Trip is about 13 [% p-p]compared to the positive and negative peak values.

Figure 24:
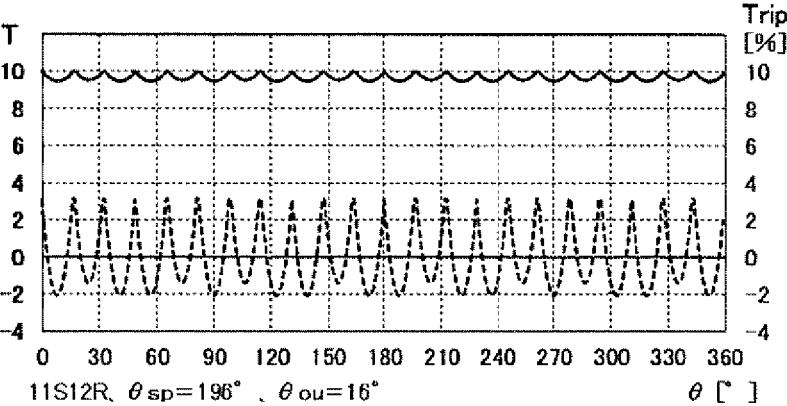
FIG. 24 is another graph exemplifying characteristics of changes in torque T and torque ripples Trip.

Next, FIG. 24 shows an example of the same characteristics as above for torque T and torque ripple for an 11-phase motor. For the 11S12R motor configuration, the pitch θsp of the stator pole is θsp=360×6/11=196.36 [°]. The distribution of magnetic flux density B of the rotor is the distribution of magnetic flux density B of alternating current that forms a trapezoidal shape with an increasing part of 8 [°], a flat part of 164 [°], and a decreasing part of 8 [°], varying between the positive and negative sides. The voltage characteristics of this motor are shown as an AC voltage waveform with positive and negative values, drawn in a trapezoidal shape with an increasing part of 16 [°], a flat part of 148 [°], and a decreasing part of 16 [°]. FIG. 24 shows the characteristics when the same waveform current of 11-phases is energized to each winding by the induced voltage of 11-phases. In FIG. 24, the solid line shows the total torque, and the average torque over the 360° electric angle range is 9.70. The dashed line indicates the torque ripple Trip [%], which can be obtained from the value in equation (21). The torque ripple for positive and negative peak values is about 5 [% p-p].

Figure 25:
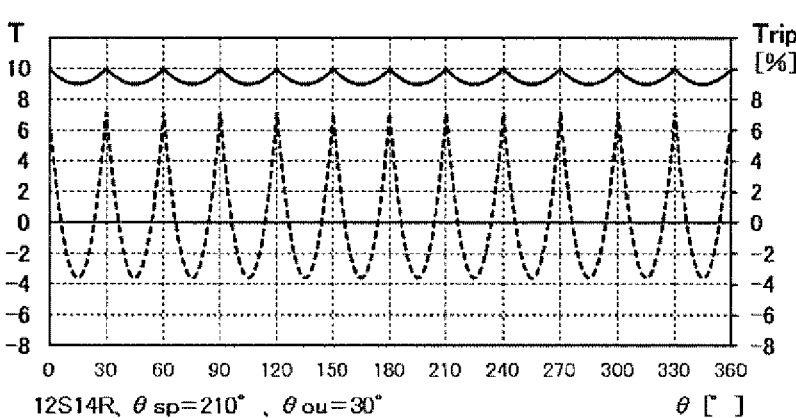
FIG. 25 is another graph exemplifying characteristics of changes in torque T and torque ripples Trip.

Next, FIG. 25 shows an example of the same characteristics as above for torque T and torque ripple Trip in a 12-phase 12S14R motor configuration. In the 12S14R motor configuration, the pitch θsp of the stator pole is θsp=360× 7/12=210 [°]. This is the same configuration as shown in FIG. 5(*d*), where the pitch θsp of the stator pole is set to θsp=210 [°] in the motor for FIGS. 5(*a*) and 5(*b*), shown as a typical motor model example. The distribution shape of the magnetic flux density B is also shown as a trapezoidal shape with an increasing portion of 15 [°], a flat portion of 150 [°], and a decreasing portion of 15 [°], represented by the dashed line shape in FIG. 5(*d*). The voltage shapes are shown as solid lines. In addition, of the 12S14R configuration notation, notation 12 is an even-numbered example, so the structure is point symmetrical about the motor center. Thus, it can be controlled with 6-phase voltages and currents, where 12/2=6. This 6-phase current phase delay is related to "0, 30, 60, 90, 120, 150 [°]", so it is not a 6-phase vector to be created from 3-phase AC. In FIG. 25, the solid line shows the total torque, and the average torque over the 360° electric angle range is 9.33. The dashed line indicates the torque ripple Trip [%], which is calculated from equation (21). The torque ripple is calculated from the positive and negative peak values and is approximately 11 [% p-p].

FIGS. 22, 23, 24, and 25 illustrate the 7-phase, 5-phase, 11-phase, and 12-phase torque ripple Trips. These characteristics are values calculated with spreadsheet software and are theoretical values of motor characteristics obtained under the condition of simple modeling of electromagnetic characteristics. These torque ripple Trip characteristics are related to the voltage and current waveforms, their relative phases and number of phases, resulting in various torque ripple waveforms. Other errors such as mechanical shape errors, electromagnetic errors, and magnetic saturation also occur in motors, but these errors are ignored here. Several things can be inferred from the characteristic examples in FIGS. 22, 23, 24, and 25. For one thing, the torque ripple shrinks as the phase number increases. With respect to the trapezoidal waveform shape, as the range of change between the increasing and decreasing portions of the trapezoid narrows, the harmonics increase and the torque ripple also increases.

Figure 21:
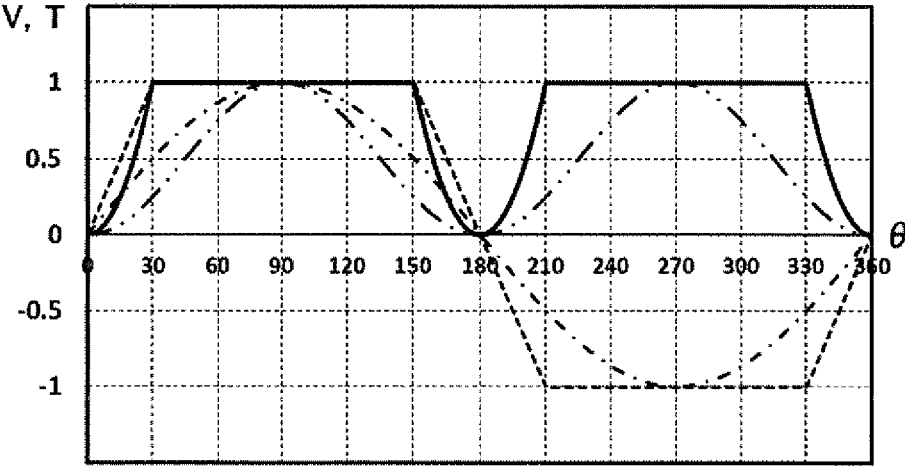
FIG. 21 is a graph exemplifying trapezoidal and sinusoidal waveforms of induced voltages, currents, and torque changes.

By analogy with FIG. 21, the current waveform can be freely selected by the drive circuit, so the torque ripple can be reduced by controlling the current waveform. The steep shape of the torque ripple seen in FIGS. 22, 23, 24, and 25 can be reduced by smoothing the waveform shapes of the induced voltage and current. For the torque waveform shown as a solid line in FIG. 21, to show that the torque of trapezoidal wave drive is greater than that of sinusoidal wave drive and the ratio of the torque increase, a trapezoidal shape in which the waveform of the energizing current is proportional to the trapezoidal waveform of the induced voltage is illustrated. However, in torque ripple reduction, it may be preferable if the abbreviated trapezoidal shape of the induced voltage and the current waveform are not identical, as this will reduce the abrupt change in torque. There is a trade-off aspect between torque increase and torque ripple reduction. In addition, motors with a large number of phases including large prime numbers tend to have lower vibration and noise, including mechanical resonance phenomena on the motor and load side.

One conventional torque ripple reduction method is to measure the torque ripple and compensate the torque command based on the measured data to reduce the torque ripple. Another method is to create a mechanical phase difference between multiple pairs of motor configurations to cancel out the torque of certain harmonic components, when the above NN3 is more than two in number and there is more than one basic motor configuration. These conventional methods can also be applied to the present motor. The method of reducing torque ripple according to a seventh exemplary mode, i.e., correcting the current waveform of each phase, shown later, can also be applied. As mentioned above, trapezoidal voltage and current, which are more similar to rectangular, increase torque compared to sinusoidal AC. However, in the overall motor, torque ripple increases when the number of phases is small, such as 2-phase, 3-phase, or 4-phase. In such a case, one method is to reduce the torque ripple even in the lower-medium torque range, as shown in FIG. 15.

As explained above, the multiphasing of the motor allows the voltage and current driving the motor to be abbreviated trapezoidal, which increases the average torque and reduces the torque ripple. Then, torque ripple reduction is more effective when other torque ripple reduction measures are used in combination.

The induced voltage constant Kv [V/(rad/sec)] used as a proportional constant for motor voltage and the torque constant Kt [Nm/A] used as a proportional constant for torque have the same value when expressed in the MKS unit system. In this regard, the specification relates the magnitude of voltage to the magnitude of torque. Specifically, electrical power Pe [W], based on electrical voltage V [V] and current I [A], mechanical torque T [Nm], angular speed of rotation w [rad/sec], and mechanical power Pm [W] have the following relationship. Note that resistive losses, iron losses, internal losses such as friction, magnetic energy, and stored energy of kinetic energy are ignored. Assuming that Pe and Pm are equal, equations (23) and (25) indicate that the values of Kv and Kt are equal.

$$V = Kv \times \omega \tag{22}$$

$$Pe = V \times I = Kv \times \omega \times I \tag{23}$$

$$T = Kt \times I \tag{24}$$

$$Pm = T \times \omega = Kt \times I \times \omega \tag{25}$$

Seventh Embodiment

Next, a fifth exemplary mode will now be explained. An example of the distribution of magnetic flux density B on the rotor surface of the motor is an abbreviated trapezoidal shape in the circumferential direction. As described above, FIGS. 1 and 2 (*a*) and (*b*) show an example of a motor configuration denoted as 7S8R, and FIG. 2 (*c*) shows an example of a rotor pole PR with S and N poles where the rotor pole width θrt, shown by the dashed line, has the relationship in equation (13) and θrt=154.29 [°] at the electric angle. The circumferential pitch θsp of the stator pole PS is θsp=180×8/7=205.71 [°]. The pole-to-pole portion between these S-pole and N-pole rotor pole PS each other is referred to as the low flux density region ROU in this specification. The circumferential width θou of this low flux density region ROU is 25.71 [°] in this embodiment. However, each of these widths is not limited to equation (13), but rather, as described above, should be a convenient relationship to increase the circumferential width θss of the slot in the stator.

The fifth exemplary mode relates to the distribution state of magnetic flux density B, and in particular to the distribution of magnetic flux density B in the low flux density region ROU. The examples shown in FIGS. 2(a), 2(b), and 2(c) illustrate a simple rotor pole configuration in which a pole-to-pole space is formed between the S-pole and N-pole rotor pole PR. The staircase-shaped magnetic flux density B distribution shown by the dashed line in FIG. 2(c) is actually considered to be an abbreviated trapezoidal distribution in this disclosure, since leakage flux and other fluxes at the air gap are also generated. Note that there is no permanent magnet between the angular range θou in the low flux density region ROU. Therefore, the maximum value of interlinkage flux φ for the concentrated winding 23 shown in FIG. 2(a) is the same in simple theory as for the rotors shown in FIGS. 11 and 34 above, where the width of the rotor permanent magnet is 180 [°]. Rather, it is better to have no unnecessary and harmful permanent magnet flux components. The staircase-shaped magnetic flux density B distribution shown by the dashed line in FIG. 2(c) is comparable in terms of the generation of induced voltage V and torque T shown by the solid line because the maximum value of interlinkage flux φ can be increased.

The dashed line in FIG. 2(d) shows an example of a trapezoidal magnetic flux density B distribution. Permanent magnets whose magnetic flux density varies gradually in the circumferential direction, as shown by the distribution of magnetic flux density B in the dashed line in FIG. 2(d), are placed in the pole-to-pole space that forms the pole-to-pole portion between the rotor pole PR. The solid line shows the induced voltage V. This induced voltage V has a different waveform in the part of the voltage value change compared to that shown in FIG. 2(c). The maximum values of interlinkage flux φ shown in FIGS. 2(c) and 2(d) are identical in simple theoretical terms. However, in terms of variable current control in current control, the interlinkage flux φ shown in FIG. 2(d) is superior in that it provides smoother variable control of current.

Examples of the distribution of magnetic flux density B in various abbreviated trapezoidal shapes are shown by dashed lines in FIGS. 4, 5, and other figures. Moreover, deformations such as smoothing the corners of the trapezoid are possible. Fig. zc also explains that, compared to a configuration driven with sinusoidal voltage and current, a configuration driven with trapezoidal voltage and current, which is closer to a square wave, produces a larger torque T. For example, in FIG. 5(c), for a trapezoidal magnetic flux density distribution with an increasing part of 15 [°], a flat part of 150 [°], and a decreasing part of 15 [°], it is explained that both trapezoidal positive and negative AC induced voltages with an increasing part of 30 [°], a flat part of 120 [°], and a decreasing part of 30 [°] can be obtained, and that the torque is 1.55 times higher than that of a sinusoidal drive with the same amplitude of voltage and current.

Figure 26:
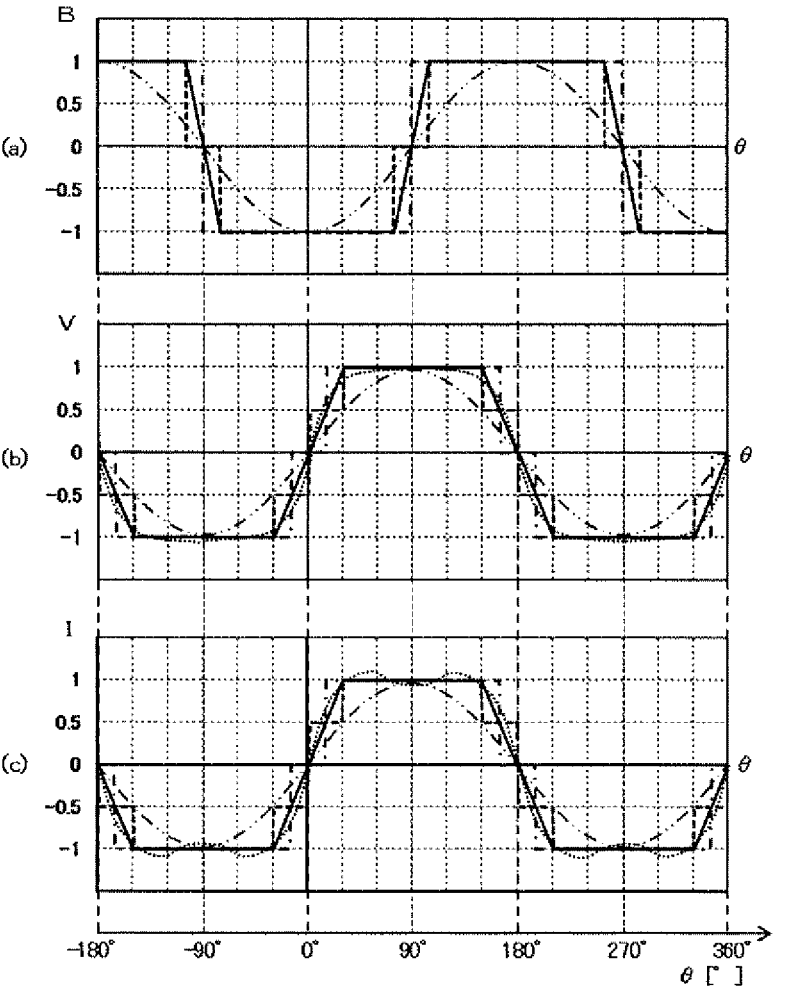
FIG. 26 is a graph exemplifying waveforms of magnetic flux distributions, induced voltages, and currents.

FIG. 26 summarizes the distribution of magnetic flux density B, induced voltage V, and energizing current I shown in FIGS. 4, 5, and other drawings. This is an example of a motor whose linear development has the shape of FIG. 4(a), (b), or FIG. 5(a), (b), and whose structure has the pitch θsp of the stator pole cog as θsp=210 [°], the width θrt of the part of the rotor pole with the large magnetic flux density B as θrt=150 [°], and the width θou of the part of the rotor pole with the small magnetic flux density B as θou=30 [°].

FIG. 26(a) shows an example of circumferential distribution of magnetic flux density B at the rotor poles. In this figure, the single-pointed line illustrates a rectangular magnetic flux distribution when the circumferential width θrt is 180 [°] in electric angle. The dashed line shows the rectangular magnetic flux distribution when the circumferential width θrt is 150 [°] in electric angle, and the width θou of the pole-to-pole space, simply a space portion, between the rotor pole is 30 [°] in electric angle. The solid line shows an example where the circumferential width θrt is 150 [°] in electric angle and the width Bou between the rotor pole is 30 [°], and the magnetic flux density B varies linearly between them. The distribution of the magnetic flux density B is exemplified by a trapezoidal shape, where the increasing part of the magnetic flux density B is 15 [°], the constant part is 150 [°], and the decreasing part is 15 [°], taking positive and negative values. The two-pointed chain line shows an example of a sinusoidal magnetic flux density B distribution. Here, the maximum value of each flux density B is normalized and shown as 1.0. The motor configuration shown in FIGS. 4, 5, and other figures can ensure a wide enough slot cross-sectional area even when the maximum value of the sinusoidal magnetic flux density B is close to 2.0 [T]. However, as mentioned above, the torque is smaller than in the case of trapezoidal wave distribution.

FIG. 26(b) shows an example of the waveform of the induced voltage V induced in the concentrated winding 43 shown in FIG. 4(a) or the concentrated winding 53 shown in FIG. 5(a) when the rotor rotates at a constant rotation to CCW. The waveform of each of these induced voltages V corresponds to the distribution of magnetic flux density B shown in FIG. 26(a). The single-pointed line shown in FIG. 26(b) shows the induced voltage induced in the concentrated winding 43 at a rectangular magnetic flux distribution with θrt=180 [°]. This induced voltage is a square wave voltage with a width of 150 [°]. The dashed line in FIG. 26(b) is the staircase-shaped induced voltage induced in the concentrated winding 43 in the case of a rectangular flux distribution with θrt=150 [°]. The single-pointed and dashed lines have the same maximum value of the original interlinkage flux, so the average value of the voltage is also the same. In FIG. 26(b), the solid line shows the induced voltage V induced in the concentrated winding 43 for a trapezoidal magnetic flux density B distribution. The induced voltage V has a trapezoidal waveform with an increasing part of 30 [°], a constant part of 120 [°], and a decreasing part of 30 [°], and repeating positive and negative values. The voltage waveform varies with respect to the distribution of the magnetic flux density B. The two-pointed chain line shown in FIG. 26(b) shows the induced voltage V induced in the concentrated winding 43 under a sinusoidal flux density B. The amplitude of this induced voltage V is reduced to a winding factor cos((210−180)/2)=0.966, relative to the distribution of magnetic flux density B. Each waveform shown in FIG. 26 is normalized to 1.0, while the amplitude of the sinusoidal waveforms shown in FIGS. 26(b) and (c) is 0.966. Voltage waveforms other than sinusoidal waves can also be evaluated by approximating them to a smoothed voltage, for example, as shown in the dotted line in FIG. 26(b).

FIGS. 3(c), (d), 13, 14, 18, and 19 illustrate the structure where the circumferential pitch θsp of the stator pole PS is large, for example, a pitch of 240° or more. This structure is explained in terms of the circumferential width θstg of the part of the stator pole facing the air gap and the distribution of the magnetic flux density B on the rotor surface can be optimized by adding a bypass magnetic path PBP in the stator. Despite the burden of adding a bypass magnetic path PBP, this is rather better in terms of motor characteristics. In this case, the distribution shape of the magnetic flux density B of the rotor is also an abbreviated trapezoidal shape. Based on this, the configuration that forms each of the waveforms shown in FIG. 26 above can be applied to the motor configuration of adding a bypass magnetic path PBP.

There are several methods and configurations of specific rotor structures that create an abbreviated trapezoidal shape magnetic flux density B distribution. For example, permanent magnets are arranged in a so-called Halbach array structure, a method of adding a twist to the poler anisotropic permanent magnet, a method of making rotor poles by combining permanent magnets and soft iron, and a method of devising the surface shape of the permanent magnet. These are shown and described later in FIG. 30.

Eighth Embodiment

Next, a sixth exemplary mode will now be described. As explained with reference to FIG. 2(*d*), etc., an abbreviated trapezoidal current is energized in the winding that induces an abbreviated trapezoidal induced voltage. This produces more torque than when driven by conventional sinusoidal voltage and current. As described above, when a current of the same shape is energized in a winding that presents a trapezoidal-shaped AC induced voltage with repeating positive and negative values, where the increasing part is 30 [°], the flat part is 120 [°], and the decreasing part is 30 [°], 1.55 times more torque is obtained than with a conventional drive based on a sinusoidal voltage and current.

As mentioned above, FIG. 26(*a*) shows an example of the distribution of magnetic flux density B and FIG. 26(*b*) shows an example of induced voltage V. Furthermore, as shown in FIG. 26(*c*), an abbreviated trapezoidal shaped current can be energized into the concentrated windings of each phase of each phase. As a result, larger motor torque can be obtained compared to conventional motors driven by sinusoidal voltage and current. Each current example shown in FIG. 26(*c*) corresponds to the magnetic flux density B shown in FIG. 26(*a*) and the induced voltage V shown in FIG. 26(*b*), respectively.

In motors with fractional slot, which is the subject of this disclosure, the induced voltage has motor-specific characteristics because it is difficult to control the field flux variably. On the other hand, since each phase current of the motor can be electrically controlled by the drive circuit, currents of various shapes can be energized. Therefore, there is a large degree of freedom in current control. Although the current waveform is free, the torque generation efficiency when the same trapezoidal current is energized to a winding with trapezoidal induced voltage is superior in terms of torque increase compared to when driven by conventional sinusoidal voltage and current. Here is an example of the current waveform in FIG. 26(*c*).

The single-pointed line shown in FIG. 26(*c*) is an example of a current waveform with the same shape as the induced voltage V shown by the single-pointed line in FIG. 26(*b*). However, since the waveform is a rectangular shape with a width of 150 [°], it is difficult to energize the current, and a current with an approximate waveform shape can be energized. For example, the current waveform is shown in the dotted line in FIG. 26(*c*). Similarly, in the case of the staircase-shaped current waveform shown by the dashed line in FIG. 26(*c*), a slightly smoothed waveform of the staircase shape is supplied. To begin with, the rectangular and staircase voltage waveforms are values calculated by spreadsheet software when motor characteristics are simply modeled. In reality, the voltage waveform is slightly smoothed due to factors such as magnetic flux leakage near the rotor surface and magnetic resistance.

In FIG. 26(*c*), the trapezoidal waveform current waveform shown by the solid line consists of a range of monotonically increasing and constant values, and is relatively easy to energize. However, even in this case, it is easier as current control if the corners of the trapezoid are rounded and smoothed. As described above, when energized with voltages and currents with widths of 150 [°], 120 [°], 90 [°], and 60 [°] for the flat areas with constant trapezoidal values, the torque is 1.777, 1.555, 1.333, and 1.111 times higher, respectively, than when driven by a sine wave. As shown above, the torque can be increased by energizing an abbreviated trapezoidal-shaped current, compared to driving with a sinusoidal wave.

In the case of low-speed rotation, the time rate of change of the current is low, so it is possible to energize a trapezoidal-shaped current more similar to a square wave to increase torque. On the other hand, in the case of high-speed rotation, it is difficult to energize a trapezoidal-shaped current with a steep gradient in the range of increasing and decreasing portions because the induced voltage of each winding is larger and the inductance of each winding limits the time rate of change of the current. Therefore, at high speeds, the current waveform must be controlled to approach a sinusoidal waveform from the trapezoidal wave-shaped current used to drive up to medium speeds. In addition, at higher speeds, the amplitude of the current can be reduced and the phase of each current in each phase can be advanced and controlled.

The current waveform can also be modified to control the current for the purpose of reducing torque ripple. Various torque ripple methods can be applied to this current control as described above. A seventh exemplary mode also shows how to actively modify the current waveform of each phase. It is also possible to change the characteristics of the induced voltage of the motor by employing a motor with a structure that allows the strength of the permanent magnets to be varied. For example, the magnetic flux density B can be controlled to be larger when a large torque is generated at low speed rotation. This increases torque by adjusting the magnetic flux density to a distribution shape more similar to a square wave. On the other hand, at high speed rotation, it is not impossible to reduce the magnetic flux density B and change the waveform shape to a sinusoidal shape as well.

Ninth Embodiment

Figure 28:
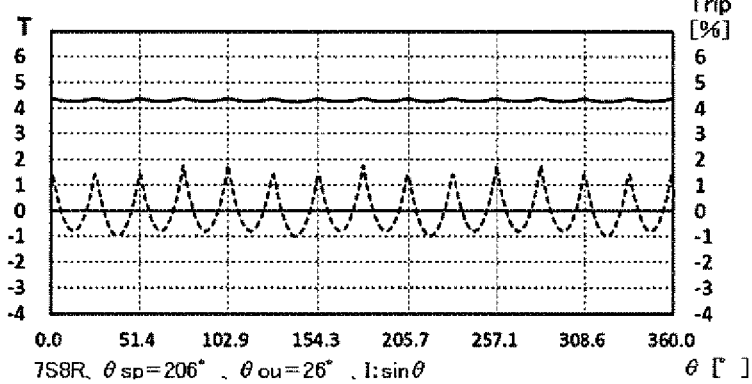
FIG. 28 is a graph exemplifying characteristics of changes in torque T and torque ripples Trip.
Figure 29:
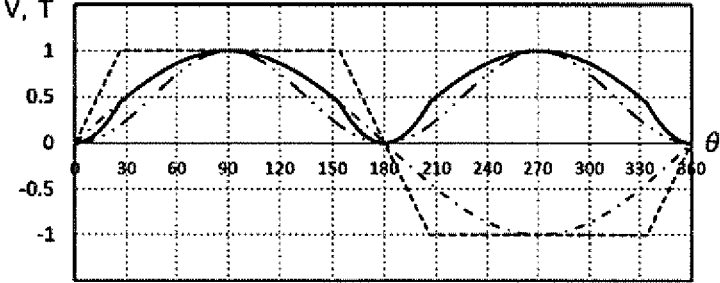
FIG. 29 is a graph exemplifying waveforms of one-phase torque.

Next, the seventh exemplary mode will now be described. Depending on the magnitude of torque T and speed in the motor operation state, a torque ripple correction amount can be added to the basic current waveform shape to reduce torque ripple. For example, under the conditions of FIGS. 1, 2(*a*), (*b*), and (*d*), which show the motor configuration of 7S8R, the torque T and torque ripple Trip when a trapezoidal current with the same waveform as the voltage waveform is energized are illustrated by the characteristics in FIG. 22. Here, in a slightly extreme example, changing this current waveform to sinusoidal would change it to the torque T and torque ripple Trip shown in FIG. 28. In other words, the torque ripple Trip decreases from 8 [% p-p] to 2.5 [% p-p]. Thus, it can be confirmed that the torque ripple Trip is reduced by the current waveform. In this case, the average torque T decreases from 5.65 to 4.31, so a smaller decrease in the average torque T is preferred. In FIG. 29, the solid line shows the waveform of torque generated by one phase by trapezoidal voltage and sinusoidal current, the energizing conditions shown in FIG. 28. In FIG. 29, the two-pointed chain line shows the waveform of torque generated when driven by sinusoidal voltage and sinusoidal current. The solid line shown in FIG. 21 is the waveform of torque generated when driven by trapezoidal voltage and trapezoidal current, so the solid line in FIG. 29 takes the intermediate value between them.

Figure 27:
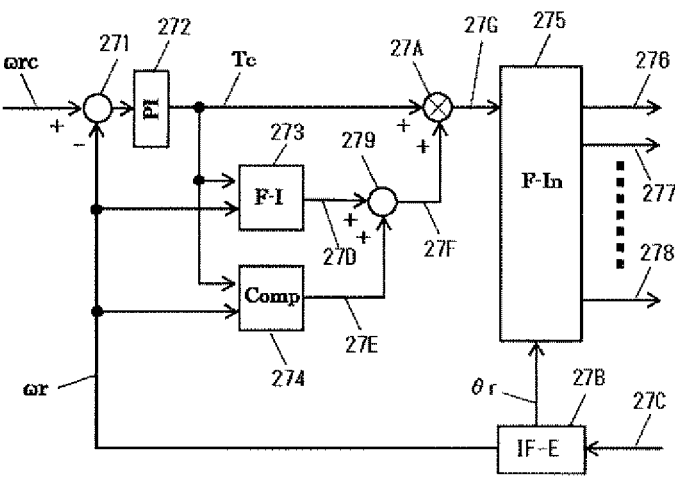
FIG. 27 is a block diagram showing a control circuit for current control.

Next, an example of the configuration of the control in the seventh exemplary mode is shown in the block diagram in FIG. 27. Reference number ωrc indicates speed command, reference number 27C indicates a rotor rotation position detection signal, reference code 27B indicates position detection interface, reference code ωr indicates a detected rotor rotation position, and reference code or indicates detected rotor rotation speed. Reference number 271 indicates an adder. The rotor rotation position ωr is subtracted from the speed command ωrc and the difference is output to the proportional integral compensator 272. The output of this proportional-integral compensator 272, Tc, is the torque command. Reference number 273 indicates a current waveform generator. The current waveform generator 273 uses the torque command Tc and rotor rotation speed wr as inputs to generate a waveform 27D, such as a trapezoidal waveform, which is the basis of the current. Reference number 274 indicates a correction current waveform generator. The correction current waveform generator 274 operates with the torque command Tc and rotor rotation speed or as inputs to generate a correction current waveform 27E to reduce torque ripple. Reference number 279 indicates an adder, which adds the basic current waveform 27D and the corrected current waveform 27E and outputs a corrected current waveform 27F. Reference number 27A indicates a multiplier, and this adder 27A mutually multiplies the torque command Tc and the corrected current waveform 27F to output basic current waveform information 27G.

A reference number 275 indicates a multiphase current control unit, which outputs, for example, current commands 276, 277 to 278, etc. for each phase with different phases. The specific method of controlling the current performed by the current control unit 275 is not specified here. For example, the following methods can be employed: real-time control of the current values of each phase individually, calculation and control of the current of each phase in the rotating coordinate system and then energizing back to the fixed coordinate system, and batch control of the current of multiple phases.

The aforementioned configuration generates and corrects the correction current waveform 27E according to the torque command Tc and rotor rotation speed or to control each phase current. This reduces torque ripple. This correction current waveform 27E is mainly a theoretical torque ripple component caused by the voltage and current waveforms. In addition, since there is no time delay element in the action of this correction current waveform 27E, the effect is different from the method of adding torque ripple correction to the torque command. Conventional techniques to compensate for torque ripple can also be used together. In the case of this conventional correction technique, in the case of the method of measuring and correcting torque ripple after applying the correction current waveform 27E, except for the theoretical torque ripple component caused by the aforementioned waveform, torque ripple components caused by factors such as motor configuration, material, rotor eccentricity, etc. can be corrected. Thus, the two methods of torque ripple correction have different characteristics and features. Torque ripples of different nature can be corrected by factor.

Although not shown in the figure, at the rear of the elements illustrated in FIG. 27 is placed an inverter that combines a drive circuit composed of a pulse width modulator PWM, a power transistor PTR, etc. to control voltage and current by turning on and off the power transistor PTR, etc. In FIG. 27, the current controller, pulse width modulator PWM, inverter INV, motor, encoder ENC to detect the rotor rotation position, etc. are not shown. In addition, each signal in the block diagram shown in FIG. 27 indicates the flow of a single piece of information, etc. In other words, it is usually a digitally processed signal by a microprocessor, etc., and is a single signal equivalent to an analog real-time signal, or a flow of a single piece of information, such as a basic waveform. In addition, information data, etc. necessary for each digital processing are not shown in FIG. 27, but are stored in memory, etc., and are read and used as needed. Today, memory capacity and memory cost burdens are not an issue.

Tenth Embodiment

Next, the motor according to an eighth exemplary mode will now be described. This motor has low-loss and high-torque characteristics, utilizing electromagnetic steel sheets made of amorphous material and permanent magnets that generate a magnetic flux density B close to the maximum flux density Bstm of amorphous material. Amorphous has a large magnetic permeability, low hysteresis loss, and low eddy currents because it is a thin sheet of 15 to 30 [μm], and has low iron loss. However, the maximum flux density Bstm of amorphous is about 1.4 [T]. Therefore, when the characteristic that the maximum flux density Bagm of the permanent magnet is close to 1.4 [T] is applied to the conventional motor shown in FIG. 34, the slot cross-sectional area where the winding is wound becomes extremely small. Therefore, the winding dose was reduced, which in turn reduced the torque generated. On the other hand, motors using ordinary silicon steel sheets have the problem of increased iron loss in the area of high speed rotation.

In the motors for this disclosure shown in FIG. 1, FIG. 18, and other drawings above, a reasonable slot cross-sectional area can be created even if both the maximum flux density Bagm of the rotor poles and the maximum flux density Bstm of the stator's soft magnetic material are around 1.4 [T]. Therefore, an appropriate amount of concentrated winding can be wound to generate a large torque. The rotor can also be configured to be advantageous from the standpoint of motor manufacturing. In other words, a simple rotor can be constructed by using a so-called polar anisotropic magnet as shown later in FIG. 30(d), and configuring a ring-shaped magnet that generates a trapezoidal magnetic flux distribution in the circumferential direction. However, it is not limited to the configuration shown in FIG. 30(d). As a result of these developments, the motor characteristics are high torque and high efficiency up to the range of high speed rotation, and the motor can be made smaller and lighter. It is also possible to achieve a motor with excellent productivity and cost, and a good balance between the characteristics of rare earth permanent magnets and soft magnetic materials, which is the highest performance currently available.

The soft magnetic material of the rotor back yoke has little magnetic flux fluctuation, so iron loss is almost nonexistent. Moreover, machined parts from solid iron, or electromagnetic steel sheets of low cost and high iron loss material can be used. As a result, iron loss in the rotor back yoke is negligible. If rotor centrifugal force is a problem in the high speed range, a motor with an outer rotor structure can be employed. Various transformations are possible. This need for high speed and high torque is also increasing in applications such as drones, electric airplanes, and automobiles.

Eleventh Embodiment

Figure 30:
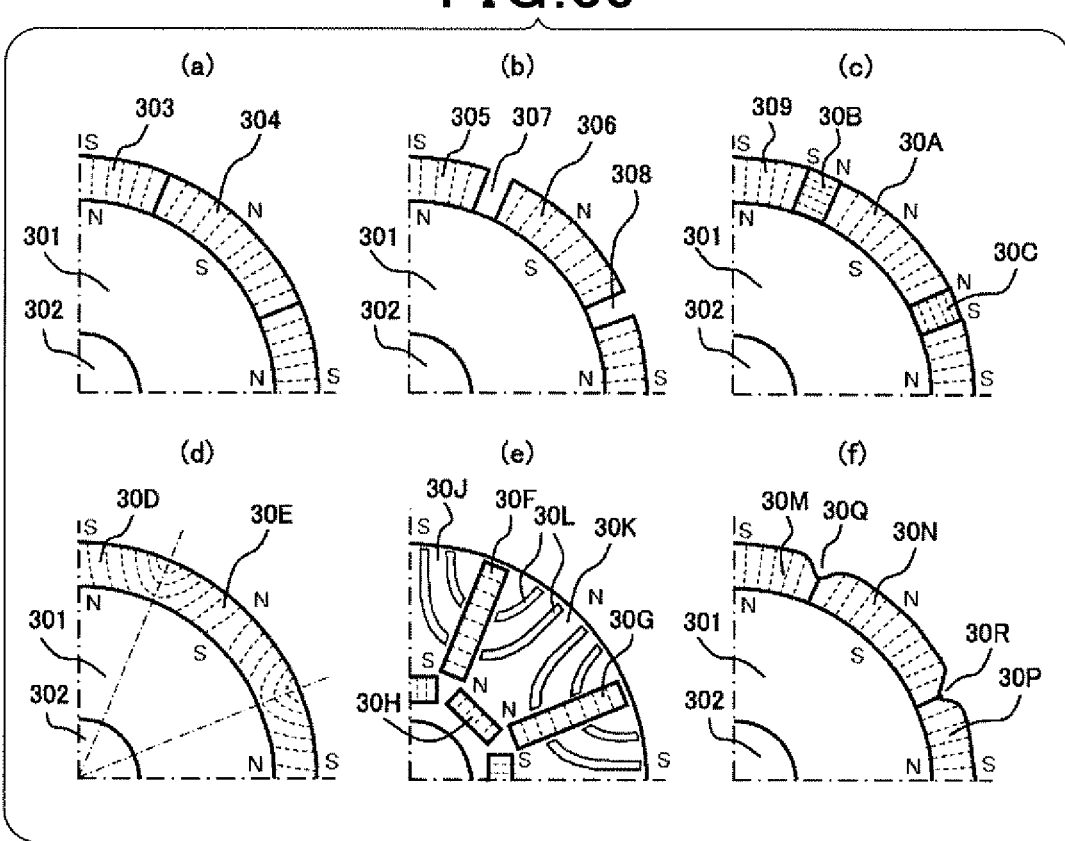
FIG. 30 is a view showing sections of various 8-pole motors.

Next, a ninth exemplary mode will now be described. This section describes the motor configuration that specifically realizes the distribution of magnetic flux density B shown in FIGS. 1, 4, 5, and other drawings. FIG. 30 shows examples of various configurations of rotors including permanent magnets. This is an example of an 8-pole rotor, showing 1/4 of the total circumference, plus a circumferential rotor width of 360 [°] in electrical angle. Elements on the stator side are not shown in FIG. 30, but will be described as if the stator shown in FIGS. 1, 18, and other drawings were present. These rotors can be applied to various types of stators. The same relationship with increasing or decreasing circumferential width for different numbers of rotor poles.

FIG. 30(a) is an example where the circumferential width of permanent magnets 303 and 304 is 180 [°] in electric angle, and S-pole permanent magnets and N-pole magnets are arranged alternately in the circumferential direction. The dashed lines in the permanent magnet indicate the direction of magnetization. The magnetic flux density B on the surface of each permanent magnet is a rectangular distribution of magnetic flux density B with a width of 180 [°], as shown in the single-pointed line in FIG. 26(a). Depending on the magnetization of the permanent magnet, the distribution can be variously rectangular, trapezoidal, sinusoidal, etc., with a width of 150 [°]. However, it is a matter of principle and difficulty in magnetization. High-performance permanent magnets should be anisotropic rather than isotropic permanent magnets, so the production facility should be designed to define the magnetization direction during sintering of sintered magnets, especially when anisotropic magnets are used. Reference number 301 indicates the back yoke of the rotor, and reference number 302 indicates the rotor shaft.

FIG. 30(b) is an example where the circumferential width of permanent magnets 305 and 306 is 150 [°] in electric angle, and S-pole permanent magnets and N-pole magnets are arranged alternately in the circumferential direction. This is an example of the distribution of magnetic flux density B in the dashed line in FIG. 26 (a). Reference numbers 307 and 308 between each permanent magnet is a pole-to-pole space. The space can also be filled with a non-magnetic, non-conductive material such as, for example, resin.

In FIG. 30 (c), a permanent magnet 309 is an S-pole magnet and the magnetic pole direction is radial, while a permanent magnet 30A is an N-pole magnet and the magnetic pole direction is radial. At magnet-to-magnet portion (or inter-magnet portion) in the circumferential direction, or portion which is formed between the S-pole and N-pole in the circumferential direction, permanent magnets 30B and 30C are located respectively. The magnetic pole directions of these permanent magnets 30B and 30C are oriented in the circumferential direction, and their pole orientations match the orientation of the polarity of the respective rotor poles. For example, the S-pole of permanent magnet 30B faces toward S-pole magnet 309, and the N-pole of that permanent magnet 30B faces toward N-pole magnet 30A. Such an array of permanent magnets is also known as a Halbach array.

Permanent magnet 30B has the effect of increasing the magnetic flux density by strengthening the magnetic forces of S-pole magnet 309 and N-pole magnet 30A. The permanent magnet 30C similarly has the effect of strengthening the magnetic forces of the permanent magnets on both sides in the circumferential direction. In principle, the permanent magnets 30B and 30C do not generate magnetic flux in their respective radial directions, so in terms of the motor model, a rectangular distribution of magnetic flux density B can be achieved, as shown by the dashed lines in FIG. 4. It is also a structure in which permanent magnets 30B and 30C are placed in the pole-to-pole space 307 and 308 in FIG. 30 (b), and this space 307 and 308 is effectively utilized. The rectangular-shaped magnetic flux density B distribution shown by the dashed line in FIG. 4 actually results in a magnetic flux density B distribution and effect that is between FIGS. 4 and 5 due to leakage flux at the air gap, non-uniform magnetic resistance, and the effect of the magnetomotive force of the stator current.

Twelfth Embodiment

Next, a tenth exemplary mode will now be described. The permanent magnet in FIG. 30 (d) is a magnet structure known as polar anisotropic. The permanent magnet is fabricated as shown in the direction of the magnetic flux with dashed lines to form the S-pole 30D and N-pole 30E. In the process of making sintered magnets and in the magnetizing process, the magnetism and orientation of permanent magnets are taken into consideration. In general, the distribution of the magnetic flux density B of a polar anisotropic magnet is the sinusoidal distribution shown by the two-pointed chain line in FIG. 26(a), and torque ripple is sometimes said to be small and motor quality is good when driven by sinusoidal AC current. However, this disclosure requires a polar anisotropic magnet with a rectangular or trapezoidal magnetic flux density B distribution, such as the dashed or solid line in FIG. 26(a). Induced voltages like the solid trapezoidal shape in FIG. 26(b) can be expected. The motor torque can then be increased compared to a motor with a sinusoidal magnetic flux density B distribution. The polar anisotropic magnet shown in FIG. 30(d), when fabricated as a ring-shaped permanent magnet, is easy to assemble to the rotor and has a simple rotor configuration, making it highly productive. It is also desirable in terms of strength.

Thirteenth Embodiment

Next, an eleventh exemplary mode will now be explained. The rotor shown in part (e) of FIG. 30 has permanent magnets arranged inside the rotor and the surface portion of the rotor poles is composed of soft magnetic material. In particular, this rotor has a rotor structure that can increase the magnetic flux density B on the surface of the rotor poles. Reference numbers 30F, 30G, and 30H indicate permanent magnets, and the direction of each magnetic flux corresponds to the polarity N or S of the rotor poles. The magnets are arranged so that the magnetic direction of permanent magnets 30F and 30G themselves are oriented almost circumferentially, and the magnetic direction of permanent magnet 30H itself is oriented almost radially. The soft magnetic material 30K is located at approximately the center of the N-pole magnetic pole. As shown in the figure, the N poles of the permanent magnets 30F, 30G, and 30H are oriented in the direction of the magnetic pole of the soft magnetic body 30K which is the N pole. A reference number 30J indicates the S-pole. Here, the N-pole magnetic fluxes of permanent magnets 30F, 30G, and 30H are configured so that all of them gather in the direction of magnetic pole 8K. Therefore, the magnetic flux density B around the soft magnetic material 30K can be increased. For example, in the configuration shown in part (e) of FIG. 30, if the magnetic flux density B of each of the permanent magnets 30F, 30G, and 30H is 1.2 [T], the magnetic flux density B of the soft magnetic material 30K is about 2.0 [T] larger. If the magnetic flux density B is large, a larger induced voltage can be generated in the stator winding, and the resulting stator current can generate a larger torque.

A reference number 30L indicates an elongated hole formed along the direction of the magnetic flux in the soft magnetic material section. This is also often referred to as a slit. These multiple slits are added to the soft magnetic body part of the rotor poles. As a result, the distribution of the rotor magnetic flux does not fluctuate significantly when the electromotive force generated by the current in the stator winding acts on the rotor poles. The shape and/or number of slits 30L can be changed as needed. The shape, number, and/or position of permanent magnets such as 30F, 30G, and 30H can also be changed as needed. The slit 30L can be processed by a die in the same process as the rotor shaft hole and outer diameter cutting press work of the electromagnetic steel sheet, so the burden on the production cost of this process is small.

The rotor shown in part (f) of FIG. 30 relates to an example of a rotor shown in (a) of FIG. 30 with recesses 30Q and 30R on the outer diameter surface. Reference numbers 30M and 30P indicate S-pole permanent magnets and reference number 30N indicates N-pole permanent magnets. As a means of changing the distribution state of magnetic flux density B, methods such as generating a distribution by magnetization of permanent magnets or generating a distribution by differences in the material properties of permanent magnets can be employed. In addition to this, the distribution state of magnetic flux density B can also be changed by changing the external shape of the rotor, as shown in (f) of FIG. 30. Each of the rotors shown in FIG. 30 is often configured with the outer circumference covered with a fiberglass, carbon fiber, metal tube, or other material to increase strength against centrifugal forces.

Fourteenth Embodiment

Figure 31:
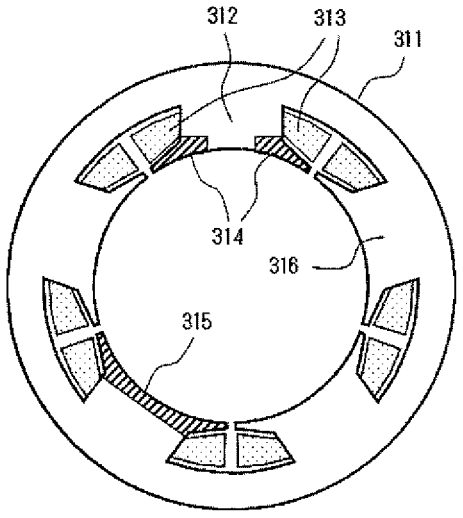
FIG. 31 is a sectional view exemplifying a stator in which a permendur is used as a part of a soft magnetic member of the stator.

Next, a twelfth exemplary mode will now be explained. FIG. 31 shows the configuration of stator 311 shown in a cross-sectional view of a motor with the 5S6R configuration described in FIG. 9. A reference number 312 indicates stator poles and a reference number 313 indicates its concentrated windings. As mentioned above, the shape of the stator magnetic poles 316 is such that the tooth tip shape at each circumferential end of each of its stator magnetic poles 316 is thin in order to increase the slot cross-sectional area. Therefore, when the magnetic flux density of the rotor poles 316 is large, the maximum flux density of the soft magnetic material, which is the main material that makes up the teeth, is affected, thus causing adverse effects associated with magnetic saturation. This can cause problems in generating motor torque.

As a countermeasure, the tooth tip portion indicated by reference number 314 is formed of a soft magnetic material with a larger maximum magnetic flux density. This reduces the problem caused by magnetic saturation. For example, assume that the soft magnetic material, which is the main material of the stator core, is composed of ordinary silicon steel sheet and that its maximum magnetic flux density is 2.0 [T]. In this case, a soft magnetic material with a saturation magnetic flux density of 2.4 [T], such as permendur, can be used only for the portion of reference number 314, shown by the shaded line in FIG. 31. The soft magnetic material with a saturation magnetic flux density of 2.4 [T], such as permendur, can be used for the part with a slightly wider tooth tip, as shown in the shaded area at reference number 315. The permendur is an expensive material in which cobalt accounts for about 50% [%] of its composition, but the cost may be acceptable if only a part of it is used. However, the cost may be acceptable in some cases.

For example, an amorphous electromagnetic steel plate can be employed as the main constituent material of the stator core, and assuming that its maximum magnetic flux density is 1.4 [T], only the shaded area indicated by the reference number 314 or 315 can be made of silicon steel plate. The rotor shown in FIG. 31 is an example of a rotor with a small number of rotor poles and a slightly extreme tooth tip shape, and the tooth tip protrusion in the circumferential direction is long. As the number of rotor poles and stator poles increases, the length of the protruding tooth tip becomes shorter, and the problem of magnetic saturation of the tooth tip is reduced. The circumferential width θop of the slot aperture is assumed to be 0 [°], and each of the motors shown in the foregoing figures is explained in the model. However, the circumferential width of such aperture θop usually needs to be wide enough to allow the winding to pass therethrough when being wound. Furthermore, for other reasons, such circumferential width θop can be increased. In such a case, the length of the protruding tooth tip of the stator poles can be shortened.

Fifteenth Embodiment

Next, a thirteenth exemplary mode will now be explained. In the motor configuration described in FIGS. 9 and 10 described above, a configuration is given in which the number of stator poles PS is 5 and the number of rotor poles PR is 6, or an integer multiple of those stator and rotor poles. In that case, as shown in the explanation based on FIG. 10, induced voltage and torque can be generated in a good condition. The motor current is controlled by 5-phase current control. In the motor configuration based on formula (9), when the maximum flux density is 1.8 [T] in the trapezoidal flux density distribution of the rotor, the circumferential width θss of the slot is 86.4 [°] in an electric angle, which is derived from formula (12). This allows the concentrated winding to be sufficiently wound. The torque ripple of this motor is not small, but it can be compensated for, as shown in the example described based on FIG. 23. In addition, the number of stator poles PS is 5, which is a prime number greater than 3 phases, thus reducing mechanical resonance phenomena, etc. of the motor. When the number of stator poles is odd, such as 5, eccentric forces act on the motor shaft, which may cause vibration and noise. As a response to this issue, symmetric motor configurations such as 10S12R and 15S18R, which are integer multiples of the motor configuration 5S6R, are preferred.

Sixteenth Embodiment

Next, a fourteenth exemplary mode will now be explained. In this example, in the motor configuration described based on FIGS. 1 and 2 described above, the number of stator poles PS is 7 and the number of rotor poles PR is 8, or an integral multiple of those stator and rotor poles. As shown in the explanation with reference to FIG. 2, good induced voltage and torque can be generated. The motor current control is carried out by a 7-phase current control. In the motor configuration according to formula (9), when the maximum flux density of the trapezoidal flux density distribution of the rotor is 1.8 [T], from formula (12), the circumferential width of the slot θss is 66.85 [°] in an electric angle. Thus, the concentrated winding can be wound sufficiently. The torque ripple of this motor is not small, as illustrated in FIG. 22. However, its compensation is possible. In addition, the number of stator poles PS is 7, which is a large prime number, so mechanical resonance phenomena of the motor are unlikely to occur. When the number of stators is 7, the motor configuration of 14S16R, 21S24R, etc., which is an integer multiple of the motor configuration 7S8R, is preferred because of the eccentric force acting on the motor shaft.

Seventeenth Embodiment

Next, a fifteenth exemplary mode will now be described. This example relates to a motor configuration with 9 stator poles PS and 10 rotor poles PR, or an integer multiple of those stator and rotor poles. As for the control of motor current, current control of 9 phases is required. In the motor configuration based on equation (9), if the maximum flux density of the trapezoidal flux density distribution of the rotor is 1.8 [T], the circumferential width θss of the slot is 56 [°] in electric angle, from equation (12). Therefore, a concentrated winding can be wound. From the relationships in equations (8), (9), and (10), θrt can be set to a small value to increase the circumferential width θss of the slot. Since the number of phases in this motor is relatively large 9, the torque ripple is a relatively small value. When the number of stator poles is 9, eccentric forces act on the motor shaft, so a motor configuration such as 18S20R, which is twice the motor configuration 9S10R, is preferred.

Eighteenth Embodiment

Next, a sixteenth exemplary mode will now be described. This example relates to a motor configuration with 11 stator poles PS and 12 rotor poles PR, or an integer multiple of those stator and rotor poles. To control the motor current, current control of 11 phases is required. In the motor configuration based on equation (9), assume that the maximum flux density of the trapezoidal flux density distribution of the rotor is 1.8 [T]. In this case, from formula (12), the circumferential width θss of the slot is 39 [°] in electric angle, and the concentrated winding is wound accordingly. The circumferential width θss of the slot can also be increased by setting θrt to a smaller value from the relationships in equations (8), (9), and (10). As illustrated in FIG. 24, the torque ripple of this motor is small because of its large number of phases. In addition, the number of stator poles PS is 11, and since this number is a relatively large prime number, mechanical resonance phenomena of the motor are unlikely to occur. When the number of stator poles in the stator is 11, an eccentric force acts on the motor shaft, so a motor configuration such as 22S24R, which is twice the motor configuration 11S12R, is preferred.

Nineteenth Embodiment

Next, a seventeenth exemplary mode will now be described. This example relates to a motor configuration with 12 (NS) stator poles PS and 14 (NR) rotor poles PR, or an integer multiple (NN times) of those stator and rotor poles. In this example, the motor configuration is denoted by 12S14R, so the stator pole pitch is Gsp=360×7/12=210 [°]. The example based on equations (8) to (12) depends on the maximum rotor flux density Bagm, but the circumferential width θss of the slot is equal to or more than 60 [°]. Therefore, it can be designed practically. When the maximum rotor flux density Bagm is 1.8 [T], the circumferential width of the slot θss is 75 [°] in electric angle. This corresponds to the configuration shown in parts (a) and (b) of FIG. 3, without the bypass magnetic path PBP. In this case, the induced voltage induced in each concentrated winding will be the induced voltage shown in the solid line in (d) of FIG. 4 or (d) of FIG. 5.

In the case of this motor denoted by 12S14R, since the number 12 is even, it can be controlled by 6-phase currents due to its symmetry. Respective relative phases of the 6-phase currents have the relationship 0, 30, 60, 90, 120, and 150 [°]. When driven by a current with the same shape of current waveform proportional to the induced voltage V shown in part (d) of FIG. 5, the torque ripple of this motor exhibits the characteristics shown in FIG. 25. This characteristic maintains a practicable range, but on the other hand, it can be further reduced by applying the various torque ripple prevention measures mentioned above.

Twentieth Embodiment

Next, an eighteenth exemplary mode will now be described. This relates to the 4S6R motor configuration described in FIGS. 13 and 14. In this motor configuration, the number of stator poles PS is 4 (NS) and the number of rotor poles PR is 6 (NR), or an integer multiple thereof, NN times the number of stator and rotor poles. As explained by comparing FIGS. 11 and 12 with FIGS. 13 and 14, the stator pole pitch is large, such as θsp=360×3/4=270 [°]. However, a configuration in which a bypass magnetic path PBP is additionally inserted between stator pole PS is adopted. Therefore, the relationship between the circumferential width θstg on the surfaces of the stator poles, which are opposed to the air gap, and the rotor poles is optimized, and good induced voltage and torque are obtained. FIG. 14 shows an example where the circumferential width θbp of the bypass path PBP is θbp=60 [°] and θbp=75 [°]. The characteristics of the induced voltage are shown, for example, by the solid lines in parts (c), (d), or (e) of FIG. 14. Since the circumferential width θbp of the bypass path PBP can be freely designed, its parameter θstg can be freely selected, and thus the voltage characteristics can be selected, as can be seen from formula (15).

Since the number of stator poles PS is 4, that is, an even number, the motor current can be controlled with half the 2-phase current, as the currents of opposite phases, which differ by 180 [°], can be used in common. Since the number of phases is small, the drive circuit can be simplified. When the motor is driven by a current with the same shape waveform proportional to the induced voltage V shown in FIG. 14, the torque ripple of this motor becomes large as shown in parts (f), (g), and (h) of FIG. 15. However, in the drive range of less than 1/2 of the maximum torque, the theoretical torque ripple is suppressed to 0 [% p-p], as shown in parts (a), (b), (c), (d), and (e) of FIG. 15. Although FIG. 13 shows a 6-pole example for ease of explanation, a motor configuration with integer multiples of the number of stator poles PS=4 and the number of rotor poles PR=6 can also be provided.

Twenty-First Embodiment

Next, a nineteenth exemplary mode will now be described. This example relates to a motor configuration in which the number NS of stator poles PS is 3, the number NR of rotor poles PR is 4, or an integer multiple (NN times) of those poles. The motor configuration described in FIGS. 18 and 19 described above is exemplified by the motor configuration 6S8R, where the number NS of stator poles PS is 6, the number NR of rotor poles PR is 8, and the aforementioned NN is 2. As explained by comparing FIGS. 16 and 17 with FIGS. 18 and 19, the stator pole pitch is large, such as θsp=360×4/6=240 [°]. However, a bypass magnetic path PBP is additionally inserted between stator poles PS. This optimizes the relationship between the circumferential width θstg on the surfaces, which are opposed to the air gap, of the stator poles and the rotor poles, and thus generates higher induced voltage and torque. FIG. 19 shows two examples where the circumferential width θbp of the bypass path PBP is 30 [°] and 45 [°]. The characteristics of the induced voltage are indicated by solid lines in part (c), (d), or (e) of FIG. 19, for example. Since the circumferential width θbp of the bypass path PBP can be freely designed, the above circumferential width θstg can be freely selected from formula (15), and thus the voltage characteristics can be selected.

Figure 20:
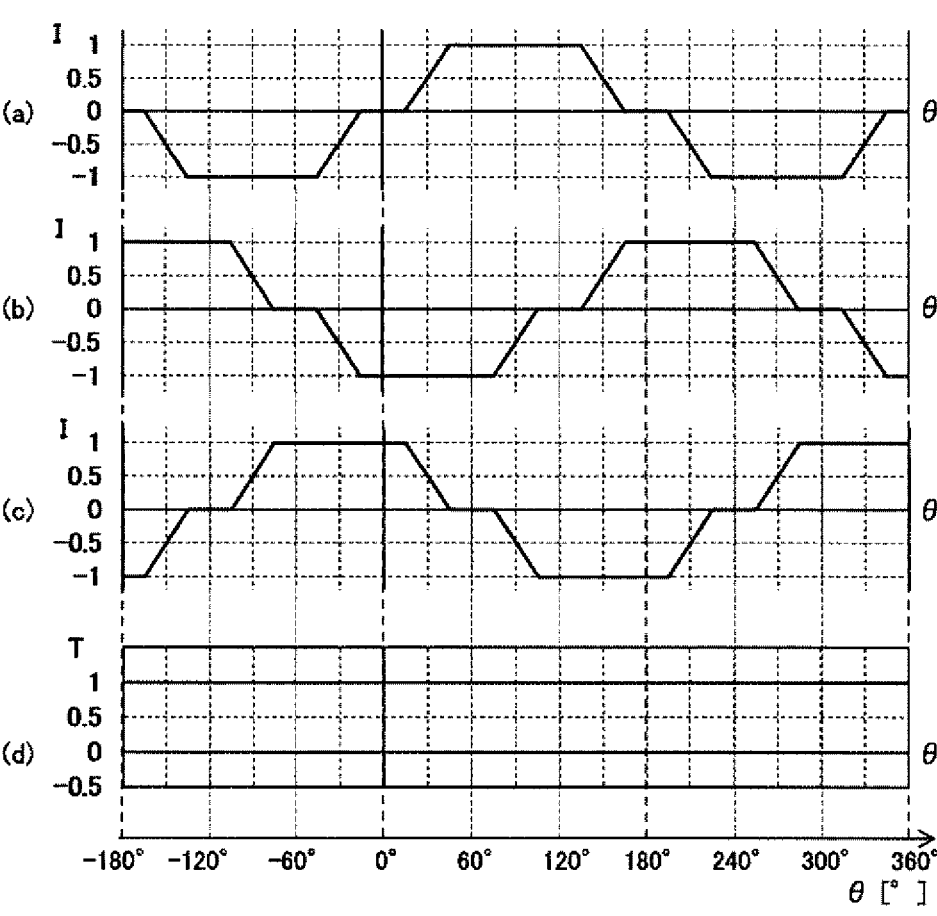
FIG. 20 is a graph exemplifying current waveforms and torque changes.

This motor can be controlled with 3-phase current. Since the number of phases is small, the drive circuit can be simplified. The torque ripple of this motor is relatively large when driven by a current with the same shape waveform proportional to the induced voltage V shown in FIG. 19. However, for the motor and its drive circuit, in the drive range of 2/3 or less of the maximum torque, for example, for the voltage of each phase shown in part (d) or (e) of FIG. 19, the current of each of the three phases can be energized sequentially for 2/3 of the section, as shown in part (a), (b) and (c) of FIG. 20. In this case, the torque for each phase is the absolute value of the values shown in parts (a), (b), and (c) in FIG. 20, so the total torque takes a uniform value as shown in part (d) in FIG. 20. Theoretically, the torque ripple can be set to 0 [% p-p]. The torque can be further increased by extending the energizing range for each phase. If the current flow range is limited to that shown in FIG. 20, the total current of the 3-phase currents can be set to 0 [A], so a 3-phase star connection can be adopted. Therefore, an ordinary 3-phase sinusoidal AC inverter can be used to drive this motor.

Twenty-Second Embodiment

Next, a twentieth exemplary mode will now be described. This example relates to a motor configuration in which the number NS of stator poles PS is 8 and the number NR of rotor poles PR is 10, or an integer multiple (NN times) of those poles. For the motor configuration defined by 8S10R, the stator pole pitch θsp is θsp=360×5/8=225 [°]. In the motor configuration 4S6R described in FIGS. 13 and 14, the dimension was θsp=270 [°], etc. Comparing this with this example, the stator pole pitch θsp is smaller. Even without the addition of the bypass magnetic path PBP, the circumferential width θss of each slot is about 90 [°] when the maximum rotor magnetic flux density Bagm is large, based on the relationship in equations (8) to (11). Therefore, a practical design is possible to the extent that θss is not excessive. The configuration is shown in pats (a) and (b) of FIG. 3.

By additionally inserting the bypass path PBP with circumferential width θbp=15 [°] between the mutual stator poles PS, the induced voltage characteristics shown in solid lines in part (c) or (d) of FIG. 19 can be obtained according to the relationship in equations (15) to (20). When θstg=210 [°] and θrt=150 [°], higher induced voltage and torque can be generated. When the bypass magnetic path PBP with circumferential width θbp=30 [°] is additionally inserted between the mutual stator poles PS, the induced voltage characteristics shown in solid line in part (e) of FIG. 19 can be obtained. This allows the circumferential width θbp of the bypass magnetic path PBP to be freely designed.

This motor, denoted by 8S10R, can be controlled with 4-phase currents because of its symmetry, since 8 is an even number. The relative phases of the 4-phase currents are 0, 45, 90, and 135 [°]. The torque ripple of this motor is relatively large when driven by a current with the same shape waveform proportional to the induced voltage V shown in FIG. 19. However, torque ripple can be reduced in the torque range of 3/4 or less of the maximum torque, as in the 2-phase examples shown in parts (a) to (e) of FIG. 15 or the 3-phase examples shown in parts (a) to (d) of FIG. 20. In addition, the torque can be further increased by extending the energizing range of each phase.

It is assumed that the stator pole pitch θsp is too larger than the electric angle 180 [°] to effectively utilize the magnetic flux of the rotor. Furthermore, although the stator pole pitch θsp is not much larger than the electric angle 180 [°], the slot circumferential width θss in equations (11) and (12) is assumed to be larger than necessary because the rotor magnetic flux density is small. In such cases, the configuration of adding the foregoing bypass magnetic path PBP can be utilized in various combinations of the number of stator poles and rotor poles. This utilization can increase the induced voltage and torque of the stator winding. For example, in the case of the motor configuration denoted by 5S8R, 7S10R, and 11S14R, similar induced voltage and torque characteristics can be obtained by adding the bypass magnetic path PBP as well.

Twenty-Third Embodiment

Next, a twenty-first exemplary mode will now be described.

Figure 32:
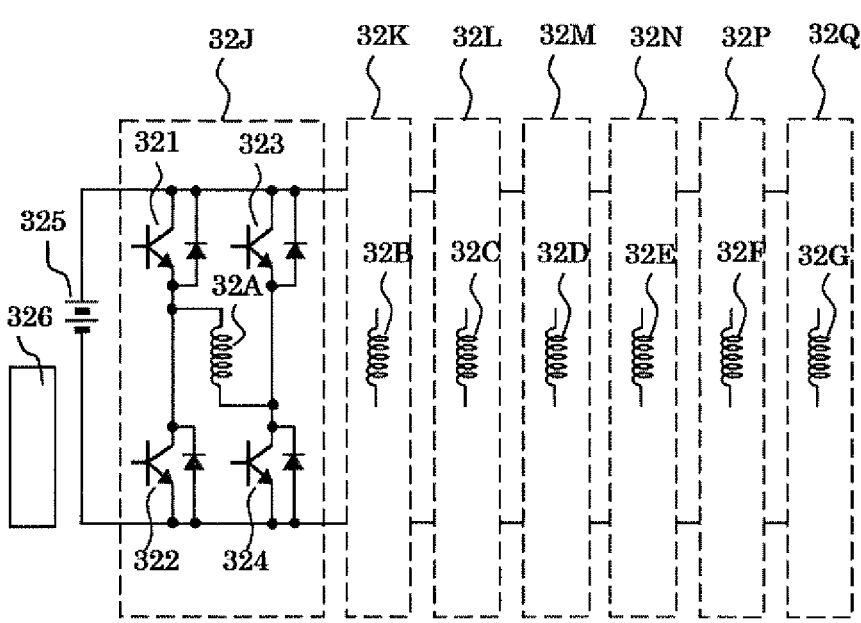
FIG. 32 is a drive circuit exemplifying drive of a 7-phase motor.

FIG. 32 shows an example of a drive circuit that drives the 7-phase motor shown in FIG. 1. The current value of each phase can be controlled without being constrained by the other phases. That is, the current in each phase is independent from the currents of the other phases. In FIG. 32, a reference number 325 indicates a DC voltage source and a reference number 326 indicates a motor control circuit for the entire drive circuit. FIG. 32 shows a drive circuit that freely controls the voltage and current in each winding of the 7-phase motor. For example, a reference number 32A corresponds to the first phase winding 13 shown in FIG. 1. Reference numbers 321, 322, 323, and 324 represent power devices, such as power transistors, each with diodes in inverse parallel. A positive or negative voltage is applied to the winding 32A and a positive or negative current can be energized. The applied voltage and current flow are not affected by the windings and drive circuits of other phases. Therefore, the current waveform can be freely controlled, such as square wave current, trapezoidal wave current, or sinusoidal wave current, and current with a controlled waveform can be supplied. Reference numbers 32K, 32L, 32M, 32N, 32P, and 32Q, shown in dashed lines in FIG. 32 have the same configuration except for a drive unit 32J and winding 32A, shown in dashed lines. In the example of the 7-phase motor for FIG. 1, a winding 32B corresponds to winding 19, winding 32C to winding 1A, winding 32D to winding 1B, winding 32E to winding 1C, winding 32F to winding 1D, and winding 32G to winding 1E, respectively.

Examples of the control of the voltage and current of each winding of the 7-phase motor described in FIG. 1 and their values are described in FIG. 2 etc.

In the drive circuit shown in FIG. 32, the number of drive units shown by the dashed lines in FIG. 32 should be matched to the number of phases of the motor. For example, in the case of the 5-phase motors shown in FIGS. 9 and 10, the configuration shown in FIG. 32 can be used by excluding drive units 32P and 32Q shown in FIG. 32. In the case of a motor with 8 or more phases, the drive units shown by the dashed lines can be added.

The point of complexity of the drive unit is explained below. In the drive circuit shown in FIG. 32, four transistors are required for one phase. Here, in the drive circuit shown in FIG. 33 which will be described below, the configuration in which the circuit block indicated by the single-pointed line 33R is removed is called a star-connected drive circuit in this example. In this star-connection drive circuit, if two transistors can be used to drive one phase winding, the drive circuit configuration shown in FIG. 32 is complex because it uses twice as many elements. However, the drive circuit shown in FIG. 32 can apply twice the voltage to each winding compared to the star-connected drive circuit. Thus, the doubling of the number of elements can be offset by the doubling of the voltage.

Also consider, for example, the drive circuit for a 5-phase motor. In this case, the drive circuit for the configuration shown in FIG. 32 requires 20 power transistors, while the drive circuit for the star-connected drive circuit configuration requires 10 power transistors. According to the configuration shown in FIG. 32, the number of power transistors is doubled (20/10=2 times). However, in this drive configuration shown in FIG. 32, the output voltage of each phase is doubled, so the current capacity of the power transistors is only 1/2. Therefore, it can be said that in the drive configuration shown in FIG. 32, the voltage-current capacity of the drive circuit, expressed as "transistor voltage×transistor current×number of transistors," is almost the same, compared to the star-connection drive circuit configuration.

For example, when driving a motor with a capacity of 50 [kW] or more, power transistors are often connected in parallel. In such cases, the power transistors connected in parallel in the star-connected drive circuit can be configured as shown in FIG. 32. In such a case, the number of power transistors remains the same, only the connection between power transistors is changed.

In some cases, in particular, the DC voltage supply of the main circuit is about 40 V, which is driven by power MOSFETs. In this case, the voltage is small, so the number of parallel connections of power MOSFETs increases. In such a case, even if the configuration shown in FIG. 32 is adopted, the number of power MOSFET elements remains the same, only the connection relationship changes. In the control circuit and power MOSFET, the gate drive voltage and power MOSFET can be placed in close proximity, allowing high integration of each part. In addition, since the voltage is low, there is little need for electrical isolation circuits, and there is no problem of increasing the complexity of the current detection circuit. Thus, the burden of design and manufacturing to realize the configuration shown in FIG. 32 is reduced.

The product of square wave voltage and square wave current is twice the product of sine wave voltage and sine wave current. Therefore, in a theoretical and simple model, the drive circuit shown in FIG. 32 is capable of twice the output torque, although the only difference is the waveform shape. However, it can be used in an operation mode that outputs a large torque at low-speed rotation. Assume now that in this operating mode, the drive circuit shown in FIG. 32 is driven with a trapezoidal wave voltage close to a square wave and a trapezoidal current close to a square wave. In this case, the capacitance of the transistor in the inverter drive circuit can be reduced to nearly 1/2 of its original size, thus reducing its weight and cost. Even though driving with a trapezoidal waveform current close to a square wave may be possible at low rotational speeds, it is difficult to energize in the range of high rotational speeds due to winding inductance and other factors. Therefore, as the rotation speed increases, it is often forced to gradually supply a current with a waveform close to a sine wave. However, there are many applications such as EVs, industrial machinery, and home appliances that require maximum torque at low speeds but where the above effects are not so great at high-speed rotation. For these applications, square wave drive and trapezoidal wave drive can be effectively implemented.

Twenty-Fourth Embodiment

Figure 33:
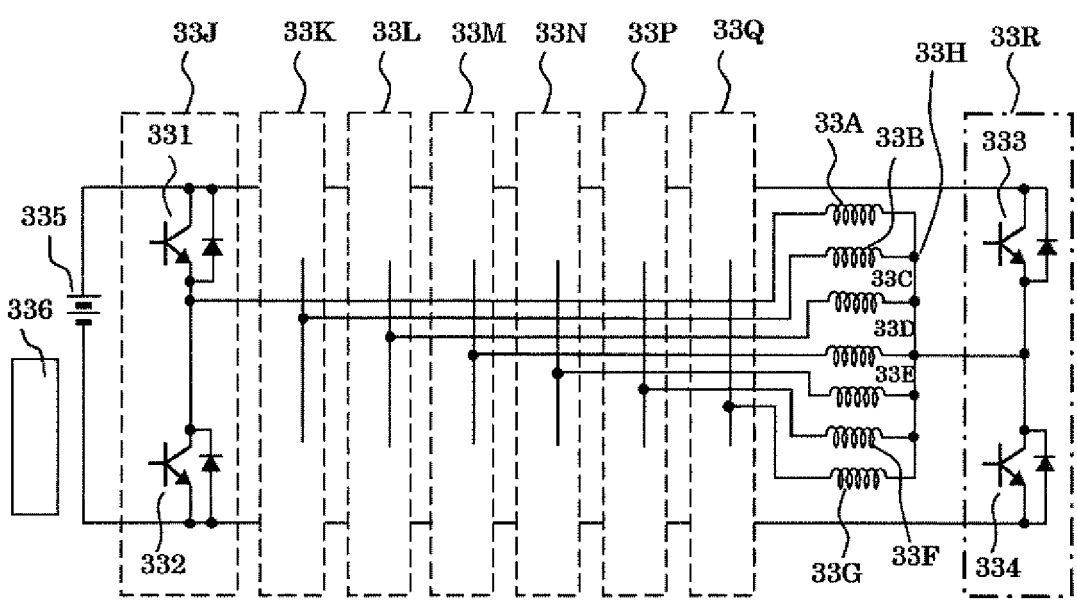
FIG. 33 is another drive circuit exemplifying drive of a 7-phase motor.

Next, an example according to a twenty-second exemplary mode is shown and described in FIG. 33. In FIG. 33, a reference number 335 indicates a DC voltage source, and a reference number 336 indicates the motor control circuit of the entire drive circuit. Reference numbers 331 and 332 represent power transistors, each with diodes in inverse parallel. A positive or negative voltage can be applied to the winding 33A to supply positive or negative current. Drive units 33K, 33L, 33M, 33N, 33P, and 33Q, shown in dashed lines have the same configuration as the drive unit 33J shown in dashed lines. These exemplify 7-phase motor drive. The output of the drive unit 33K is connected to the winding 33B, the output of the drive unit 33L is connected to the winding 33C, the output of the drive unit 33M is connected to the winding 33D, the output of the drive unit 33N is connected to the winding 33E, the output of drive unit 33P is connected to the winding 33F, and the output of the drive unit 33Q is connected to the winding 33G. Each of the other ends of these windings is interconnected, and their common connection point serves as the neutral point 33H. The drive unit 33R, enclosed by the single-pointed line, is equipped with power transistors 331 and 332 and diodes in inverse parallel connected with each other, whose outputs are connected to the neutral point 33 H.

The drive circuit shown in FIG. 33 drives the voltage and current of one winding by two transistors. The neutral point 33H at the other end of each winding is driven by the drive unit 33R. When the sinusoidal current of each phase is energized to the windings 33A, 33B, 33C, 33D, 33E, 33F, and 33G of each phase, the total current Iall is 0 [A]. However, if a square wave current or a trapezoidal wave current similar to a square wave is energized, the total current Iall will not be 0 [A]. By driving the total current Iall using the drive unit 33R, the voltage and current of each winding can be controlled as sinusoidal or trapezoidal currents in each phase. FIG. 33 shows, for example, an example of a drive circuit to drive the 7-phase motor shown in FIG. 1.

The drive circuit shown in FIG. 33 can be driven by changing the number of drive units 33L, 33M, 33N, 33P, and 33Q, even when the number of motor phases is different. When the drive circuit shown in FIG. 33 is 3-phase and has no drive unit 33R enclosed by a single-pointed line, it is used in a wide range of motor applications, such as home appliances and industry, as a drive circuit driven by ordinary 3-phase AC, sine wave voltage and current.

The voltage that each drive unit shown in FIG. 33 can output to each winding is simply 1/2 of the voltage that each drive unit shown in FIG. 32 can output to each winding. The number of power transistors in each drive unit shown in FIG. 33 is 2, and the number of power transistors in each drive unit shown in FIG. 32 is 4. The drive circuit shown in FIG. 33 requires an additional drive unit 33R compared to that in FIG. 32. Comparing the power capacities of the power transistors shown in FIG. 33 and FIG. 32, the configuration shown in FIG. 33 is less advantageous, especially when the number of phases is small, such as three phases, because the drive unit 33R is required. However, when the number of phases is large, the burden on the drive unit 33R is relatively small. In addition, the drive circuit shown in FIG. 33 has the feature that it can be simplified because it requires fewer transistors. For example, in the case of 7-phase, the number of power transistors in FIG. 33 is 16, while the number of power transistors in FIG. 32 is 28. One of the features of the drive circuit shown in FIG. 33 is that the overall configuration can be simplified.

Since each winding has various amounts of inductance components, a large voltage value is required at the timing when the trapezoidal current supplied to each winding increases or decreases, while having a phase for each winding. The drive unit 33R shown in FIG. 33 acts to keep the foregoing neutral point 33H at the average voltage of the drive circuit shown in FIG. 33. In addition, this drive unit 33R can be operated to provide an excessive voltage at the respective timing required for each winding. For example, if the voltage of the DC voltage source 335 shown in FIG. 33 is 400 [V], the maximum voltage that can simply be applied to each winding is 200 [V]. However, in this case, at the time of increasing or decreasing the current, the voltage value can be increased, for example, to 250 [V]. At the extreme end, there is a possibility that 400 [V], twice the normal value, can be applied at a moment in time. For example, if the current waveform of each phase has a trapezoidal waveform shape with a steep increase or decrease, a large voltage is required at the timing when each phase increases or decreases its respective current. In such a case, the drive circuit shown in FIG. 33 can be used more effectively and the overall size can be reduced.

Modifications of the drive circuit shown in FIG. 33 are also possible. One such modification is to split the 335 DC voltage source into two series voltage sources to create an intermediate voltage. In this example, the drive unit 33R can be eliminated by connecting the foregoing neutral point 33H to the intermediate voltage. Another method is to place a capacitor between the foregoing neutral point 33H and the common line of the DC voltage source 335. In this case, that capacitor can be substituted as a divided series voltage source. In this case, the drive unit 33R can be eliminated. In these ways, the drive circuit shown in FIG. 33 can be simplified.

The present disclosure has been described above, but various modifications, applications, and combinations are possible.

In the present disclosure, motor geometries such as outer rotor motors, axial gap motors, or linear motors can be selected. The present disclosure can be applied to a compound motor with two motor elements in the radial direction of the rotor or in the axial direction of the rotor. It can also be combined with other types of motor elements. Regarding the winding, the stator winding can be transformed from a concentrated winding to a toroidal winding, etc. In addition to the ordinal electromagnetic steel sheet, various other materials can be used as soft magnetic materials for the motor magnetic circuit, such as powder magnetic cores, amorphous metal cores, permendur, ferrite cores, etc.

The structure of the present disclosure can also be applied to motors with permanent magnets added to various reluctance motors. Motors with this composite structure are included in the synchronous motors with built-in magnets IPMSM. The rotor magnetic poles, also known as inset magnet type motors, can be configured by employing soft iron magnetic poles on either one side of the N or S pole.

Various types of permanent magnets can be used, and the magnetic properties of the magnets can be varied at the time of use. It is also possible to change the magnetic properties of the magnets with the current for the motor or with a dedicated magnetizing device.

The permanent magnet of the rotor used in the present disclosure can be replaced by an electromagnet equipped with a soft magnetic material, field excitation winding and field excitation current, and a motor having a configuration with such an electromagnet shall be included in the present disclosure.

In addition, electromagnets may be partially utilized. In this case, the magnitude of the field excitation current can be made variable to provide field weakening control and constant output control to higher speeds.

The foregoing field excitation current of the rotor can be provided by supplying field power from the stator to the rotor using a rotating transformer, or by supplying field power from the stator winding to a portion of the rotor winding and rectifying it with a diode to be used as the foregoing field excitation current.

It is also possible to utilize sensor-less position detection techniques that take advantage of the fact that the induced voltage and magnetic characteristics of each winding vary with the rotation of the rotor. Any application or variation of these technologies to the configuration of the present disclosure is included in the present disclosure.

INDUSTRIAL AVAILABILITY

The motor and its control device can make the motor and its inverter part highly efficient in energy, compact in size, lightweight, and low-cost in production. Therefore, the motor and its control device can be used in a wide range of applications, including home appliances, industrial machinery, automobiles, and aircraft.

DESCRIPTIONS OF PARTIAL REFERENTIAL SIGNS 11 stator of Permanent magnet type motor
12 stator pole of the first phase
13 winding of the first phase
14 rotor
15 S-pole permanent magnet
16 N-pole permanent magnet
17 rotor shaft
18 stator pole
19 winding
1A winding
1B winding
1C winding
1D winding
1E winding

What is claimed is:

1. A motor and control device thereof comprises:

(NR1×NN1) pieces of rotor poles PR, (NS1×NN1) pieces of stator poles PS, slots each of which is arranged between two of the stator poles PS, the slots having an opening width θss in a circumferential direction of the motor, the opening width θss being 40 or larger degrees in an electric angle in the circumferential direction;

concentrated windings WS wound around teeth of the respective stator poles, and a drive circuit comprising two power elements connected in series to each of the concentrated windings WS, with the two power elements connected to both ends of each of the concentrated windings WS, for supplying positive currents to the respective concentrated windings, and further two power elements connected in series to each of the concentrated windings WS, with the further two power elements connected to both ends of each of the concentrated windings WS, for supplying negative currents to the respective concentrated windings, or, a drive circuit comprising a power element for supplying a positive current to one end of each of the concentrated windings WS, a further power element for supplying a negative current to the one end of each of the concentrated windings WS, and potential holding means which can act so as to hold a potential at a common connection point of a star-connected circuit portion such that the potential is an intermediate voltage provided between positive and negative sides of a DC source, other ends of the respective concentrated windings WS being mutually connected to the common connection point, wherein the stator poles PS have a circumferential pitch θsp which is equal to or more than 185° in electric angle, the rotor poles PR have a maximum magnetic flux density Brm whose value ranges from 1.4 T to a value which is a maximum magnetic flux density of a soft magnetic member to be used or a maximum magnetic flux density of a permanent magnet to be used, whichever the density is larger, the concentrated windings WS induce approximately trapezoidal shape of voltages, the concentrated windings WS are supplied with approximately trapezoidal shape of currents, and a relationship between the number of stator poles, (NS1× NN1), and the number of rotor pole pairs, (NR1×NN1)/ 2, is NS1/(NR1/2) which is an irreducible fraction, where NS1, NR1 and NN1 are positive integers.

2. The motor and control device thereof according to claim 1, wherein the motor comprises:

a bypass magnetic path PBP is provided between two of the stator poles PS to pass the magnetic flux from the rotor poles PR to a stator back yoke.

3. The motor and control device thereof according to claim 1, wherein when the stator has the magnet poles whose number NS1 is an odd number, respective phase windings are wound and connected to provide an NS1-phase motor, NS1-phase currents being supplied to the phase windings.

4. The motor and control device thereof according to claim 1, wherein the rotor poles PR includes a part provided at a circumferential pole boundary thereof, the part being a region ROU whose flux density is lower than a maximum magnetic flux density Brm.

5. The motor and control device thereof according to claim 1, wherein corrected amounts of shapes of the currents supplied to the stator are memorized, the corrected amounts being for reducing ripples in torque, and the corrected amounts are added to command values for generating the shapes of the respective phase currents for control thereof.

6. The motor and control device thereof according to claim 1, wherein the motor includes magnetic steel sheets which are composed of amorphous electromagnetic steel sheets.

7. The motor and control device thereof according to claim 1, wherein the rotor poles PR include permanent magnets which are Halbach array permanent magnets.

8. The motor and control device thereof according to claim 1, wherein the rotor poles PR include permanent magnets which are polar-anisotropic permanent magnets.

9. The motor and control device thereof according to claim 1, comprising:

the rotor poles PR includes a soft magnetic member composing a central portion of a circumferential surface closely facing an air gap, wherein permanent magnets are arranged around the soft magnetic member.

10. The motor and control device thereof according to claim 1, comprising:

the stator poles PS have magnetic paths composed primarily by a soft magnetic material MM1, and the stator poles includes teeth of which parts are composed of a soft magnetic material MM2, the soft magnetic material MM2 being larger in magnetic characters than a saturation magnetic flux density of the soft magnetic material MM1.

11. The motor and control device thereof according to claim 1, wherein the rotor magnetic poles PR are composed of 6×NN1 pieces of poles, the stator magnetic poles PS are composed of 5×NN1 pieces of poles, and 5-phase voltages and currents are applied to the poles for driving thereof, wherein the number NN1 is a positive integer.

12. The motor and control device thereof according to claim 1, wherein the rotor magnetic poles PR are composed of 8×NN1 pieces of poles, the stator magnetic poles PS are composed of 7×NN1 pieces of poles, and 7-phase voltages and currents are applied to the poles for driving thereof, wherein the number NN1 is a positive integer.

13. The motor and control device thereof according to claim 1, wherein the rotor magnetic poles PR are composed of 10×NN1 pieces of poles, the stator magnetic poles PS are composed of 9×NN1 pieces of poles, and 9-phase voltages and currents are applied to the poles for driving thereof, wherein the number NN1 is a positive integer.

14. The motor and control device thereof according to claim 1, wherein the rotor magnetic poles PR are composed of 12×NN1 pieces or 14×NN1 pieces of poles, the stator magnetic poles PS are composed of 11×NN1 pieces of poles, and 11-phase voltages and currents are applied to the poles for driving thereof, wherein the number NN1 is a positive integer.

15. The motor and control device thereof according to claim 1, wherein the rotor magnetic poles PR are composed of 14×NN1 pieces of poles, the number NN1 being a positive integer, the stator magnetic poles PS are composed of 12×NN1 pieces of poles, and 6-phase voltages and currents are applied to the poles for driving thereof, the 6-phase voltages and currents having either relative phases, in electrical angle, of 0° and 30°, 60° and 90°, and 120° and 150° or relative phases, in electrical angle, of 180° and 210°, 240° and 270°, and 300° and 330° which are for energizing the concentrated windings WS for the respective phases in opposed directions of the concentrated windings.

16. The motor and control device thereof according to claim 1, wherein the rotor magnetic poles PR are composed of 6×NN1 pieces of poles, the number NN1 being a positive integer, the stator magnetic poles PS are composed of 4×NN1 pieces of poles, and 2-phase voltages and currents are applied to the poles for driving thereof, the 2-phase voltages and currents having, in electrical angle, either relative phases of 0° and 90° or relative phases, in electrical angle, of 180° and 270° which are for energizing the concentrated windings WS for the respective phases in opposed directions of the concentrated windings.

17. The motor and control device thereof according to claim 1, wherein the rotor magnetic poles PR are composed of 4×NN1 pieces of poles, the number NN1 being a positive integer, the stator magnetic poles PS are composed of 3×NN1 pieces of poles, and 3-phase voltages and currents are applied to the poles for driving thereof.

18. The motor and control device thereof according to claim 1, wherein the rotor magnetic poles PR are composed of 10×NN1 pieces of poles, the number NN1 being a positive integer, the stator magnetic poles PS are composed of 8×NN1 pieces of poles, and 4-phase voltages and currents are applied to the poles for driving thereof, the 4-phase voltages and currents having, in electrical angle, either relative phases of 0° and 45°, and, 90° and 135° or relative phases, in electrical angle, of 180° and 225θ, and 270° and 315° which are for energizing the concentrated windings WS for the respective phases in opposed directions of the concentrated windings.

19. The motor and control device thereof according to claim 1, wherein when the stator has the magnet poles whose number NS1 is an even number, NS1/2-phase currents being supplied to the phase windings.

* * * * *